(12) United States Patent
Markley et al.

(10) Patent No.: US 9,282,166 B2
(45) Date of Patent: Mar. 8, 2016

(54) MANAGEMENT INFRASTRUCTURE ANALYSIS FOR CLOUD MIGRATION

(71) Applicant: International Business Machines Corporation, Armonk, NY (US)

(72) Inventors: Matthew A. Markley, Hays, KS (US); Amitkumar M. Paradkar, Mohegan Lake, NY (US); Venkata Vinay Parisa, Charlotte, NC (US); Birgit M. Pfitzmann, Samstagern (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 287 days.

(21) Appl. No.: 13/689,500

(22) Filed: Nov. 29, 2012

(65) Prior Publication Data
US 2014/0149494 A1 May 29, 2014

(51) Int. Cl.
*H04L 29/06* (2006.01)
*H04L 29/08* (2006.01)
*H04W 4/00* (2009.01)

(52) U.S. Cl.
CPC .............. *H04L 67/34* (2013.01); *H04W 4/003* (2013.01); *H04L 67/1002* (2013.01)

(58) Field of Classification Search
USPC ........................................................ 709/203
See application file for complete search history.

(56) References Cited

U.S. PATENT DOCUMENTS

| | | | |
|---|---|---|---|
| 7,191,441 B2 | 3/2007 | Abbott et al. | |
| 7,356,679 B1 | 4/2008 | Le et al. | |
| 7,844,853 B2 | 11/2010 | Barsness et al. | |
| 2005/0204040 A1 | 9/2005 | Ferri et al. | |
| 2006/0218544 A1 | 9/2006 | Chakraborty et al. | |
| 2007/0033356 A1 | 2/2007 | Erlikhman | |
| 2008/0189697 A1 | 8/2008 | Kachroo et al. | |
| 2009/0063751 A1 | 3/2009 | Dow | |
| 2009/0288084 A1 | 11/2009 | Astete et al. | |
| 2009/0307166 A1 | 12/2009 | Routray et al. | |
| 2010/0049929 A1 | 2/2010 | Nagarkar et al. | |
| 2010/0077160 A1 | 3/2010 | Liu et al. | |
| 2010/0191930 A1 | 7/2010 | Groff et al. | |
| 2010/0235831 A1 | 9/2010 | Dittmer | |
| 2010/0287280 A1 | 11/2010 | Sivan | |
| 2010/0306772 A1 | 12/2010 | Arnold et al. | |
| 2011/0060832 A1 | 3/2011 | Govil et al. | |
| 2011/0106768 A1 | 5/2011 | Khanzode et al. | |
| 2011/0107331 A1 | 5/2011 | Evans et al. | |

(Continued)

OTHER PUBLICATIONS

Chris Ward, et al. "Workload Migration into Clouds—Challenges, Experiences, Opportunities". IEEE 3rd Intern. Conf. on Cloud Computing, 2010, pp. 164-171.

(Continued)

*Primary Examiner* — Tu Nguyen
(74) *Attorney, Agent, or Firm* — Louis J. Percello; Otterstedt, Ellenbogen & Kammer, LLP

(57) ABSTRACT

In a source computing system having a source management infrastructure, at least one source infrastructure management component is discovered. A description of a target cloud infrastructure having a target management infrastructure is obtained. The description includes at least one mandatory target infrastructure management component. The at least one source infrastructure management component is analyzed to determine whether at least one conflict exists with the at least one mandatory target infrastructure management component.

19 Claims, 47 Drawing Sheets

(56) References Cited

U.S. PATENT DOCUMENTS

| | | | |
|---|---|---|---|
| 2011/0202714 A1 | 8/2011 | Burch et al. | |
| 2011/0320882 A1 | 12/2011 | Beaty et al. | |
| 2012/0072903 A1 | 3/2012 | Joukov et al. | |
| 2012/0117558 A1 | 5/2012 | Futty et al. | |
| 2012/0131567 A1 | 5/2012 | Barros et al. | |
| 2012/0137003 A1* | 5/2012 | Ferris et al. | 709/226 |
| 2012/0203823 A1* | 8/2012 | Manglik et al. | 709/203 |
| 2012/0209812 A1 | 8/2012 | Bezbaruah et al. | |
| 2012/0266169 A1 | 10/2012 | Lagergren et al. | |
| 2012/0304179 A1 | 11/2012 | Devarakonda et al. | |
| 2012/0311154 A1 | 12/2012 | Morgan | |
| 2013/0036091 A1 | 2/2013 | Provenzano et al. | |
| 2013/0091285 A1 | 4/2013 | Devarakonda et al. | |
| 2013/0167145 A1 | 6/2013 | Krishnamurthy et al. | |
| 2014/0115285 A1 | 4/2014 | Arcese et al. | |
| 2014/0129521 A1 | 5/2014 | Marsden | |
| 2014/0146055 A1 | 5/2014 | Bala et al. | |
| 2014/0149492 A1 | 5/2014 | Ananthanarayanan et al. | |
| 2014/0149591 A1 | 5/2014 | Bhattacharya et al. | |
| 2014/0149695 A1 | 5/2014 | Zaslavsky et al. | |
| 2014/0149983 A1 | 5/2014 | Bonilla et al. | |

OTHER PUBLICATIONS

Galapagos. "Model-driven discovery of end-to-end application-storage relationships in distributed systems". IBM Journal of Research and Development archive, vol. 52 Issue 4, Jul. 2008, pp. 367-377.

Nikolai Joukov, et al. "Application-Storage Discovery". SYSTOR 2010, Haifa, May 2010.

Peter Mell, et al. "The NIST Definition of Cloud Computing". Version 15, Oct. 7, 2009, National Institute of Standards and Technology, Information Technology Laboratory.

IBM Global Technology Services Data Sheet "Managed hoste cloud infrastructure services". IBM Corporation 2012.

IBM Migration Factory, downloaded from http://www-03.ibm.com/systems/migratetoibm/factory/ on Nov. 12, 2012.

Robert Filepp et al., Image selection as a service for cloud computing environments; IEEE International Conference on Service-Oriented Computing and Applications (SOCA) 2010, 1-8 (abstract only).

* cited by examiner

MANAGEMENT INFRASTRUCTURE ANALYSIS FOR CLOUD MIGRATION

FIELD OF THE INVENTION

The present invention relates to the electrical, electronic and computer arts, and, more particularly, to cloud computing and the like.

BACKGROUND OF THE INVENTION

In an Infrastructure as a Service (IaaS) cloud, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Migration is the process of moving from a source environment to a target environment, such as a target IaaS cloud environment. Heretofore, migration analysis has typically only focused on operating systems (OS) and applications, not infrastructure management.

SUMMARY OF THE INVENTION

Principles of the invention provide techniques for management infrastructure analysis for cloud migration.

In one aspect, an exemplary method includes discovering, in a source computing system having a source management infrastructure, at least one source infrastructure management component; and obtaining a description of a target cloud infrastructure having a target management infrastructure. The description includes at least one mandatory target infrastructure management component. A further step includes analyzing the at least one source infrastructure management component to determine whether at least one conflict exists with the at least one mandatory target infrastructure management component.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein; the overall apparatus will typically include (ii) or (iii).

Techniques of the present invention can provide substantial beneficial technical effects. For example, one or more embodiments provide techniques for management infrastructure analysis for cloud migration with one or more of the following advantages:

facilitates migration of existing environments to cloud environments having standardized infrastructure management systems and processes (e.g., MIaaS cloud environments), improves coverage of existing servers or instances that can be migrated to such cloud environments, i.e., the fraction of servers or instances that can be migrated, decreases the risk of failure of the migration or problems after the migration, and/or where migration is not possible or needs specific preceding measures, decreases the time needed and the risk during the critical actual migration period (where applications are typically shut down) by advance analysis.

These and other features and advantages of the present invention will become apparent from the following detailed description of illustrative embodiments thereof, which is to be read in connection with the accompanying drawings.

BRIEF DESCRIPTION OF THE DRAWINGS

FIG. 20 shows an exemplary user interface in accordance with one or more aspects of the invention.

DETAILED DESCRIPTION OF PREFERRED EMBODIMENTS

Figure 1:
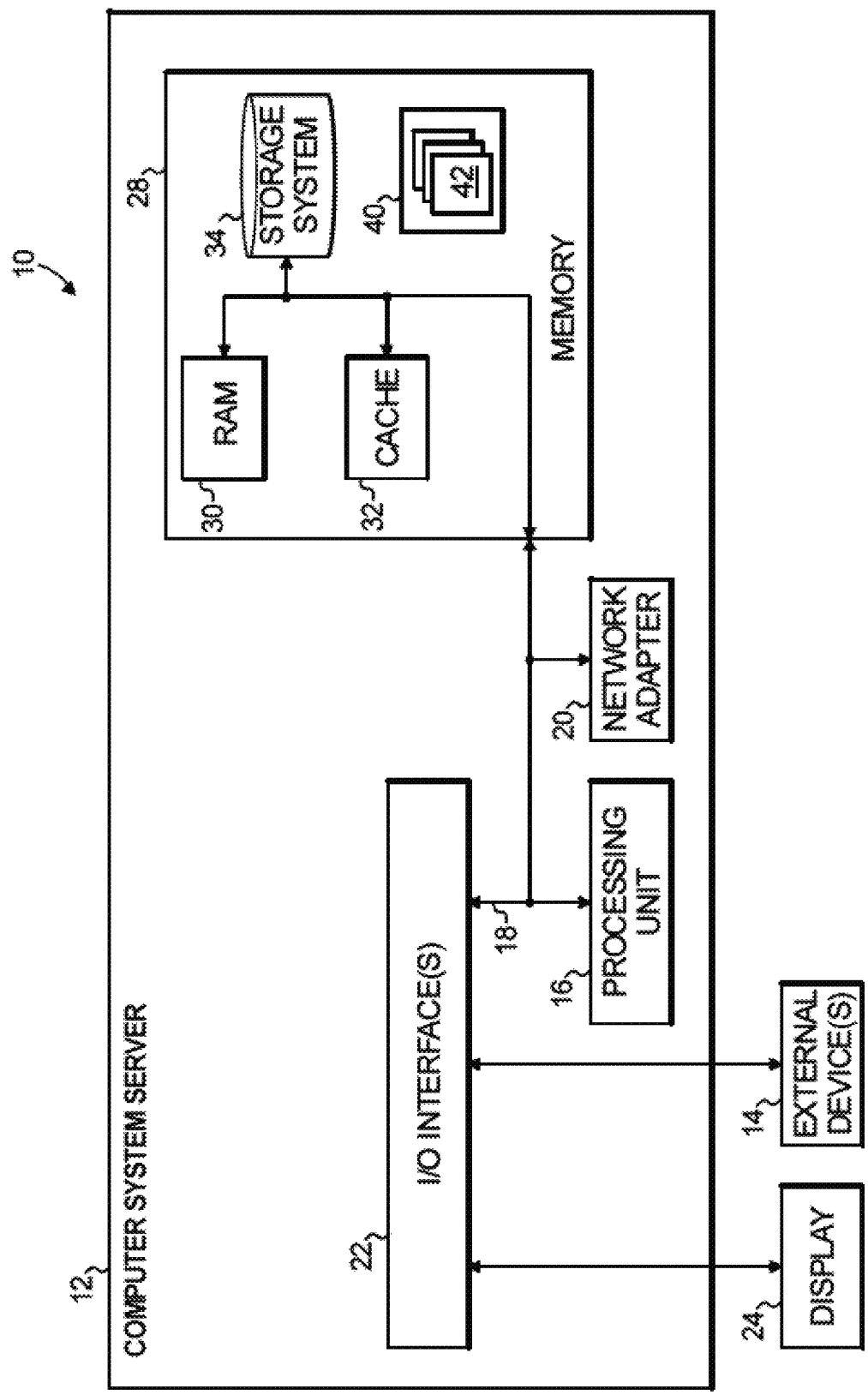
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
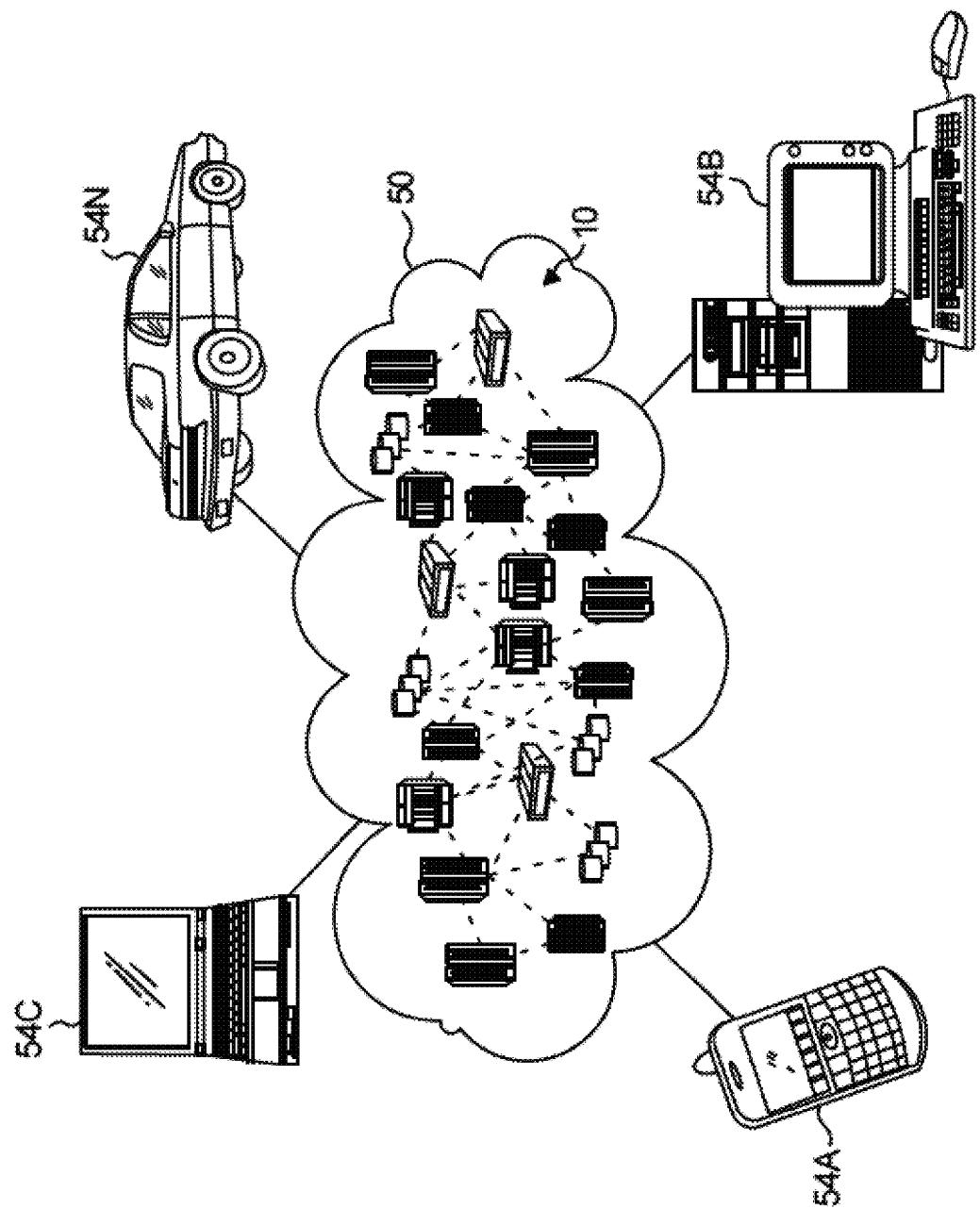
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
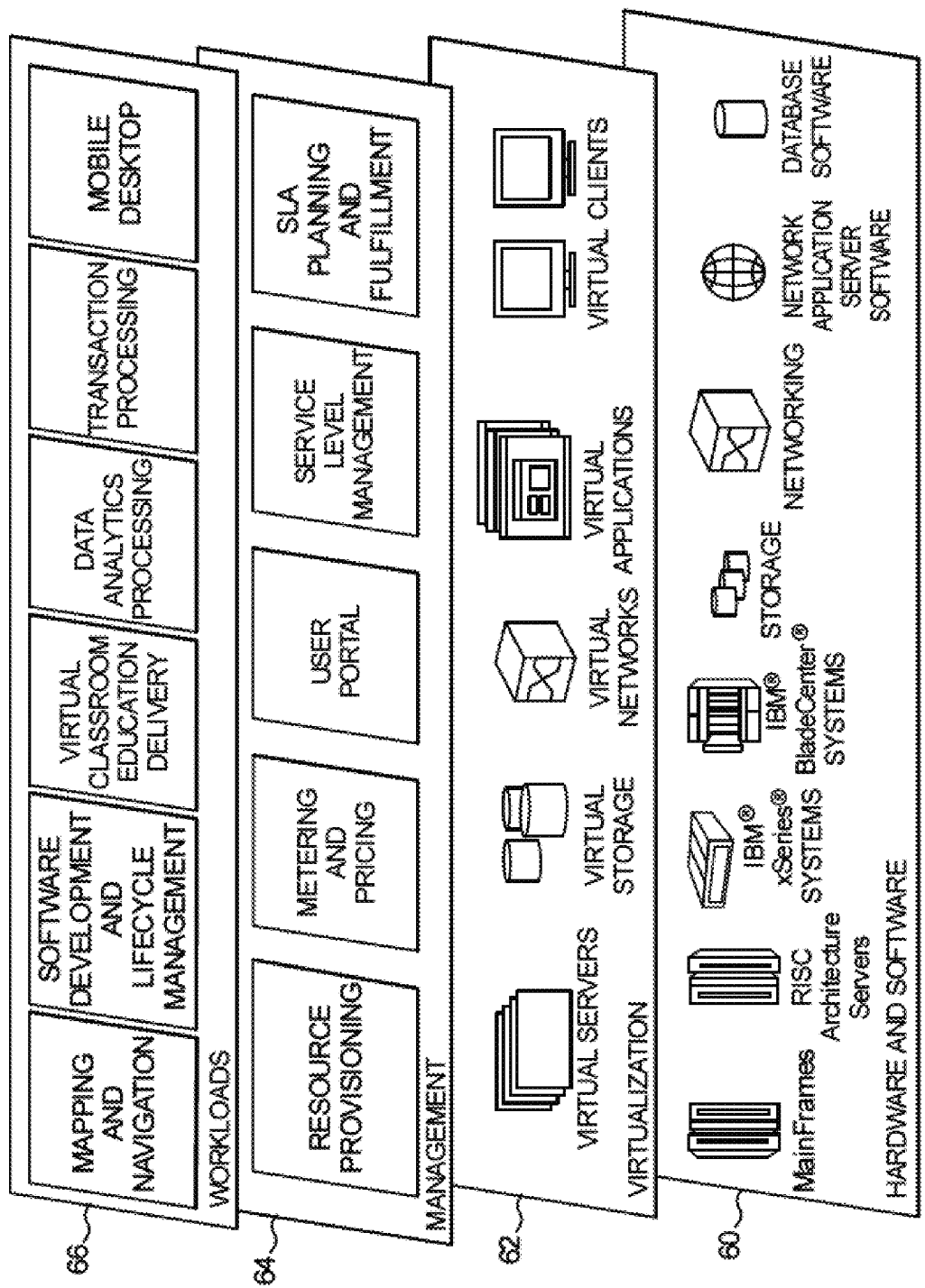
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Migration to Managed Clouds

A Hardware-Infrastructure-as-a-Service (HIaaS) cloud provides bare-bones virtual machines as a service. It may also provide an operating system (OS) and even software, but no support is typically provided for the OS or software. A Managed-Infrastructure-as-a-Service (MIaaS) cloud provides full-service virtual machines. The service may, e.g., include OS patching and support for security and compliance of the OS. One significant aspect of MIaaS is simpler management via: standardization to a certain set of catalog images from which instances are generated, automatic linkage of these instances to management tools during deployment, and/or not giving customers administration privileges on the OS level, so that the operating systems on the instances remain as the cloud administrators configure them.

An MIaaS cloud may not naturally come with import or registration features for foreign instances, inasmuch as a significant aspect of MIaaS is simpler management via: standardization to a certain set of catalog images from which instances are generated; automatic linkage of these instances to management tools during deployment; and, typically, not giving customers administration privileges on the operating system (OS) level, so that the operating systems on the instances remain as the cloud administrators configure them. Thus, in migrating to an MIaaS cloud, it is typically not feasible to simply use P2V (physical-to-virtual) conversion on source instances, or to directly copy already virtualized instances, and then expect them to be run on cloud hypervisors. This is so because they would not fulfill the aforementioned criteria through which simpler management is achieved in the MIaaS cloud, and thus they would not be acceptable to the management of the MIaaS cloud.

Furthermore, with regard to MIaaS clouds, the standard registration (i.e., making a new instance known to the general IaaS cloud management systems as well as the specific management systems of an MIaaS cloud) is typically inbuilt into the provisioning from catalog images. Advantageously, one or more embodiments provide a new registration procedure wherein foreign instances can be accommodated within migration to an MIaaS cloud. Indeed, one or more embodiments advantageously provide a system and method for rapid migration into MIaaS (and more generally, IaaS) clouds. The method includes transfer of the instance to the cloud in image form; adjustments of the instance (running or in image form) to cloud standards; and registration of the instance into cloud OSS and BSS systems (Operation and Business Support Systems). Optional additional steps address prior analysis, testing and handling failures, and/or starting and ending change windows and actual downtimes in order to minimize risk and outages.

One or more embodiments advantageously provide a systematic (and even automated) method of rapidly migrating customer instances into MIaaS clouds that does not involve a reinstall procedure. One or more embodiments are useful with MIaaS cloud migration and are capable of physical-to-virtual style instance importation.

One or more embodiments enhance the ability to standardize both infrastructure per se and the management of such infrastructure. It is believed that such standardization will in turn allow reduction in IT operational costs and permit further automation. One or more embodiments provide techniques for migration into an MIaaS cloud which are significantly less expensive than techniques that require reinstall.

As noted above, one or more embodiments provide a migration technique with one or more of the following advantages:

significant coverage (percentage of instances and then workloads where the method can be used), low cost, which in particular is bounded by manual work needed (in particular compared with reinstall methods)

short migration times (as change windows/permitted outages are typically short), low risk (e.g., of application outages beyond the planned ones), and/or predictability (i.e., workloads chosen for this migration technique will likely succeed in it).

Figure 4:
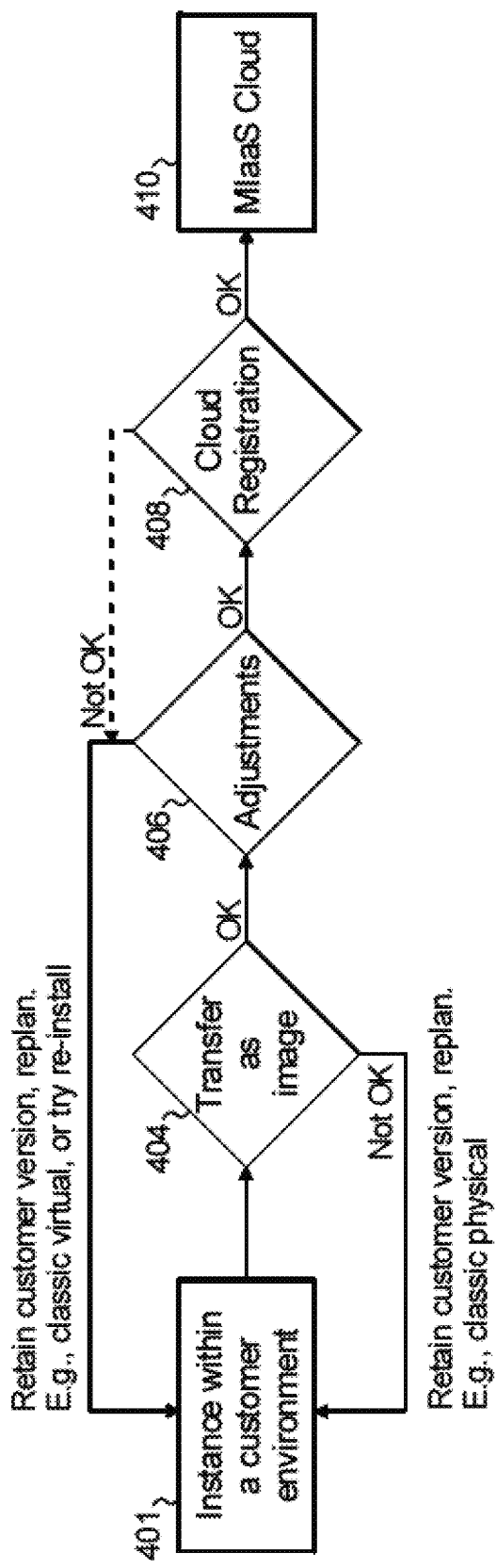
FIG. 4 presents a high-level flow chart, according to an aspect of the invention.

With attention now to FIG. 4, begin with an instance 401 in an existing customer environment 402 (seen in FIG. 5) which it is desired to migrate. In step 404, transfer the instance to the cloud in image form. If this is not successful, retain the original customer version 401 and re-plan the migration; for example, retain it in its original environment, or perform a classical migration into a service provider environment where it can remain a physical instance, or make significant changes on the instance so that it becomes virtualizable. On the other hand, if step 404 is successful, in step 406, carry out adjustments of the instance (in running and/or in image form) to ensure that it complies with cloud standards. If this is not successful, retain the original customer version 401 and re-plan the migration; for example, virtualize it in the customer environment or a service provider environment without cloud standards, or an HIaaS cloud, or perform a more complex reinstall migration wherein individual software components are newly installed and customer data are transferred individually rather than within the entire image. On the other hand, if step 406 is successful, in step 408, carry out registration of the instance into the cloud OSS and BSS systems. If step 408 is not successful, retain the original customer version 401 and re-plan the migration; for example, by the same approaches as when steps 404 or 406 failed. On the other hand, if step 408 is successful, the result is successful migration to the MIaaS cloud 410.

Note that initial sub-steps for the cloud registration may take place before the adjustments or may be interleaved with the adjustments. However, from a logical standpoint, the final registration, i.e., final acceptance of the imported instance as a cloud-managed instance, should be after the end of the adjustments.

Figure 5:
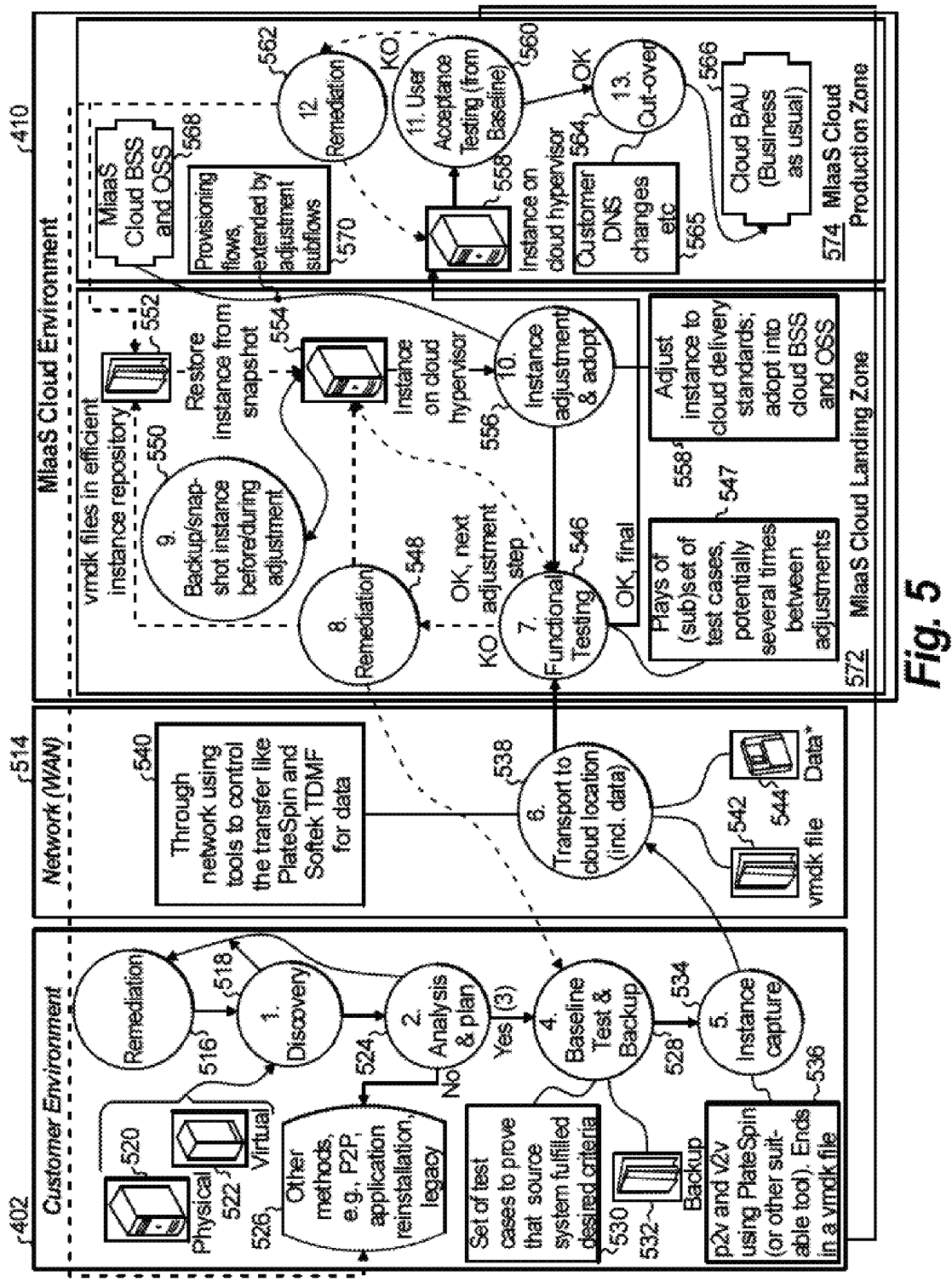
FIG. 5 presents a detailed flow chart and block diagram, according to an aspect of the invention.

Turning now to FIG. 5, a non-limiting exemplary method is depicted therein with greater detail. A customer environment 402 is connected to an MIaaS cloud environment 410 via a wide area network (WAN) 514 or the like. Initially, a discovery process 518 is carried out to determine both the physical 520 and virtual 522 instances and their configurations in the customer environment 402. Analysis and planning is then carried out in step 524. If the results are unfavorable, other methods, such as physical-to-physical (P2P) migration, application reinstallation, retention of the legacy systems, and the like are pursued, as shown at 526. Also, if either of steps 518, 524 indicate that remediation (i.e., small changes to the instances to make them compatible with the cloud) is required, the same is carried out at 516 and then process flow returns to step 518. On the other hand, if step 524 indicates that migration using one or more techniques disclosed herein is feasible, flow proceeds to baseline test and backup, in step 528. In step 528, as shown at 530, a set of test cases are run to prove that the source system fulfills criteria that are desired to be maintained in the target environment, e.g., that it still tests correct under all of its functional test cases or performance claims. This is done to ensure that any errors already present are fixed before the migration process. Furthermore, a back-up process is carried out, as shown at 532, to permit recovery in case of any issues encountered in the migration process. Preferably, before finalizing the backup 532, applications on the physical or virtual instance 520 or 522 are stopped so that no further changes take place in the customer environment under conditions such that they would not be copied to the MIaaS cloud environment. Processing then proceeds to step 534, wherein the instances to be migrated are captured. One or more illustrative embodiments focus on specific aspects of migrating to an MIaaS cloud, which are largely per-instance. As to the overall migration, it is typically done in waves of multiple instances each, e.g., per weekend, attempting to keep workloads or interacting instances within one wave. Such aspects have been disclosed, e.g., in Athey at al., System and method for object migration using waves, United States Patent Application Publication 20110213883, Sep. 1, 2011; and Devarakonda et al., Total cost-based migration waves planning, United States Patent Application Publication 20120109844, May 3, 2012, both of which are expressly incorporated herein by reference in their entireties for all purposes.

As seen at 536, this instance capture step can include, for example, both physical-to-virtual (P2V) and virtual-to-virtual (V2V) techniques with one or more suitable tools. One non-limiting example of a suitable tool is PlateSpin® Migrate, a physical/virtual conversion tool for fast and efficient P2V (more broadly, anywhere-to-anywhere) migrations; it is available from NetIQ Corporation, Houston, Tex., USA; another is VMware vCenter Converter, available from VMware, Inc., Palo Alto, Calif., USA. In one or more non-limiting exemplary embodiments, the end result of step 534 is a Virtual Machine Disk Format (VMDK) file.

It is to be emphasized that many product names are mentioned herein; these are intended as examples for the skilled artisan and to convey the applicants' understanding of the best mode. They are not intended to limit the claims unless expressly recited therein, but rather are to be considered exemplary of corresponding generic software products; e.g., PlateSpin® Migrate is broadly representative of physical/virtual conversion tools.

As seen in step 538, the captured instances are then transported into the cloud location 410 via network 514. Data 544 outside the boot disk may be transported separately from the aforementioned vmdk file (seen at 542), in particular if it is large and the data transport might start earlier. As noted at 540, the instances and data are transported through network 514 using appropriate tools to control the transfer. Non-limiting examples of such tools include the aforementioned PLATESPIN tool, as well as the Softek Transparent Data Migration Facility (TDMF®) tool for data (registered mark of International Business Machines Corporation, Armonk, N.Y., USA). Data 544 is typically not affected by special aspects of MIaaS cloud, i.e., it can be migrated and linked back with the vmdk in usual ways. Thus further details about the data 544 are omitted from the figure to avoid clutter.

In step 546, functional testing is carried out on the transported instance(s) 554 that was restarted from the image on a cloud hypervisor. As seen at 547, this can include, for example, playing a set or subset of test cases; this can be repeated several times between adjustments. Also, it should be noted that upon initial arrival in cloud environment 410, the transported instances reside within MIaaS cloud landing zone 572. If functional testing is successful at this time, processing flow proceeds to instance adjustment and adoption 556. This is a significant step to modify the instance so that it can run in the standard MIaaS environment. After all adjustments, and possibly between certain adjustment steps, functional testing is repeated, as shown by the backwards error from Step 556 to 546. After each successful functional test, instances can be backed up (i.e., a snapshot 552 of the instance can be taken) as shown at step 550 (e.g., as vmdk files in an efficient instance repository 552) for later reference, as a most recent correct-seeming state of the instance. If functional testing is successful after all adjustments 556, the transported instance(s) are instantiated on cloud hypervisor 558 within MIaaS cloud production zone 574. On the other hand, if functional testing is not successful in one of its repetitions, processing flow proceeds to remediation step 548. The remediation process can proceed via a number of avenues. Typically, error messages will be analyzed and related to the latest changes. These latest changes are the virtualization and new hypervisor in the first execution of the functional testing 546. In subsequent executions, they are the changes by the adjustments since the previous execution of the functional. For this, it may be useful to refer to a snapshot 552 of the instance before these last changes. If remediation of these errors is not successful (which might be determined by a rerun of the functional test), flow returns to step 528, i.e., the migration of this instance is stopped (at least for the moment) and the backup is used to restore the source instance 520 or 522 in the customer environment 402. When remediation is successful, the processing proceeds as if that functional test had succeeded at once, i.e., with the first or next adjustment or, if all adjustments are done, with instantiating the instance on cloud hypervisor 558 within MIaaS cloud production zone 574.

Within the instance adjustment and adoption step 556 the instances on hypervisor 554 are adjusted to cloud delivery standards and adopted into the cloud BSS and OSS, as seen at 568. As seen at 570, this process employs provisioning flows extended by adjustment subflows. For example, the standard provisioning flow of the MIaaS (i.e., for instances chosen from the cloud catalog, rather than migrated) may register a new instance in an asset management system, a monitoring system, and start billing and accounting for it. This functionality can be reused from the standard provisioning flow. On the other hand, the standard provisioning flow may not install a certain monitoring agent that the MIaaS cloud requires on the normal instances because they would be preinstalled in the cloud catalog images. Hence installing this agent would be part of the special adjustment flows. Similarly, an update of the security patches to the level that the cloud catalog images have may be an extra step in the adjustment flows. When the functional testing after all adjustment steps finally has successfully completed, as noted, instantiation occurs on cloud hypervisor 558 within production zone 574.

In one or more embodiments, the landing zone is a special zone added for migration to an MIaaS cloud, because when the instances are first started on a hypervisor the MIaaS cloud environment (see item 554) in order to test and adjust, they do not yet fulfill cloud standards and thus the normal cloud management cannot handle them. They may also not fulfill the security standards that the OS management in the cloud provides and assumes. For this reason, one may physically separate the landing zone 572 and the production zone 574, at least by using different servers to host the hypervisors, and separate them by firewalls that only let the controlled information through as indicated by the two arrows between the zones. Also the storage systems may be separate. Another advantage of physical separation is that the cloud management systems such as capacity and performance management then don't have to deal with hypervisor(s) that are partially filled with normal, managed cloud instances and partially with as yet unmanageable imported instances. However, it is also conceivable to use logical separation, i.e., trust the cloud hypervisors to not let the potentially insecure imported images impact the others, and to extend the cloud management systems to deal with partitioned hypervisors.

Once the pertinent migrated instances are instantiated on cloud hypervisor 558 in production zone 574, user acceptance testing 560 may be conducted, for example, to verify that performance is equivalent to the baseline. If not so, remediation is carried out at 562, to correct the instances on hypervisor 558. This remediation process can make use of instance repository 552 or alternate techniques 526 as appropriate; if this happens, the instance should be removed from the production zone 574 again until it is remediated. The test cases in the user acceptance test 560 should preferably be identical to those in the baseline test 528. They often cover multiple instances together if the user-relevant function is performed by multiple instances, e.g., a web server, an application server, and a database. In contrast, the functional test may be per instance only. When testing 560 is successful, cut-over is carried out in step 564, taking into account any customer domain name server (DNS) changes or the like, as seen at 565. Upon completion of cut-over, as seen at 566, the migrated instances operate in the MIaaS cloud production zone in a business as usual (BAU) manner.

In FIG. 5, it will be appreciated that in one or more exemplary embodiments, steps 516, 528, and 560 are in the scope of the customer while steps 518, 524, 526, 534, 538, 550, 556, and 564 are in the scope of the cloud services provider. Steps 546, 548, and 562 are of a mixed nature between both parties.

Figure 6:
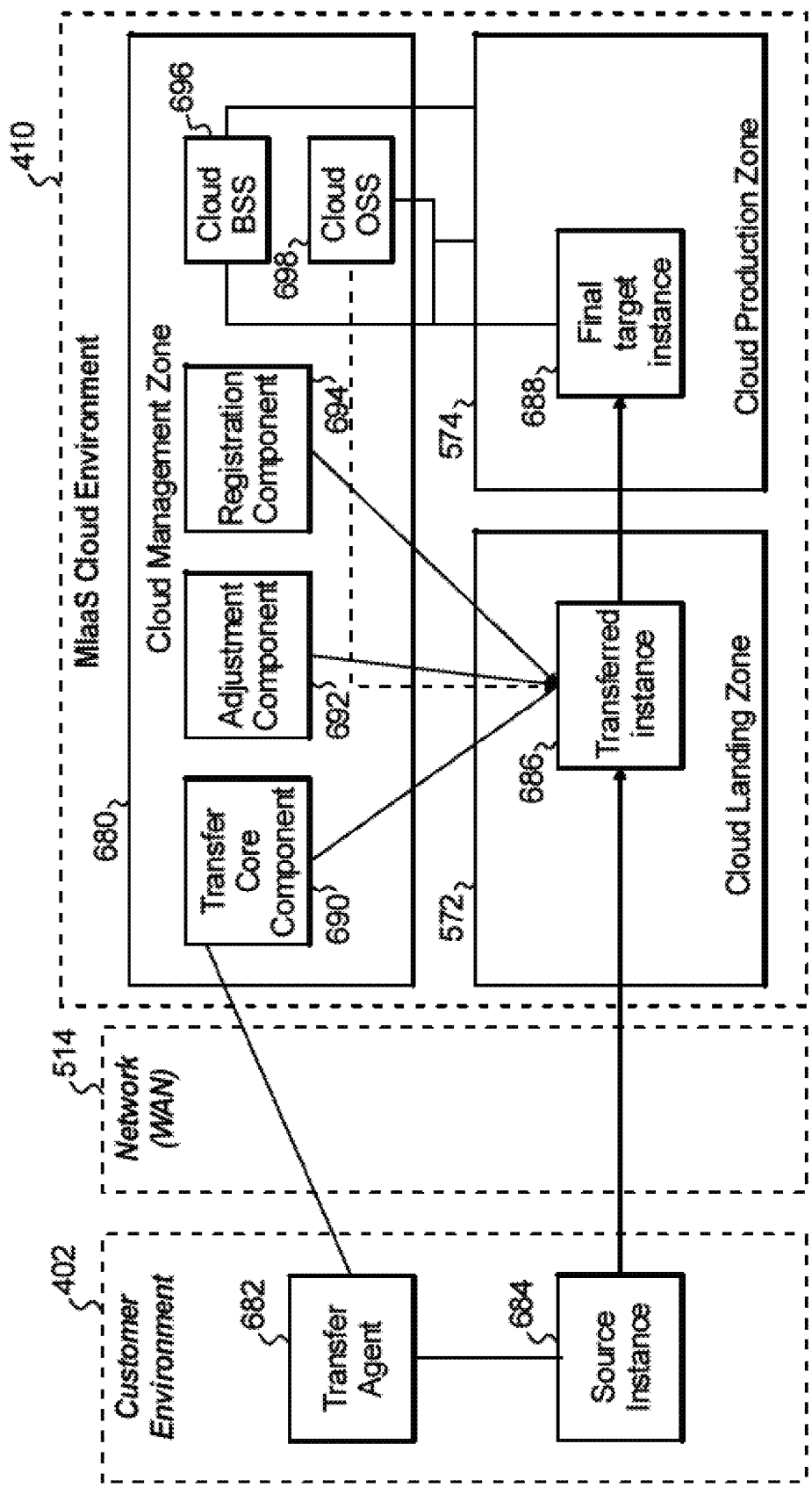
FIG. 6 presents an exemplary system block diagram, according to an aspect of the invention.

FIG. 6 shows an exemplary system diagram. Customer environment 402 includes one or more source instances 684 (corresponding to the initial physical or virtual instances 520 and 522 in FIG. 5) and a transfer agent 682. Network 514 provides connectivity between customer environment 402 and MIaaS cloud environment 410. Environment 410 includes landing zone 572, production zone 574, and management zone 680. Transferred instances 686 reside within landing zone 572 (element 554 represents an instance running on a hypervisor). Final target instances 688 reside within production zone 574 (element 558 represents an instance running on a hypervisor). Cloud management zone 680 includes a number of management components. Transfer core component 690 carries out instance transfer of source instance 684 to transferred instance 686, working in conjunction with transfer agent 682. Adjustment component 692 orchestrates the adjustment process discussed with regard to landing zone 572 in FIG. 5. Registration component 694 registers the adjusted instance into the normal management system of the MIaaS cloud, here shown by the BSS and OSS 696, 698. Cloud OSS and BSS systems (Operation and Business Support Systems) 698, 696 provide input for step 556, as seen at 568. The normal function of OSS and BSS in an MIaaS cloud is to manage instances in the production zone 574. However, the landing zone 572 also needs at least a minimal OSS, e.g., for capacity management and thus finding a suitable place (server and storage with enough capacity) when a source instance 684 is coming in. If the landing zone is physically separated from the production zone, then at a more detailed level the OSS may be separated too. In any case, the adjustment component 692 and registration component 694 prepare the instance for reception into the OSS 698 so there is at least an abstract connection in the sense of them needing knowledge about the OSS requirements. A BSS for the landing zone is typically not necessary because in the landing zone, the instances are controlled by the migration process, and not yet visible to the customer or end user.

Figure 7:
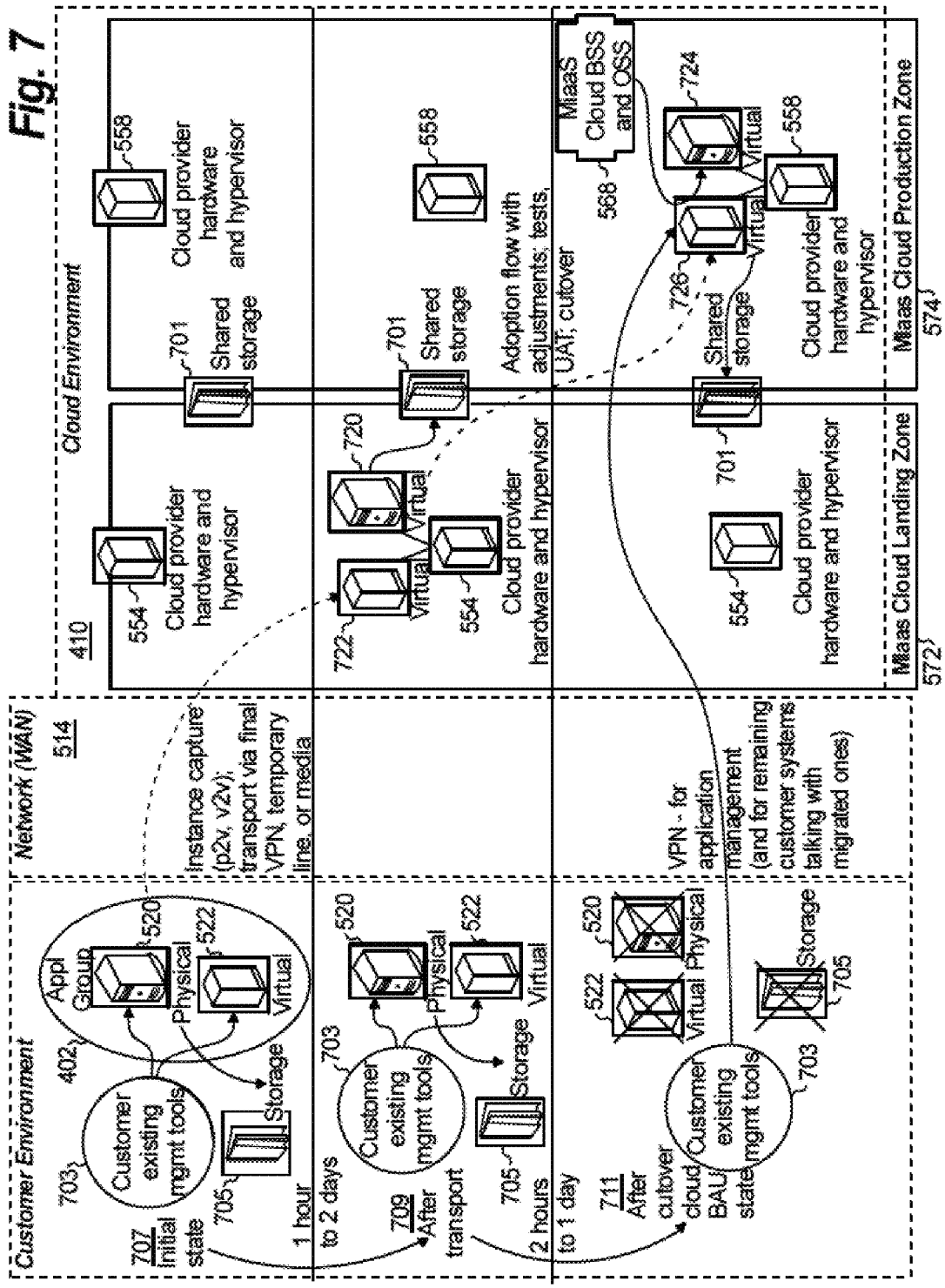
FIG. 7 presents an exemplary system diagram including system states at significant phases, according to an aspect of the invention.

FIG. 7 shows system states at significant points in time (i.e., during significant phases); namely, initial state 707, after transport 709, and after cutover (cloud BAU) 711. In state 707, the customer's existing management tools 703 are managing both the physical 520 and virtual 522 instances in the customer environment 402. The same are stored in storage 705 (e.g. as described with respect to backup step 528 and 532, but also the plain external storage of the instances if that is outside the servers, e.g., on a storage-area network or a networked file system). The instances are captured. As discussed above with regard to 536, this instance capture can include, for example, both physical-to-virtual (P2V) and virtual-to-virtual (V2V) techniques with one or more suitable tools; transport can be via WAN 514 (which could include, for example, the final virtual private network (VPN) (used for communication between the customer and cloud environment during normal operation after migration is complete), or a temporary line) or by transfer of physical media. In one embodiment, cloud environment 410 includes cloud provider hardware and hypervisor 554 in cloud landing zone 572, cloud provider hardware and hypervisor 558 in cloud production zone 574, and shared storage 701. This embodiment is a compromise between full physical separation of landing zone and production zone as described above, where even the storage would be separate, and solely logical separation, where even the hypervisors would be shared and the zone separation would be enforced by the hypervisors—both of those are also among the possible embodiments. One benefit of this mixed embodiment is that the final transfer of the instance from landing zone to production zone does not need to copy the data; only the ownership of the storage volume(s) belonging to this instance is changed to the production zone.

After transport, as seen at 709, physical and virtual instances 520, 522 are now both virtualized on cloud provider hardware and hypervisor 554 in the landing zone 572, as seen at 720, 722, respectively, and there the adjustments and testing take place. Migrated data is stored in shared storage 701. Preferably, the source instances 520, 522 have been shut down before the transfer, as explained above with respect to the backup 528. One extreme case is that they are not running at all (physical server switched off for 520; instance removed from hypervisor for 522), but typically one would only stop the services on them (so that no changes are made that would be lost when business-as-usual resumes in the cloud production zone). If read-only services can be distinguished, e.g., browsing on informational web pages, those can keep running. Furthermore, one would typically retain the instances 520 and 522 still in the customer management tools in case migration fails, so that operation in the customer environment could resume quickly.

After cut-over, during the cloud BAU (business as usual) state, as seen at 711, physical, virtual, and storage resources 520, 522, in the customer environment 711 are shut down, and storage 705 used by them is released. Meanwhile, any required adjustments and remediation have been completed, as described with regard to FIG. 5, physical and virtual instances 520, 522 are now both virtualized on cloud provider hardware and hypervisor 558 in the cloud production zone, as seen at 724, 726, respectively. Migrated data is still stored in shared storage 701 in this embodiment of partial physical separation of landing zone and production zone. With full physical separation, there would be two different storage systems, one in the landing zone and one in the production zone, and the data would reside on the former in phase 709 and on the latter in phase 711. BAU cloud processing occurs under control of cloud OSS and BSS systems (Operation and Business Support Systems) 698, 696 seen at 568. The customer management tools 703 may be provided with an interface to production zone 574. However, this typically only concerns those specific tools that manage on the application layer, while tools that perform OS-level functions (such as OS performance management) have been replaced by the cloud OSS in 568. For example, the instance (initially 520 or 522, then 720 or 722, finally 724 or 726 may contain a database, and the customer may have a database management tool as part of 703. An MIaaS cloud (in contrast to a PaaS cloud) typically does not perform database management. So the customer database management tool gets a link to this database on instance 724 or 726. This approach uses the normal way in which customers of the cloud link to their instances of the cloud, e.g., a VPN; it is not in conflict with any zoning or administration constraints of the MIaaS cloud. It should be noted that FIG. 7 shows an exemplary time of one hour to two days to move from initial state 707 to "after transport" state 709 and an exemplary time of two hours to one day to move from "after transport" state 709 to "after cutover cloud BAU" state 711. These values are intended to provide helpful example for the skilled artisan but are not intended to be limiting.

One or more embodiments thus provide a method for migrating an instance into a cloud, including transferring the instance to the cloud in image form; adjusting of the instance to cloud standards; and registration of the instance into cloud management systems. In some cases, registration is done by a variant of the cloud provisioning method in which picking up a catalog image is replaced by picking up a transferred instance. In some embodiments, cloud management systems include an operational support system and a business support system. In some embodiments, cloud standards include one or more of security standards, infrastructure standards, patch management standards, and infrastructure management tool standards.

Furthermore, in one or more embodiments, adjustment is done by a workflow defined in a workflow engine. In some cases, one or more adjustments are done in the workflow by special tools such as a patch management tool.

In some embodiments, before the transfer step, analysis is carried out on the instance to determine whether it is suitable for the cloud and the given migration method, and only suitable instances are considered further. Furthermore, in some embodiments, tests are carried out at one or more of the times before the transport, after the transport, between different adjustments, after adjustments, and after migration, and remediation and/or back-out occur if one or more of the tests fail. In some cases, multiple instances are treated as a whole in one or more of the decisions to migrate (i.e., whether suitable for cloud as mentioned earlier in this paragraph) and/or in the tests and back-out decisions.

Furthermore, one or more embodiments include discovery, actual handling of failures, starting and ending change windows and actual downtimes, detailed interleaving of adjustment and registration, and/or the cut-over step.

Certain terms employed herein will now be defined:

IaaS clouds: Infrastructure-as-a-Service is a common term for clouds that primarily offer their users virtual machines (VMs), rather than also software on the VMs (referred to as PaaS, platform-as-a-service) or even software without access to the VMs (referred to as Software-as-a-Service) or business processes (BPaaS).

The following subdivision of IaaS clouds are introduced herein:

HIaaS cloud: A Hardware-Infrastructure-as-a-Service cloud provides bare-bone virtual machines as a service. It may also provide an operating system (OS) and even software, but typically no support is provided for the OS or software (e.g., Amazon Elastic Compute Cloud (Amazon EC2) available from Amazon Web Services LLC Seattle, Wash., USA).

MIaaS Clouds: A Managed-Infrastructure-as-a-Service cloud provides full-service virtual machines. The service may, e.g., include OS patching and support for security and compliance of the OS (e.g., IBM SmartCloud Enterprise+ also known as IBM SCE+, cloud environment available from International Business Machines Corporation, Armonk, N.Y., USA)

Instance: An operating system instance together with all software running on this operating system. It may be physical (i.e., directly running on a server) or virtual (i.e., already running on a hypervisor).

Source instance: Instance as it is running on the source side, before migration.

Image: File representation of an instance.

Catalog image: Image in a cloud catalog, to be used if new instances are created in the cloud from scratch, rather than by rapid migration.

Provisioning: This is the standard mechanism of ordering VM instances in an IaaS—the user orders a VM from the catalog, and the corresponding actual image is instantiated into a running instance.

Reinstall migration: From the point of view of an MIaaS cloud, the standard way of moving an application into same is to first provision a catalog image, and then to reinstall necessary software components, source code, configurations, and data into it. However, this is typically a very time-consuming and costly process.

Image-based migration: Image-based migration uses customer instances for migration of the application to the cloud. In classic virtualization, image-based migration is a standard (P2V) and can be very fast. However, because the image generated directly from the source instance does not enable the management part of the MIaaS cloud, heretofore, image-based migration has not been feasible with MIaaS clouds.

Rapid migration to MIaaS cloud: An extension of image-based migration, in accordance with one or more embodiments, which can handle the challenges of image-based migration, in an MIaaS cloud.

Figure 8:
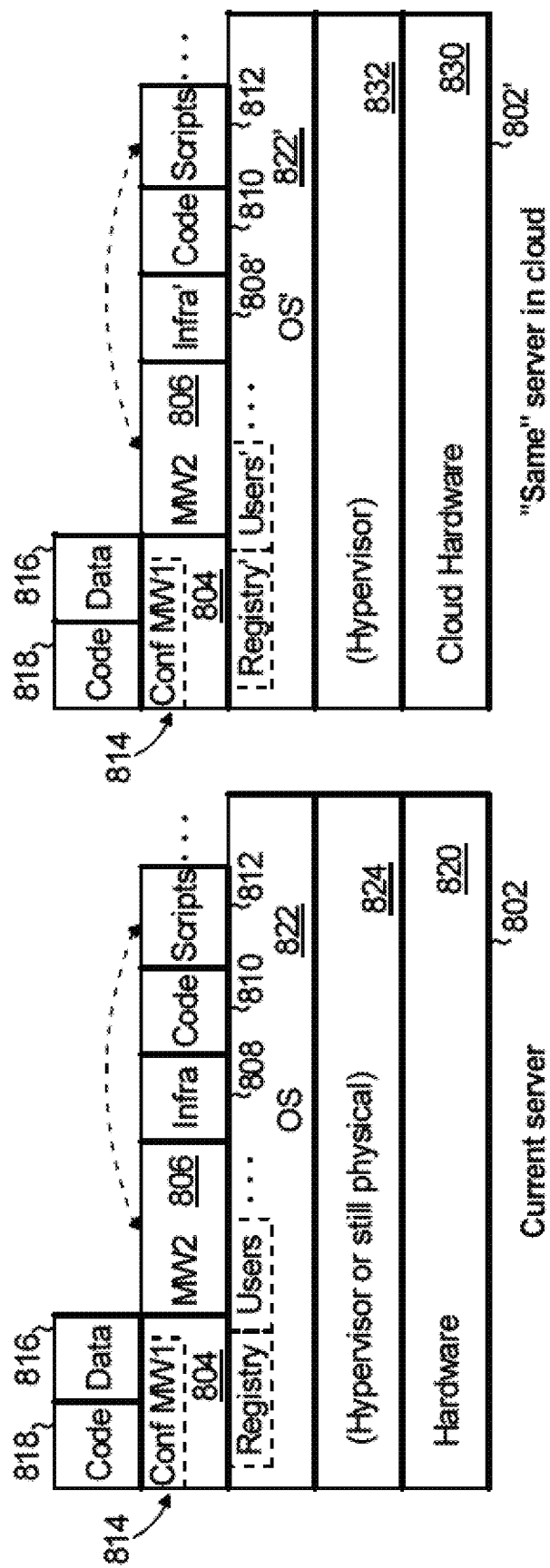
FIG. 8 shows a current server in a source environment and after migration to a cloud, according to an aspect of the invention.

Referring now to FIG. 8, with regard to rapid migration, the skilled artisan will appreciate that there are typically many things on a server 802; for example, middleware or other off-the-shelf software (MW) 804, 806; Infrastructure software ("Infra") 808 such as monitoring and provisioning agents; custom code 810; and/or scripts 812, e.g., for backup, scheduled cleanup tasks, data transfers, and the like. Of course, the server includes hardware 820 and an operating system (OS) 822 (typically with registry and users (not separately numbered to avoid clutter)). As seen at 824, the current server may be a simple physical server with an OS, data, and software, or may already be virtualized via a suitable hypervisor. Middleware such as 804, 806 typically has configurations 814, data 816 (e.g., databases), code 818 (e.g., SQL scripts), and is often associated with other scripts (such as database administrator scripts). Most of these do not need to be in standard locations. We have found that it is typically quite difficult to automatically find everything that is related to the running instances even of very common standard software such as web servers and databases.

In one or more embodiments, rapid migration in accordance with aspects of the invention is believed to be particularly suitable for an infrastructure-only migration, and for unchanged major OS version, i.e., when the goal is to get to an MIaaS cloud, but not to make other major changes. As seen at 802', when the "same" server is moved into the cloud, it now runs on cloud hardware 830 and hypervisor 832 is employed. Other than that, there are limited changes:

small updates in the operating system (now OS' 822')—namely, different drivers, cloud provider user IDs, IP address somewhat different infrastructure software (cloud management tools—now Infra' 808')

Figure 9:
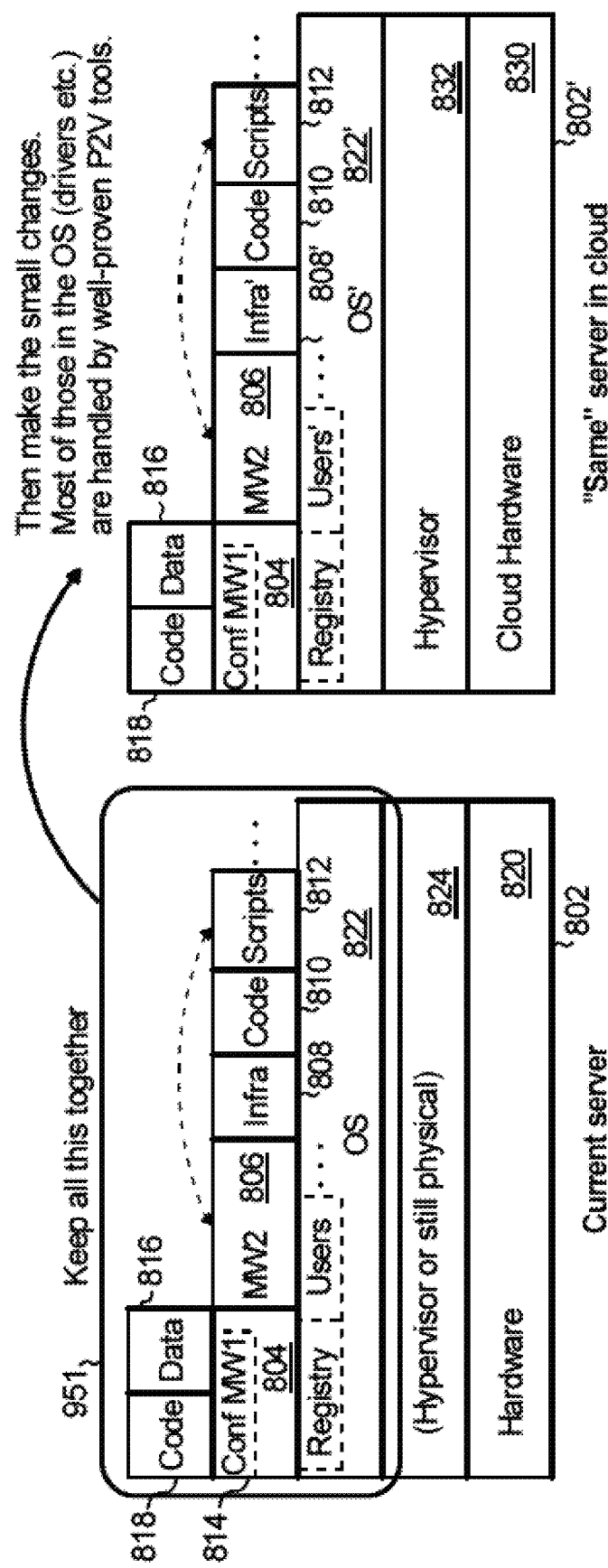
FIGS. 9 and 10 show alternative migration approaches for the server of FIG. 8.

One or more embodiments make use of the insight that it is advantageous to update the few things that change, rather than individually pick up all those that don't change, with a risk of forgetting something. Referring now to FIG. 9, the OS 822; MW 804 (including its configurations 814), 806; infrastructure 808, code 810, scripts 812, code 818, and data 816 are kept together, moved into the cloud, and then small changes are made to OS 822' and infra' 808'. Advantageously, in this approach, if anything does not work in a change, it is most likely only the cloud service provider-side infrastructure management (as that gets newly added), not the application (which remains essentially untouched). Of course, this assumes in the first place that the application can in fact be virtualized. The skilled artisan will of course appreciate, given the description herein, that extra care should be taken, e.g., that the new resources of the server additionally support the cloud management agents.

Figure 10:
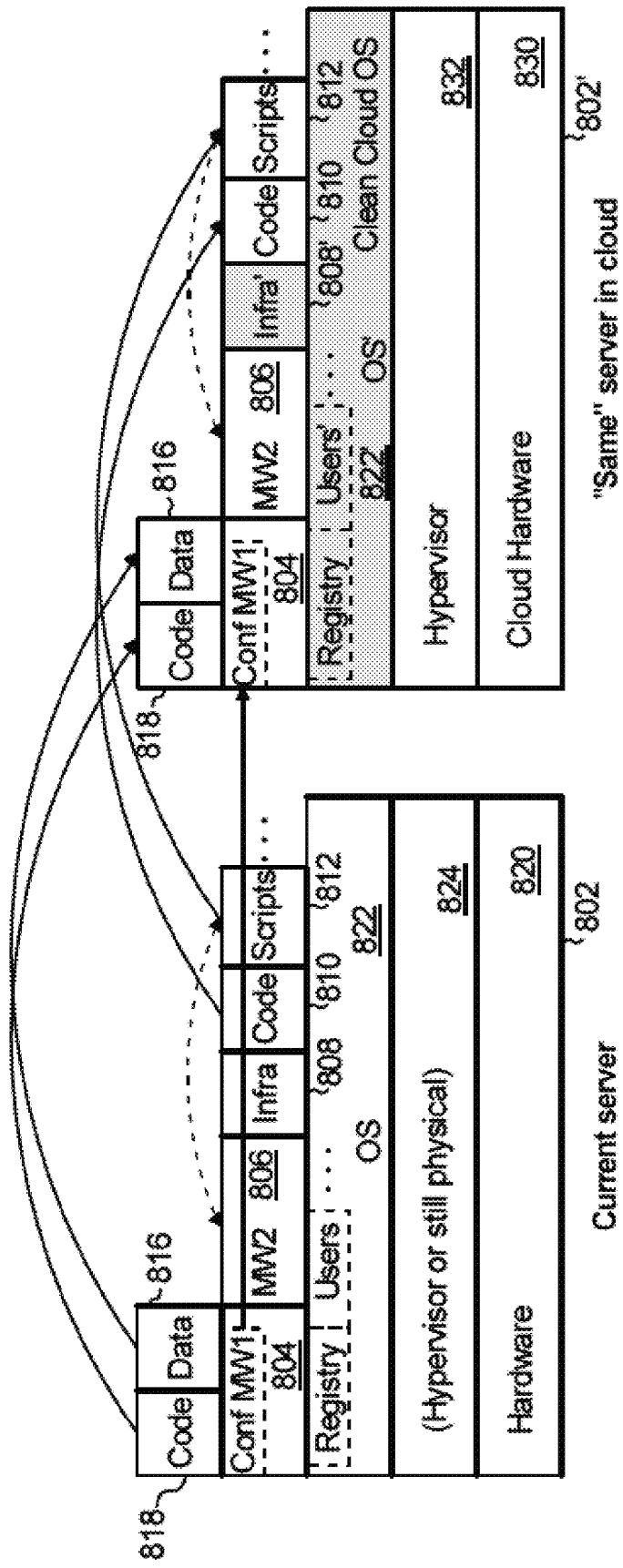

FIG. 10 shows an alternative approach (reinstall/re-platform) that does not employ the aforementioned rapid migration technique. This is what the MIaaS provider would typically expect its users to do, but is often not feasible in terms of time and money. In this figure, after provisioning an instance with an operating system OS' 808' similar to the original OS 808 from the cloud catalog, and freshly installing the off-the-shelf software, essentially everything is moved one by one. There is some current tooling available along these lines, but it is only available for a small subset of possible off-the-shelf software, and almost no tooling is available to move extras like scripts, code, etc., nor even just to list it all for subsequent transfer. It is also not in any way an easy option to move "everything else" after installation—OS, applications, and configs/data/custom code are highly linked, both in file systems and in OS data structures such as registries, in particular on WINDOWS.

Consider now core options of interleaving adjustments and registration in rapid migration, i.e., in the new technique described along FIGS. 4-7 and 9, i.e., Steps 406 and 408 in FIG. 4, or elements 556, 558, 570 in FIG. 5. Purely by way of example and not limitation, consider in particular several core options to add a registration flow for imported instances to an MIaaS cloud:

First option: Run the provisioning flow for the closest related catalog image (which the analysis and plan phase 524 decided that the instance will be adjusted to simulate). Then swap the instance generated from the catalog image for the imported instance, on which most adjustments have been already done (e.g., additional patching, security compliance adaptions). This may be done on the image file level for suspended images. Some adjustments on the imported instance may be needed after the provisioning, e.g., if the provisioned instance had some identity (such as an IP address) that now needs to be transferred to the imported instance because the MIaaS management requires it but cannot tell it in advance. Note that such swapping and post-swap adjustment cannot be done by a user of an unmodified MIaaS cloud; it needs special authorization and, in order to be reasonably efficient and secure, automation tooling to be added to the MIaaS management system.

Second option (see FIG. 11): Modify the provisioning flow so that it still performs most of the registration work, but at some point picks up the image of the imported instance instead of the catalog image. If the provisioning flow performs real-time actions on the images (e.g., agent installs) those can also be reused (rather than being done in adjustments before the registration flow). If possible, retain the common parts of the provisioning flow and the new registration flow as actual common components (common subprograms, sub-workflows, or the like)

Figure 11:
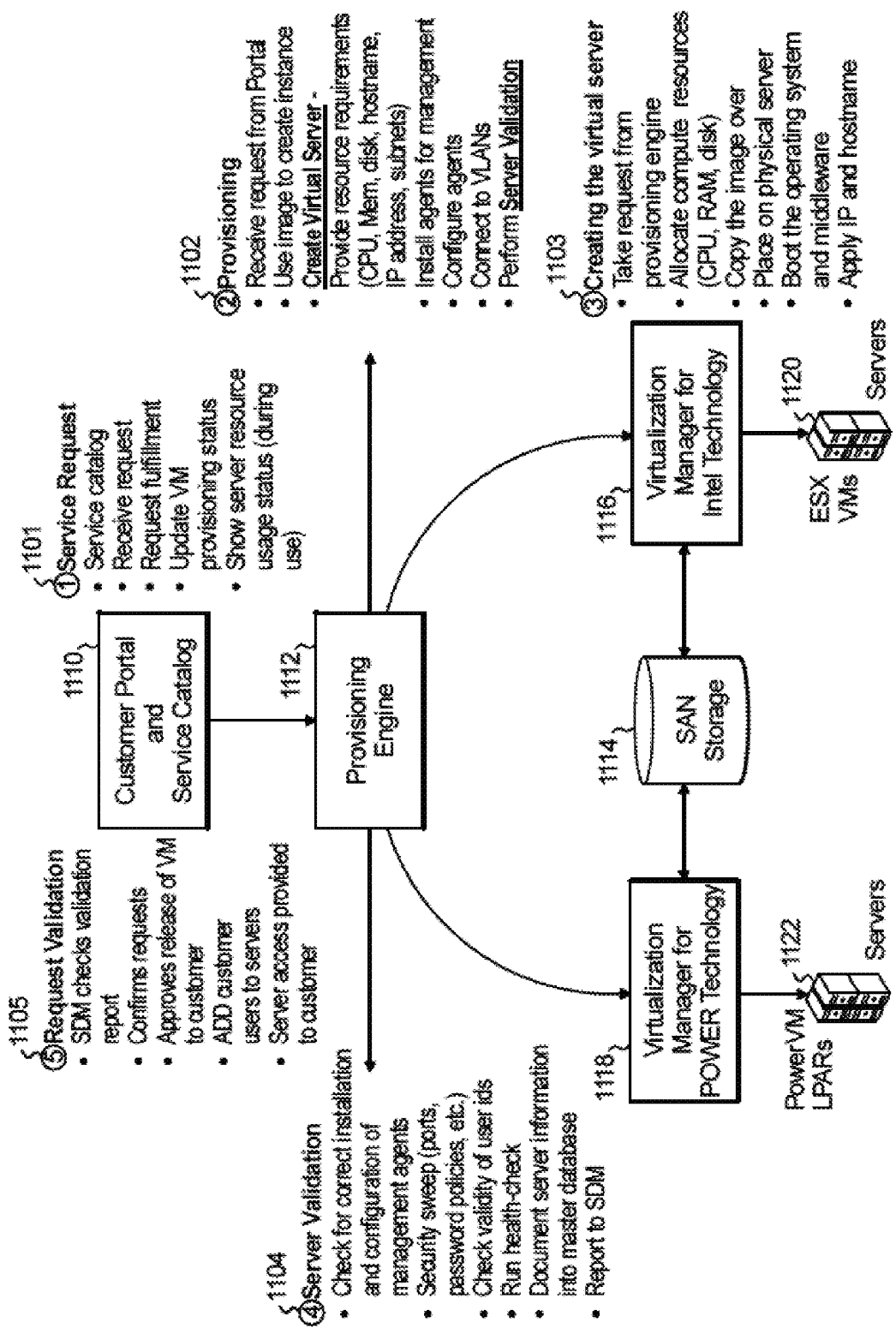
FIG. 11 shows an exemplary provisioning flow, according to an aspect of the invention.

Referring now to FIG. 11, depicted therein is an exemplary provisioning flow in an MIaaS cloud environment (IBM SCE+ is one non-limiting example). In step 1101, a customer accesses customer portal and service catalog 1110, which are part of the BSS (568, 696) of the MIaaS. In one or more embodiments, "Adoption" or "import" is a new service type in the catalog 1110 (compared with the MIaaS cloud as designed without the new rapid migration mechanism) and is available for certain roles. In some cases, this aspect can be implemented by a relatively small change in an existing user interface (UI) of the MIaaS cloud. Appropriate parameters may be passed through to a provisioning process described below. The service request may involve, as shown, a service catalog; receipt of a request, fulfillment of the request, and updates to virtual machine provisioning status. In some cases, server resource usage status is shown during use.

In step 1102, provisioning is carried out with provisioning engine 1112. MIaaS Provisioning can include receiving the request from the portal 1110; using the image to create an instance; the creation of a virtual server including provision of resource requirements such as CPU, memory, disk, host-name, IP address, and/or sub-nets; installation of agents for management, configuration of agents, connection to virtual local area networks (VLANs); and/or server validation. One or more embodiments, with regard to registration of imported images as modification to such a provisioning flow, pick up the imported instance instead of a catalog image in the sub-step "Use image to create instance" of step 1102. Hence this sub-step becomes the creation of an instance 558 in the production zone from the imported instance, in relation to FIG. 5. If the landing zone is physically separated from the production zone, this involves actually copying the adjusted instance 554 from the landing zone to the production zone. If the landing zone is virtual, that instance may even be kept in place, but an address (name, pointer) of it is now given to the provisioning flow.

In one or more embodiments of the rapid migration method, during creation of the virtual server, the exact CPU, memory, and disk are created as in the imported instance or a plan from Step 524 (because the cloud may not have images with the exact resource sizes as the imported image, the next-larger sufficient size will typically be chosen). Some embodiments employ dual-homed instances which have a cloud services provider internal IP address (for cloud management system of the MIaaS to access the instance) and a customer-facing customer address; this is typically different from the old IP address of the imported instance, and thus the address on that instance must be changed to the customer-facing address that the cloud management system provided.

It should be noted that words such as "must" or "shall" discuss items that are mandatory in an exemplary embodiment, but may be optional in other embodiments. No limitation to the claims is intended unless recited therein.

In some cases, with regard to the installation and/or configuration of agents, a new flow is provided for handling prior agents such as, for example, a performance monitoring agent or a backup agent, if the MIaaS cloud uses different agents or tools for the same purpose. Concrete, non-limiting, examples include Altiris products available from Symantec Corporation, Sunnyvale, Calif., USA, and products available from NetIQ Corporation, Houston, Tex., USA. The handling of such agents might include, for example, uninstall or an authorization reduction from administrator rights to user rights, or a policy change in the tool. Alternatively, however, this flow can be done as adjustments in the landing zone before even starting the provisioning flow.

In step 1103, the virtual server is created. In the non-limiting example of FIG. 11, this can be carried out using the virtualization manager 1116 for INTEL technology (e.g. making use of VMware ESX VMs (VMware, Inc., Palo Alto, Calif., USA) as shown at 1120) and/or the virtualization manager 1118 for POWER technology (e.g. making use of IBM PowerVM logical partitions (LPARs) as shown at 1120; International Business Machines Corporation, Armonk, N.Y., USA). In either case, suitable storage, such as storage area network (SAN) storage 1114 can be employed. Other types of technologies can be employed in other embodiments. This step can include taking the request from the provisioning engine 1112; allocating appropriate computing resources such as CPU, RAM, disk space, and so on; copying the image over; placing same on the physical server; booting the operating system and middleware; and/or applying IP and host-name. In some embodiments of the adoption of such a flow for registration in rapid migration, a further step includes preparing custom access for tests. In MIaaS provisioning without migration, such a test is not needed because this is a standard catalog instance, but here, an imported, adjusted instance is being dealt with, and it will be appropriate to carry out the user acceptance test 560.

In step 1104, server validation is carried out with the aid of provisioning engine 1112. This can involve, for example, checking for correct installation and configuration of management agents; a security sweep (as to ports, password policies, and the like); checking validity of user IDs; running a health check; documenting server information into a master database; and/or reporting to a suitable management tool such as the IBM Service Delivery Manager (SDM) available from International Business Machines Corporation, Armonk, N.Y., USA.

One or more embodiments advantageously employ automation for typical modifications in the adjustment workflow, so that these tests (e.g., security sweeps) typically do not fail—in fact these validation steps of the MIaaS cloud can be seen as the primary specification of what adjustments must be made in migration into this MIaaS cloud.

Step 1105 includes a final validation more on the BSS layer, in contrast to the OSS layer validation in Step 1104. This can include, for example, the SDM checking the validation report; confirming requests; approving release of the VM (i.e., instance) to the customer; the cloud services provider adding customer users to the servers (if not already there); and/or providing server access to the customer. In some embodiments, in migration the access will be provided earlier for testing, as described for step 1103

Exemplary non-limiting details will now be provided regarding a number of steps that may be carried out in one or more embodiments.

Discovery (Step 518)

In some embodiments, with regard to a first run—before first transformation planning, standard tools such as IBM Tivoli Application Dependency Discovery Manager (TADDM) available from International Business Machines Corporation, Armonk, N.Y., USA, the IBM Galapagos tool, and the like, can be run well in advance of the actual migration on the production systems. With regard to the IBM Galapagos tool, see, e.g., Galapagos: model-driven discovery of end-to-end application-storage relationships in distributed systems, IBM Journal of Research and Development archive, Volume 52 Issue 4, July 2008, Pages 367-377 and Nikolai Joukov, Birgit Pfitzmann, HariGovind V. Ramasamy, Murthy V.

Devarakonda: Application-Storage Discovery; SYSTOR 2010, Haifa, May 2010. In some cases, these tools can be preinstalled on an appliance (a small physical server) for easy installation into the customer environment 402. This approach unifies these tools, customer inputs, and loading from certain available customer repositories. In at least some cases, the cloud services provider can ask about additional access to complete file system copies of instances, in particular virtual instances 522, already (but nothing in the process relies on that).

In some embodiments, with regard to a second run, the same is carried out in a per wave fashion. That is to say, there is discovery again later, per wave, preceding migration by (for example) a couple of weeks. The same tools can be used, often with additional options and plug-ins to obtain more details. After this second run of discovery 518, in one or more non-limiting examples, a change freeze is implemented for code and configurations, so that the subsequent steps can rely that the information from discovery is current.

Analysis and Planning (Step 524)

This phase decides whether business applications are capable of being migrated to one or more MIaaS cloud environments (SCE+ is a non-limiting example) and which migration method to use. This is assumed to be integrated with general migration planning tools (for migrations and IT transformations of other types than to an MIaaS) that an organization might have, e.g., the IBM Migration Factory. Within this tool, the migration to MIaaS should share information such as for non-virtualizable software, software-OS-compatibility, and upgrade costs with non-cloud migration. Those might, e.g., be available as static tables in a database underlying a planning appliance. One significant criterion for what workloads go into the path of rapid migration to an MIaaS cloud is that they already have the correct major OS version. For example, if the image catalog of an MIaaS cloud contained only images with Windows 2003, 2008, and Red Hat Enterprise Linux (RHEL) 5.6 as operating system versions, the planning might decide to only use rapid migration to this MIaaS cloud for source instances 520 or 522 that already have one of these 3 operating systems, or at most additionally RHEL 5.1 to 5.5 (so that a minor upgrade is needed in adjustment). If there is non-virtualizable software on an instance that has one of these operating systems or other exclusion criteria (special hardware, potentially clusters), this instance still has to go to a different target environment, or be significantly remediated first (step 526). In some cases, regulated workloads are not migrated, but this is not intended to limit the scope of the claims unless expressly recited therein. In some cases, this aspect is implemented via extended static tables and discovery to minimize potential issues; although the skilled artisan, given the teachings herein, will appreciate that standard analysis techniques that analyze the possibility of physical-to-virtual techniques, suitably modified, can be employed to implement this aspect.

In one or more embodiments, this phase also includes analyzing compatibility of the patch status of the source instance with standards of the MIaaS cloud; this is specific to migration to MIaaS cloud.

In one or more embodiments, this phase also includes the selection of an image size. In at least some cases, simply retain the size, unless it is necessary to increase it to fit the new agents in that have to be installed during adjustments. If the MIaaS cloud only allows certain fixed image sizes (in terms of CPUs, memory, disk storage etc.), it may be necessary to resize the image later to the next larger suitable size; however, this should not be an exclusion criterion.

In one or more embodiments, this phase also includes wave planning, i.e., grouping servers that will be migrated together. This can be carried out, for example, using standard migration tooling (such aspects have been disclosed, e.g., in the aforementioned United States Patent Application Publications 20110213883 and 20120109844); using dependencies, locations, subnets, and so on; optionally, an attempt may be made at this stage to free hardware and the like. It should be noted that in the general case, there is no guarantee that there will not be cross-wave dependencies—some environments are too interlinked.

In at least some cases, security zones should be planned in this phase and certain cloud pools (i.e., groupings of instances that the cloud provides) and the like should also be planned. Refer to the discussion of the request GUI below with regard to FIG. 14.

Baseline Test and Backup (Step 528)

In the baseline test, the customer (or the migration team) performs all the tests that they will also apply after migration, to make sure the existing system passes all those tests. In one or more embodiments, the actual tests are the same as in user acceptance testing (UAT). This can involve, for example, some UAT tests that write into databases or the like such that they cannot be performed on production servers (e.g. production zone 574); test servers from the customer environment may then be used for the baseline test can then be employed, although the actual workload deployment there may be simpler than the production configuration.

In at least some cases, backup is performed by the customer, and the customer validates that it worked, as instance capture can cause problems. In some cases, the cloud services provider does not make backups on the customer side.

In some cases, the customer may carry out additional steps in this phase. For example, to enable the instance capture processes discussed just below, there are other things the customer should do, in particular:

ensure there is a change freeze for their own developers;

give the migration team (which can be in-house, from the cloud services provider, or another party) root rights on the instance to be migrated; and give the migration team a realistic change window for the migration, as physical-to-virtual (P2V) counts as a change, even in cases where it's run in the background.

Instance Capture

Figure 12:
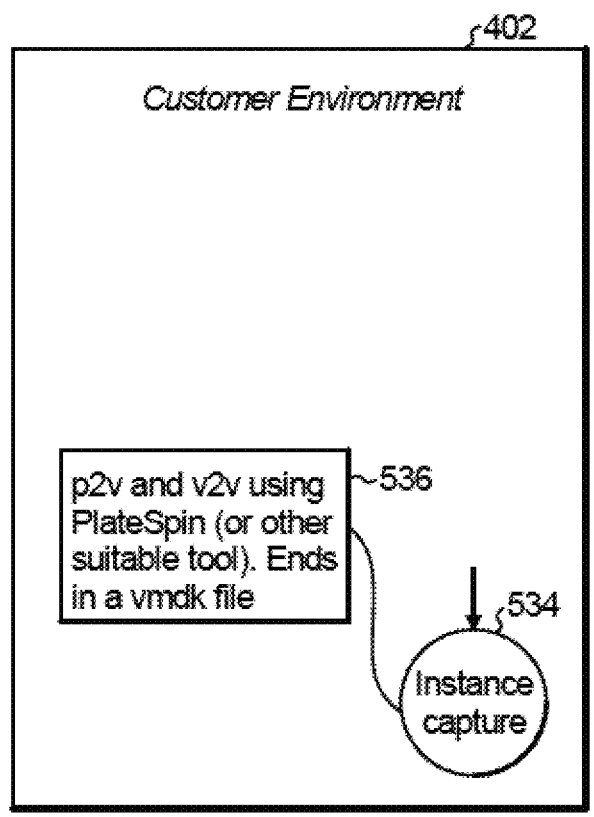
FIG. 12 shows instance capture, in accordance with an embodiment of the invention.

Multiple variants can be employed for this step. Refer to FIG. 12. Non-limiting examples will be presented, all of which are valid for arbitrary transfers to virtualized environments:

If the source instance 520 in the customer environment 402 is still physical, a P2V operation (physical-to-virtual) will be involved as shown at 536. There are standard tools for this, e.g., the aforementioned PlateSpin tool, and the VMConverter tool available from the aforementioned VMware, Inc.

If there are multiple drives, they may be treated by the same or different tools. A data drive transfer may, e.g., start earlier than a boot drive transfer and be done with a resynchronizing tool such as IBM Softek TDMF software, to accommodate large amounts of data with short change windows.

If a P2V operation is needed, it might be local (i.e., first creating a virtual machine or image in the customer environment 402) followed by transport; or it might be integrated with the transfer, i.e., the new virtual machine or image file immediately exist in the target, i.e., the "landing zone" 572.

Significant customer-facing aspects in one or more embodiments include:

The migration team needs to get root/admin rights on image

If non-boot volumes are present, and transferred by a resynchronizing tool as described above, the tool must be installed beforehand.

A change window should start here at the latest

Applications are typically shut down during P2V time

There should be a "starting zone" where the captured images go awaiting transport, in cases where all the transport is over a WAN 514 (at least for large images, small ones may go directly via the PlateSpin tool, for example).

Instance capture may include a suitable shut down process. In some embodiments, the enterprise applications (aka workloads) are shut down before a potential P2V step (if this has not already done during backup). This means to shut them down from the point of view of users—in a multi-component workload, it does not necessarily mean shutting all components down; e.g., just the frontend web server might be disabled. It is safer not to even have any software components running during the capture step (cold P2V), but it is possible with the given tools to do it while things are running (warm P2V). The application owner, in one or more embodiments, defines what to shut down, and preferably carries out shut down, because the migration team, being tasked with infrastructure-level tasks, may not have full insight into this.

Instance capture may include, for example, the P2V step for physical servers. For already virtualized servers, in particular on VMware, little is required in this step. In one or more embodiments, after the end of P2V, changes are no longer allowed on the source (if this has not already been disallowed during backup), as they would not be transferred to the target. That is, typically the entire source instance is now shut down to ensure this. If the instance was already virtualized, it is shut down either before the image to be transported is finalized, or in an integrated transport, at the latest before the final resynchronization within that transport.

If a capture step is separate from the transport step, a "starting zone" should be provided for the captured instances, i.e., storage space for them that is close to the transport technology.

Transport to Cloud Services Provider (Including Data)

Data transfer may by over a network or via a physical medium, depending on network bandwidth and physical distance. This can be done, in some cases, with a resynchronizing tool (one example is IBM Softek's TDMF), especially for large images or for non-boot drives. A tool such as TDMF should be installed beforehand, and if there is a large data set as non-boot drive, background data transfer may be started earlier than the P2V. If it is certain that the boot drive does not contain normal "data," in at least some cases, it may be feasible to only do a change freeze on that, i.e., only resynchronize other drives. Due attention should of course be given to customer acceptability.

There should be sufficient bandwidth to the landing zone, typically much more than the standard WAN connection to the MIaaS cloud as it will be needed in the business-as-usual phase 711. In some case, special optical lines may be employed. It is possible to add WAN optimizers to same (such as those available from Riverbed Technology, San Francisco, Calif., USA). In at least some embodiments, sizing should be for the maximum wave load, rather than average. Another option is to use physical storage media such as a high density SATA (Serial ATA (SATA or Serial AT Attachment)) disk array and to transport it by courier or similar means. By using a resynchronizing tool to copy data onto them, resynchronization via the network is possible after that.

Landing Zone

One or more embodiments employ a "landing zone", i.e., an environment in the same data center as the ultimate cloud place of the particular instance, and with the same hardware and hypervisor version (e.g., same ESX version for VMware ESX VMs), where such imported instances can be run. In some cases, with regard to the initial transport, if it was done separately for an image file, all that is needed is enough storage space, as for any transport. However, at the latest for the first functional test, a runtime environment for the imported instance should be available. In one or more embodiments, there will be at least one landing zone per data center, as further WAN transfers are not employed once an instance is transferred to the cloud services provider. Potentially there may be even more landing zones, in particular if the data center contains multiple physically separated or separately managed production zones; then there can be one landing zone per production zone.

Any security zoning of the customer that needs to be replicated can be done virtually, i.e., via the cloud service provider's VLANs and firewalls, but unless the customer requires physical separation of certain security zones also in the production environment (not usual in clouds), the instances can all land on the same hardware, controlled by the same management software.

As discussed before, the entire landing zone may be physically or virtually separated from the (corresponding) production zone. Exact placement and address are pertinent considerations in one or more embodiments. In the case of virtual separation, one preferably imports each instance physically close to where it will stay after registration, so that no additional copying is needed. E.g., if the production zone is substructured into several units, where, e.g., each unit is controlled by a VMware vCenter Server(s) or a TSAM (IBM Tivoli® Service Automation Manager software available from International Business Machines Corporation, Armonk, N.Y., USA), and the landing zone is virtual even within such units, the instance can be maintained on the same physical server and storage when transferring it from the landing zone into the production zone. For example, the instances still belonging to the landing zone can have a flag "tolerated," so that TSAM knows they are there but not yet managed in the production zone sense. However, if for additional security and lower complexity, the landing zone resides in other units than the production zone, then actual copying is needed, and the registration flow, which is largely executed in the production zone, must be given an address of the instance in the landing zone and the authority to copy from such addresses (e.g., by opening a special port in a firewall).

Functional Testing

After transport to the cloud services provider, testing should be carried out to verify that the P2V and transport worked correctly. For this, standard methods employed in non-cloud P2V transformation can be used, as so far no MIaaS-specific adjustments have been made. A minimum test is that the instance can be started at all. In some cases, this testing may be limited to OS, storage, and the like; in other cases, it may be extended to whether software or even the entire business application still works. In some cases, there may be a list of what was running from the time of shut-down. In some cases, a capability is provided by the migration team for automatic restart. On the other hand, in some cases, this is handled by the customer. The test is typically not identical to the complete baseline test.

Backup/Snapshot Instance Before/During Adjustment

Directly after the transport into the cloud services provider, and optionally between any steps where tests are performed, a backup may be made (with a VMware snapshotting technique) to enable easier remediation. However, in particular with mature processes, one may also decide not to make these intermediate backups in order to save time in the most common correct case. Backup is particularly useful before/after steps that involve a human decision, while automated steps can easily be re-done from the first backup.

Remediation 550

In at least some cases, this is a largely human step. If something goes wrong, it typically needs debugging. If too much difficulty is encountered, the instance and possibly the entire business application should be taken out of the current wave, i.e., the current weekend's (or other pertinent time period's) migrations. It is desirable to document such cases well, so that in the future such cases can be caught in the phases of Discovery 518 and Analysis & Planning 528.

Instance on Cloud Service Provider's VMware ESX Virtual Machines or the Like

At this time, start the adjustment flow with the running instance that just passed functional testing.

Adoption and Adjustment Sub-Flow 556

In at least some cases, adoption (referred to herein interchangeably as registration) and adjustment are carried by small modifications of the provisioning flow as discussed above in reference to FIG. 11. For a more general view, concentrating on the steps specific to migration (FIG. 11 showed the "non-migration" steps and the specific migration steps were discussed in the text) reference should be had to FIG. 13. In step 1302, determine whether any pre-adoption adjustments are needed or desired, i.e., adjustments that are done before and separate from the any registration steps, i.e., steps that involve the MIaaS Cloud BSS and OSS 568. This determining may refer as needed to a decision document or the like as output by the Analysis and Plan step 1306. In step 1304, start the adoption flow with appropriate instance parameters (and cloud zone) from analysis and planning step 1306. In step 1308, the portal flow passes the "adopt" parameter through, i.e., a parameter that indicates that the flow variant needs to be executed where an imported instance is registered. (This flow modification will be implemented in the system that is the basis of the MIaaS portal, for example, in IBM Tivoli Service Request Manager (TSRM) software available from International Business Machines Corporation, Armonk, N.Y., USA). In step 1310, the provisioning takes place and the imported instance is picked up and any new adjustment sub-flows are called (can be carried out, for example, in TSAM). In step 1312, a virtual server is created. (This is not needed if the instance remains the same, i.e., if the landing zone is purely virtual as described above.) (This can be carried out by the normal instance creation internal to the MIaaS cloud, for example, in TSAM). In step 1314, carry out server validation of the MIaaS cloud (assuming the MIaaS cloud has that and does not entirely rely on the prior steps to succeed without test); preferably with no changes, but more problems may be expected to be identified at this point for migrated instances than for instances provisioned from catalog images, and thus more time for remediation may be reserved.

In step 1316, prepare the instance for customer test access by providing appropriate keys to the customer. In step 1318, fulfillment of the request (i.e., the initial input to this flow) is validated if needed; this can be done via a shortened and automated process in one or more embodiments, where this is just a sub-flow in a larger migration flow, compared with the normal situation where this was a customer request to the MIaaS cloud portal.

The depicted sub-flow corresponds to step 556.

Backup/snapshots and tests (the neighboring overall steps) may occur between any of these sub-flows; even inside them, in particular in the provisioning flow 1310 after individual adjustments.

Start Adoption Flow with Instance Parameters 1304

In a non-limiting example, the portal is implemented in TSRM and includes a graphical user interface (GUI) and REST API (application program interface). In one or more embodiments, starting via REST API is believed to be appropriate as all parameters should be clear from the results of the analysis and plan step 524. Those may reside in a database or another well-defined repository so that they can be retrieved by software. While in FIG. 5, the analysis and planning component is depicted in the customer environment 402, where the discovered data arise, at some point the relevant part of the data for the adjustments step 556 should be transported to the MIaaS cloud environment 410, in particular its Cloud Management zone 680 (this arrow was omitted in FIG. 5 to avoid clutter). The transfer agent 682 and transfer core component 690 can take this on as an additional task besides transporting images. However, in some cases, it may be desirable to initially start via a GUI in order to more easily track the activities.

In one or more embodiments, the results of the analysis and plan step 524 relevant for this sub-step should include the instance data, zoning plans, and the like so that the correct parameters can easily be input to the REST API or entered by a human operator into the GUI.

A naming/location scheme should be provided for instances in the landing zone so that at this point, information regarding which instance is to be registered can be input. In one or more embodiments, this is the name under which VMware vCenter Server knows the instance in question. In one or more embodiments, an automated check of the GUI inputs (size, OS) with the actual values of the instance is useful.

Figure 14:
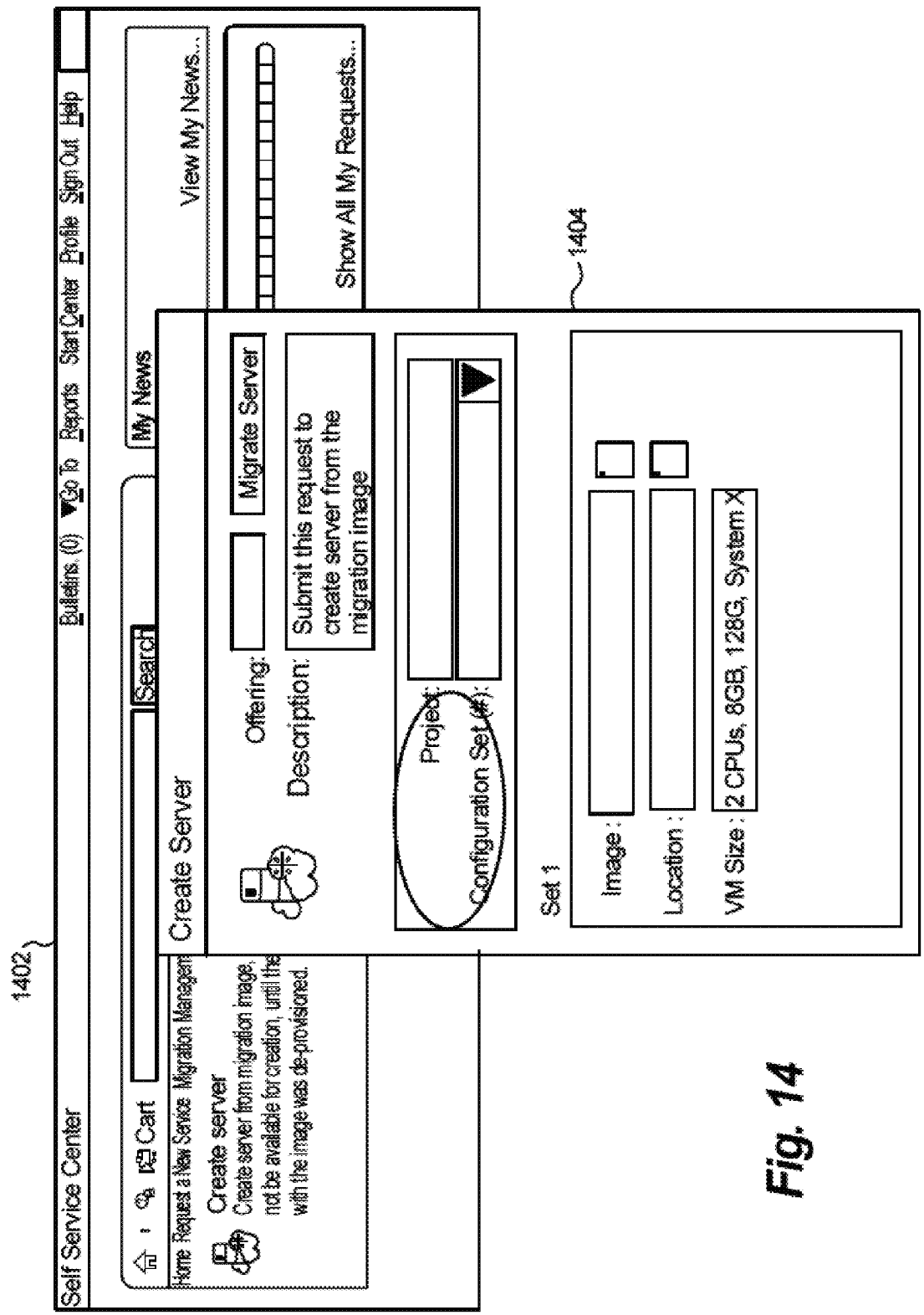
FIG. 14 shows an exemplary screen view of a "create server" pop-up, in accordance with an embodiment of the invention.

FIG. 14 shows an exemplary "Create Server" pop-up 1404 from an MIaaS portal GUI Portal Design self service center 1402. Migration servers are grouped into a project, and if each migration request can contain more than one instance (called image in this GUI), a "Configuration Set" option is provided. The user is given the option to fill in the name of the image he or she wants to use, or to click a magnifying glass to see a list of available images. VM size info should be part of the metadata for the image in one or more embodiments, possibly with an option to change same. The "migrate server" button starts the actual registration flow. The portal may now perform certain activities, such as recording the started flow in storage, and allowing its status to be queried from the GUI or the REST API.

Portal Flow—Passes "Adoption" Parameters Through 1308

Typically, the portal is a separate software component 1110 (in particular, part of the BSS) from the provisioning engine 1112, the component that carries out the actual registration (often a workflow engine, and part of the OSS). Hence the portal transfers the registration request to the provisioning engine. Compared with the normal provisioning request transferred between these two components, the choice of "registration" or "import" of a migrated instance, and the location/name of the instance is passed through, i.e., those are new parameters in that request in that API.

Provisioning Flow—Instance Pickup Step 1310

In one or more embodiments, based on a suitable naming/location scheme in the landing zone, and the provisioning engine 1112 (e.g., TSAM) obtaining the name/location of the instance to adopt from the portal 1110 (e.g., TSRM), the pickup is clear. In a non-limiting example, the name of the instance in an underlying VMware vCenter server may be used. This name might not be globally unique, but should be acceptable if the hostnames are used, which can otherwise be assumed to be all different already.

In embodiments where the landing zone is physically separated, certain firewall settings and a copying process to implement the actual pickup may be employed (which are a bit different from taking an image from the MIaaS image library).

Provisioning Flow—Adjustment Overview 1310

Figure 15:
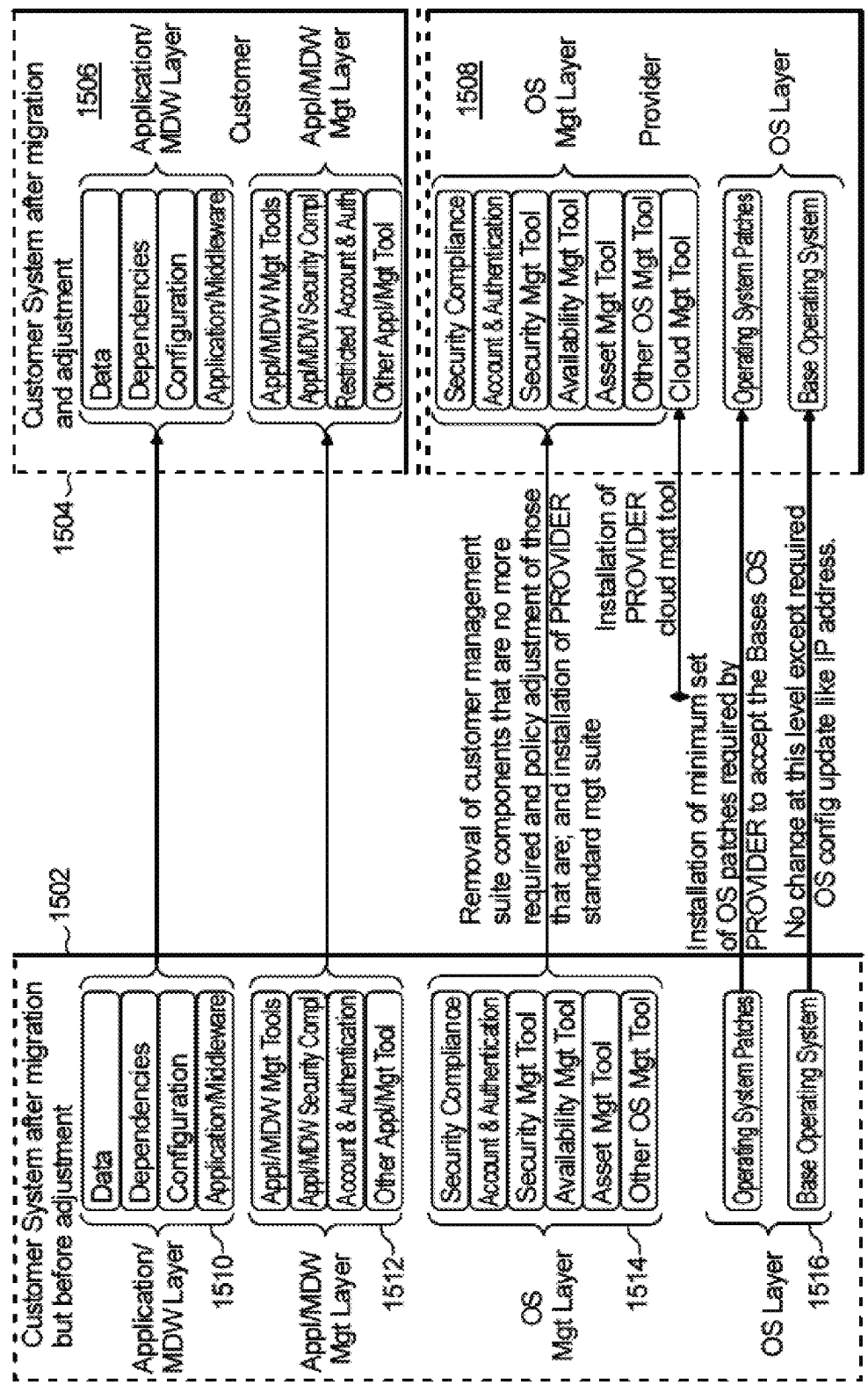
FIG. 15 shows an exemplary overview of adjustments in a provisioning flow, according to an aspect of the invention.

Turning now to FIG. 15, at 1502, note the customer instance after migration but before adjustment, i.e., the instance on a cloud hypervisor 554 in the landing zone directly after transport 538, and at 1504, the customer system after migration and adjustment (broken down into customer portion 1506 and cloud service provider portion 1508), i.e., as it will be in the production zone at 558. With regard to application/middleware layer 1510, little or no change is typically planned at this level (in particular because migration only to an MIaaS cloud, not a PaaS cloud, is considered in this example), except some configuration changes due to potential change of some basic OS configuration aspects such as IP address. In one or more embodiments, applications are not touched in this flow, inasmuch as P2V typically works well and this flow can be implemented with standard P2V techniques. With regard to application/middleware management layer 1512, little or no change is typically planned at this level, except some configuration changes in terms of security and due to potential change of some basic OS configuration aspects such as IP address.

With regard to OS management layer 1514, this flow includes removal of customer management suite components that are no longer required and policy adjustment of those that are; and installation of a standard management suite of the cloud services provider as well as a cloud management tool of the cloud services provider (with regard to the latter, in at least some cases, agents are implemented in the previous aspect, and central tools are already present). In some cases, installation is implemented via a standard provisioning flow. Removal and policy adjustment are significant tasks.

It should be noted with regard to aspects 1512, 1514, that some tools may be common for the OS and App/MW layers.

With regard to OS layer 1516, in one or more embodiments, a minimum set of OS patches are installed as required by the cloud services provider to accept the Base OS (in an alternative embodiment, this can be implemented as a separate flow within otherwise BAU cloud management). In some cases, an "open ports" check is carried out. In one or more embodiments, no change is needed at the base operating system level except for required OS configuration updates such as IP address.

Options to Handle Agents

In one or more embodiments, significant options, to be decided per agent type, include:

Can certain agents be ignored? (Easiest flow)

Must some agents be retained? In a non-limiting example, there may be a definite sentiment to keep AD (Active Directory authentication product available from Microsoft Corporation, Redmond, Wash., USA) and Altiris (for applications). In one or more embodiments, everything that is used for application management should stay, possibly with changes.

Should some agents be deactivated? This means shutting them down, but not uninstalling them. This is an option where agents no longer seem needed, but from the given information this is not quite clear yet and thus uninstalling is risky.

Can/must some agents be completely uninstalled? In some cases, this may be appropriate to tidy images up, or because the agents need resources (e.g., NetIQ needs significant CPU for its monitoring). In one or more embodiments, complete un-installation is never mandatory, as the customer can have all sorts of things on these servers and the cloud service provider does not judge that.

Agents are typically not allowed to have root/admin rights. At this point, it should be determined whether those that must be retained will run without root/admin rights; and what more explicit rights do they may need. An example is Altiris to only patch applications.

In some embodiments, the cloud services provider may inquire of the customer as to how the customer employs these tools, what policies the customer has, where the tools are installed, and so on.

It should also be noted that any changes planned by the cloud services provider may need a significant new discovery effort—at least if the customer's installs are as variable as those of other software, and as little standardized.

Minor Version, Fixpack, and Security Patch Updates

It is worth noting that the BigFix tool, now known as IBM Tivoli Endpoint Manager, available from International Business Machines Corporation, Armonk, N.Y., USA, is believed to be one particularly useful tool for security patches; however, other embodiments may use other tools.

Change of Addresses in Other Components

In a non-limiting example, the following address choices are made:

The images retain their DNS names, i.e., during cut-over the customer will change the DNS entries for their domains. (This is much easier than changing the DNS names, which may be used inside many components of the application/middleware layer 1510 and its management 1512.)

The instances get two new IP addresses, on new virtual NICs (network interface controllers), to enable management and backup tasks of the MIaaS cloud without interfering with the normal traffic over customer IP addresses and (virtual) NICs.

The IP addresses from the customer environment are replaced by addresses in a subnet of the MIaaS cloud production zone; this is what should be entered in the above DNS entries.

Hence, in one or more embodiments, there is no need to change other servers or clients addressing the migrated instances, assuming the other servers or clients use DNS names (rather than using IP addresses directly); this has become increasingly common.

In some cases, where it is desired to reduce costs, the migration team cannot readily determine whether the customer used IP addresses for addressing. In such cases, it may be appropriate to assign to the customer a requirement to ensure that such is not the case. If this requirement is violated, problems may occur in user acceptance testing 560, and remediation will return the instances or entire workloads to the customer. This problem is independent of the migration path or target, in particular of the fact that migration is to an MIaaS cloud.

Create Virtual Server 1312

In one or more embodiments, if it is possible to just retain the instance and at most put it into a different VLAN via virtual switch and firewall changes, then it is not necessary to create any server at this point. Otherwise the virtual server creation works exactly as in standard provisioning of the MIaaS cloud.

Prepare Instance for Customer Test Access (Keys)

At this point in the adoption and adjustment flow, all significant things that need to be done on the instance itself have been carried out, and the customer is given access for testing the image as well. Most customer IDs should, at this stage, still be on the instance or the respective active directory (AD). Those that changed due to rights reduction of agents should typically be set already. In some cases, the cloud services provider may need to hand out keys if access to the image is key-based. In one or more embodiments, this works the same as in the provisioning flow for catalog images described elsewhere herein.

Server Validation 1104

The validation as such can be unchanged from the provisioning flow for catalog images. In one or more embodiments, failure at this point is believed to be significantly more likely in the case of a customer instance than in the case of a cloud services provider catalog image. In at least some cases, the cloud services provider may provide appropriate remediation.

It will be preferable to automate as much as possible of this validation and also of appropriate remediation if tests fail. Even better, however, wherever automated tests and remediation can be done at all, it may be advisable to undertake such aspects in the already in the adjustment step, even if they are repeated again in the server validation phase for compliance or audit reasons.

Request Validation 1105

In the migration scenario, where it is known in advance what will happen on each weekend (or other period of time), this aspect is preferably kept short and largely automated. The final approval from the customer after UAT may still need manual entry though.

At this point, the overall rapid migration flow from FIG. 5 can be resumed, after the details of adoption and adjustment (Step 556 and the subsequent transfer of the instance into the production zone, as shown in 558). Now the user acceptance test (UAT) 560 takes place (typically not only of one instance but of a business application supported by this instance and possibly others). If it fails, a manual decision should be taken, together with the customer, bearing in mind the following aspects:

the issues may be minor ones that can be fixed locally in the cloud production zone 574 (e.g., DNS or firewalls not brought up correctly)

it may be known that an adjustment failure is the issue—the particular adjustment may be skipped, e.g., a particular security patch. If the individual operation (such as an attempt to install a security patch) doesn't come with a safe roll-back, the cloud services provider can roll back to the previous stored instance. If there was a manual decision in this adjustment, the cloud services provider can, in some cases, try again with a different decision.

In some cases, if it is not known that the issue is an adjustment failure, or issues cannot be repaired within the change window, or the variance goes beyond a certain threshold (e.g., more than five (for example) security patches can't be applied) then cancel the migration of this instance (and possibly of the entire business application). Restart the customer instances 520 or 522, typically based on the backup 532.

Cut-Over and Taking New Instances into Use (564)

If the UAT is passed, the instances of one business application or other migration unit in the cloud begin to be used by the customer. In the addressing choices are made as in the example above, the DNS of the customer is changed at this point; this can include changing reverse DNS entries—possibly as part of a standard procedure. In some cases, the change window can end here. If the customer had specific warnings, such as "application down" on a web entry page, they can now be taken off Appropriate customer training can be provided if desired.

It is worth repeating that one or more embodiments offer the advantages of traceability and/or roll-back capability. Furthermore in this regard, traceability is a significant advantage and it is quite helpful for managed environments to have every step and especially adjustments done to the image clearly documented. The adjustment engine as well as TSAM/TSRM have the ability to create instance-specific logs for fully-transparent/change-controlled migrations. With regard to roll-back capability, the adjustment engine operates in a step-by-step mode and offers the ability to roll-back a certain adjustment if something went wrong. That ability together with the snapshots creates a relatively safe environment to execute the needed migration/adjustment steps.

Recapitulation

Given the discussion thus far, it will be appreciated that, in general terms, an exemplary method, according to an aspect of the invention, includes the step 404 of transferring a foreign instance 684 from a customer environment 402 to a target infrastructure-as-a-service cloud environment 410 as an image. This step can be carried out, for example, via component 690, optionally by interfacing with agent 682. A further step 406 includes adjusting the foreign instance to standards of the infrastructure-as-a-service cloud environment to obtain an adjusted instance. This step can be carried out, for example, via component 692. A still further step 408 includes registering the adjusted instance into a management system (generally 410; specifically 696, 698 in one or more embodiments) of the infrastructure-as-a-service cloud environment.

In general, the adjusting may include adjusting the foreign instance while it is running, or alternatively, adjusting the foreign instance as the aforementioned image.

In some cases, the registering includes running at least a portion of a provisioning flow (e.g., as shown in FIG. 11) for a standard catalog image of the infrastructure-as-a-service cloud environment (the standard catalog image is selected for similarity to the foreign image); and swapping the image of the foreign instance for the standard catalog image. In general, such swapping may be carried out during the provisioning flow or after the provisioning flow; when carried out during the provisioning flow, it is referred to as picking up the image of the foreign instance, during the provisioning flow, rather than swapping. Furthermore, swapping "after the provisioning flow" should be understood to include being after step 1102 (and optionally after most or all of step 1103, but before 1104).

Figure 13:
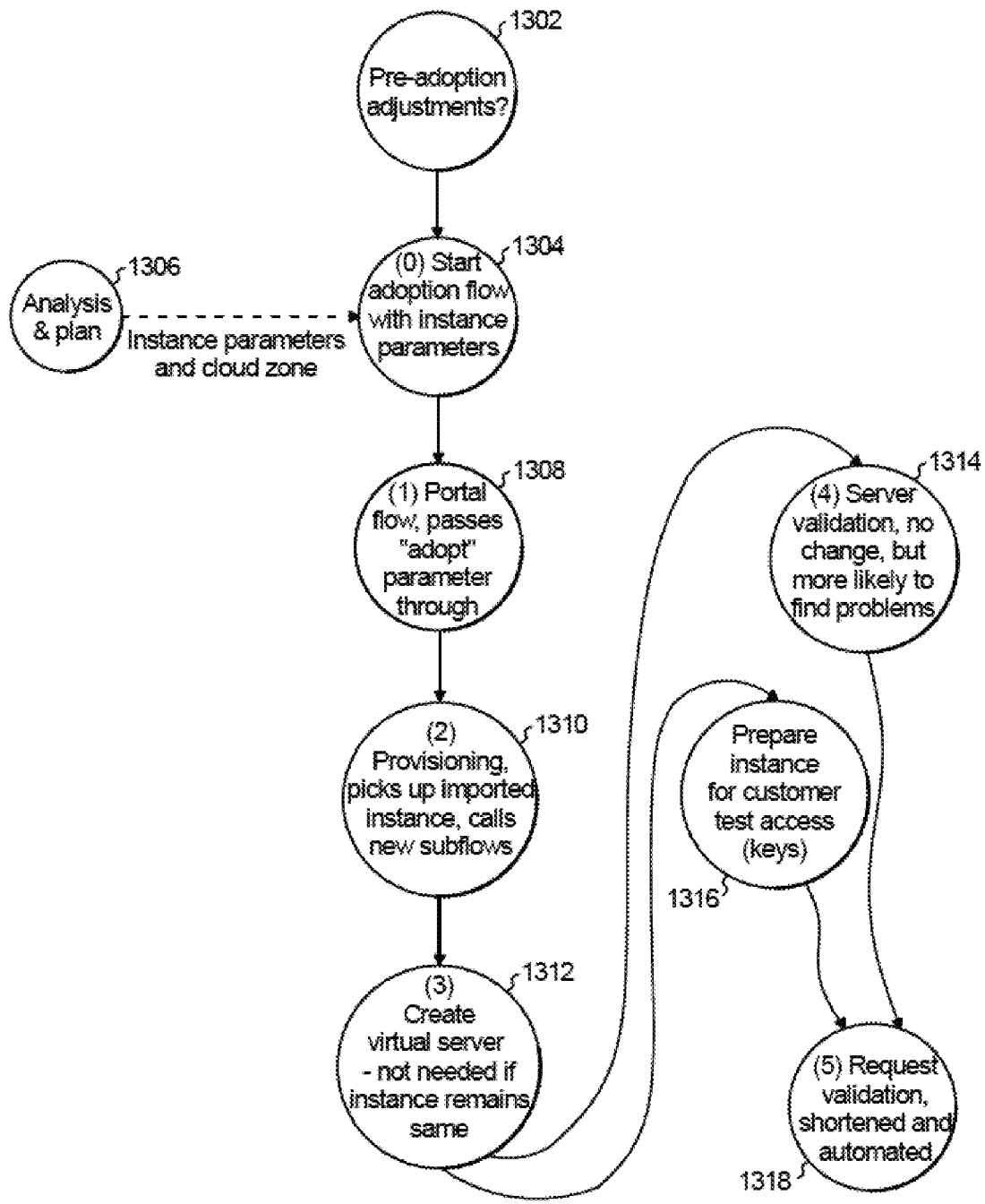
FIG. 13 shows an adoption and adjustment process, in accordance with an embodiment of the invention.

Furthermore in this regard, consider three ways to proceed. Recall that provisioning flow for catalog images is shown in FIG. 11. In some cases, proceed through the provisioning flow almost to the end like steps 1101-1103 to obtain a provisioned instance; then discard that provisioned instance and replace it with what is being migrated. (This is referred to as "swapping") In some embodiments, the catalog image is never really put on the server. At the point where the catalog image would be copied, pick up the instance and let the rest of the provisioning flow work on the migrated instance so there is less work to do at the end (FIG. 13 step 1310). In one or more embodiments, this point is in the sub-step "create virtual server" of step 1102. Such creation is detailed in step 1103. Within the virtual server creation, this point is in the sub-step "copy the image over"—in this aspect, the image of the imported instance instead of the catalog image is what is copied.

As noted, in one or more embodiments, the infrastructure-as-a-service cloud environment is a managed-infrastructure-as-a-service cloud environment. Thus, in such cases, the transferring includes transferring to the managed-infrastructure-as-a-service cloud environment; the adjusting includes adjusting to standards of the managed-infrastructure-as-a-service cloud environment; and the registering into the management system includes registering into a management system of the managed-infrastructure-as-a-service cloud environment.

As noted elsewhere, in the adjusting step, in some cases, the standards include one or more of security standards; infrastructure standards; patch managements standards; and infrastructure management system standards (e.g., standards of tools such as 696, 698).

In some cases, an additional step 524 includes analyzing the foreign instance for suitability for transfer to the target infrastructure-as-a-service cloud environment; in such cases, the transferring is responsive to the analyzing yielding an affirmative result.

As noted, in some cases, a plurality of foreign instances are treated as a whole in the analyzing step.

In some cases, an additional step includes carrying out testing (refer, e.g., to decision blocks 404, 406, 408; in general, such testing can be carried out, for example, before the transport, after the transport, between different adjustments, after adjustments, and after migration. A further step includes carrying out at least one of remediation and back-out if the testing fails ("Not OK" branches of blocks 404, 406, 408). As noted elsewhere, in some cases, a plurality of foreign instances are treated as a whole in the testing step.

In some cases, the testing includes a baseline test 528 prior to the transferring step; and a user-acceptance test 560 after the registering step. The user acceptance test has at least one test case. The baseline test validates that the foreign instance initially passed the at least one test case of the user-acceptance test.

In another aspect, an apparatus includes a memory (e.g., RAM 30, cache 32); and at least one processor 16, coupled to the memory, and operative carry out or otherwise facilitate any one, some, or all of the aforementioned method steps. Optionally, the apparatus further includes a plurality of distinct software modules 42. Each of the distinct software modules is embodied on a computer-readable storage medium, and the distinct software modules include a transfer core component module, an adjustment component module, and a registration component module; as discussed elsewhere herein. The snapshot management system module optionally includes one, some, or all of the sub-components in FIG. 10.

In some cases, the transfer core component module obtains the foreign instance from a transfer agent in a customer environment and locates the foreign instance within a cloud landing zone of the infrastructure-as-a-service cloud environment. In some embodiments, the at least one processor is operative to instantiate the adjusted instance into a cloud production zone of the infrastructure-as-a-service cloud environment.

In another aspect, in some cases, the infrastructure-as-a-service cloud environment includes a cloud landing zone, a cloud production zone, and a cloud management zone. In at least some such cases, the at least one processor is operative to transfer the foreign instance into the cloud landing zone under control of the cloud management zone; the at least one processor is operative to carry out the adjusting on the foreign instance in the cloud landing zone under control of the cloud management zone; the at least one processor is further operative to instantiate the adjusted instance into the cloud production zone; and the management system forms at least a portion of the cloud management zone.

In some cases, the cloud production zone includes cloud production zone computer hardware of a first type and cloud production zone hypervisors of a first type running on said cloud production zone computer hardware of said first type; and the cloud landing zone includes cloud landing zone computer hardware of the first type and cloud landing zone hypervisors of the first type running on the cloud landing zone computer hardware of said first type. Fewer standards are imposed on instances managed within said cloud landing zone than on instances managed within said cloud production zone, and said cloud landing zone is separated from said cloud production zone via at least one of physical and logical techniques so as to avoid impact of said cloud landing zone on security of said cloud production zone. Stated in another way, the cloud landing zone is a set of computer hardware (e.g., servers, storage devices, etc.) and hypervisors of the same type as in the cloud production zone, but with fewer standards on the instances managed there, and physically and/or logically separated from the cloud production zone so as not to impact the security of the cloud production zone.

Management Infrastructure Analysis for Cloud Migration

One or more embodiments advantageously provide techniques for management infrastructure analysis for cloud migration. In current migration analysis techniques, in particular the automated parts thereof, the focus is on key middleware such as application servers or databases. One significant advantage of the cloud computing paradigm lies in simplified management, which mainly comes from standardized infrastructure software and standardized management processes. One or more embodiments advantageously extend automated migration analysis to these management aspects.

In an Infrastructure as a Service (IaaS) cloud, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). A Hardware-Infrastructure-as-a-Service (HIaaS) cloud provides bare-bones virtual machines as a service. It may also provide an operating system (OS) and even software, but no support is typically provided for the OS or software.

On the other hand, a Managed-Infrastructure-as-a-Service (MIaaS) cloud provides full-service virtual machines. The service may, e.g., include OS patching and support for security and compliance of the OS. One significant aspect of MIaaS is simpler management via: standardization to a certain set of catalog images from which instances are generated, automatic linkage of these instances to management tools during deployment, and/or not giving customers administration privileges on the OS level, so that the operating systems on the instances remain as the cloud administrators configure them.

Heretofore (prior to the emergence of the cloud computing paradigm), there was much less need to analyze for compatibility with infrastructure standards, or for the costs associated with transformation thereto. One aspect of the cloud computing paradigm involves enhanced efficiency through the standardization of infrastructure. The move to cloud computing also reflects a trend wherein information technology (IT) running costs have outpaced IT investment costs. To gain large benefits from investments in cloud computing resources, one or more embodiments advantageously facilitate migration of existing environments to such standardized infrastructure management systems and processes, starting with analysis.

Reference is made to the definitions of IaaS clouds, HIaaS cloud, MIaaS Clouds, Instance, Source instance, Image, Catalog image, Provisioning, Reinstall migration, Image-based migration, and Rapid migration to MIaaS cloud as defined elsewhere herein.

Figure 16:
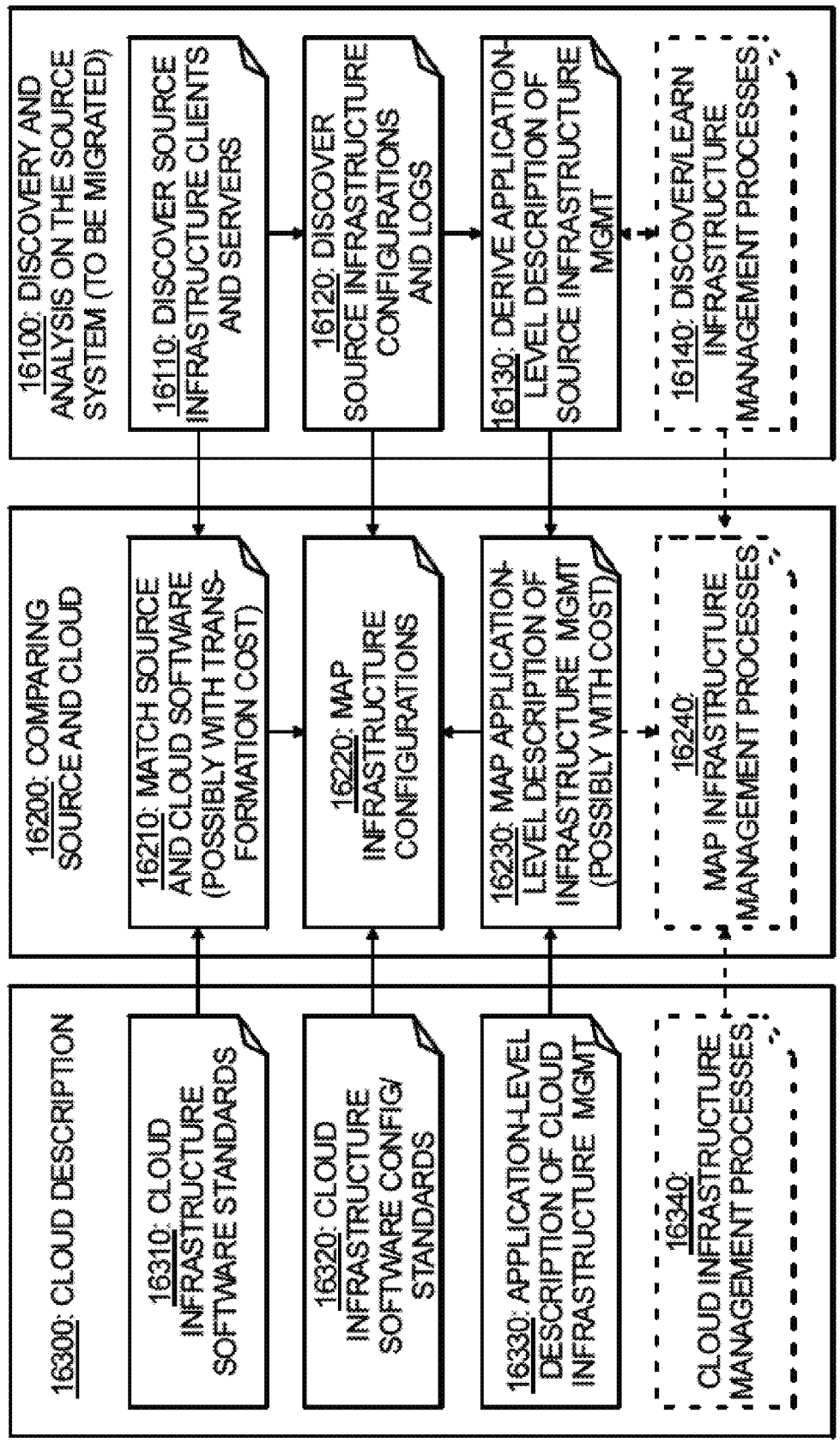
FIG. 16 presents a combined flow chart and block diagram, according to an aspect of the invention.
Figure 17:
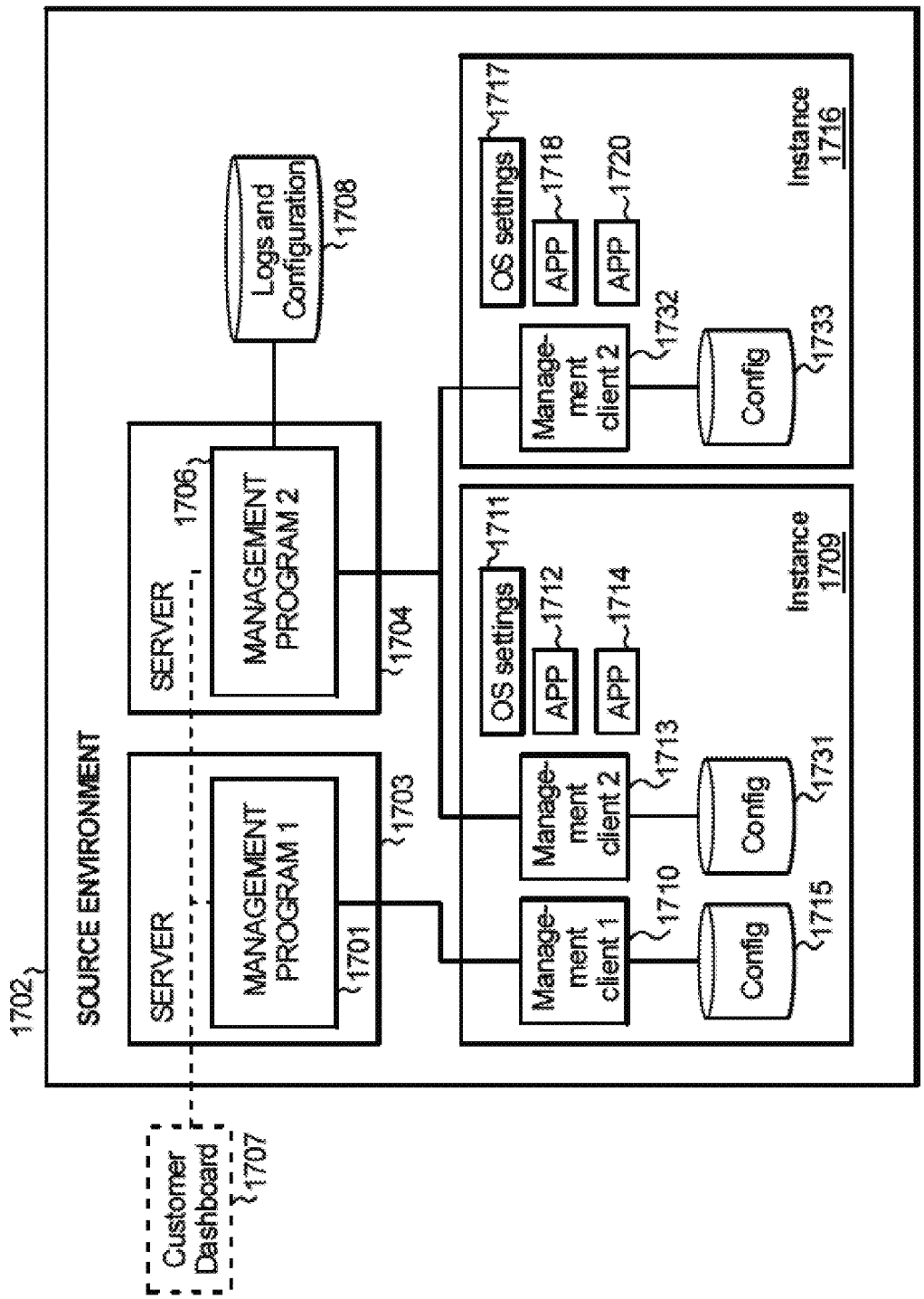
FIG. 17 depicts a source environment to be migrated to a target environment in accordance with one or more aspects of the invention.

Refer now to FIG. 16, and note cloud description 16300; discovery and analysis of a source system to be migrated, shown at 16100 (an exemplary source system per se is shown in FIG. 17); and an infrastructure comparison engine 16200 to carry out comparison (referred to also as analyzing, mapping, and/or matching) between the two. Cloud description 16300 includes cloud infrastructure software standards and/or configurations ("configs") 16310, 16320. Also included therein is an application-level description of cloud infrastructure management 16330; for example, a service-level agreement (SLA) offered by a cloud, or non-functional requirements that can be set as part of an application program interface (API). Optionally, description 16300 also includes include cloud infrastructure management processes 16340.

With regard to discovery and analysis 16100 on the source system to be migrated, step 16110 includes discovery of source infrastructure clients and servers; step 16120 includes discovery of source infrastructure configs and/or logs; and step 16130 includes obtaining (for example, by derivation) of an application-level description of the source infrastructure management. Optionally, process 16100 also includes step 16140, namely, discovery and/or learning with regard to infrastructure management processes of the source.

Process 16200 includes a comparison between the source and the target cloud. Step 16210 includes a matching between the source and cloud software, optionally taking transformation costs into account, and based on the cloud infrastructure software standards 16310 and the discovered source infrastructure clients and/or servers from step 16110. In one or more embodiments this matching process involves looking for conflicts as described elsewhere herein:

- a source infrastructure management component manages at least one object that at least one mandatory target infrastructure management component will manage in the target cloud infrastructure
- a source infrastructure management component uses at least one resource that at least one mandatory target infrastructure management component will use in the target cloud infrastructure
- current lack of a mandatory target infrastructure component on a client
- existence of a mandatory target infrastructure component in a different version
- existence of a mandatory target infrastructure component with different configurations.

In step 16220, map the infrastructure configurations based on the cloud infrastructure config standards 16320 and the discovered source infrastructure configs and/or logs from step 16120. In step 16230, map the application-level descriptions (e.g., descriptions of non-functional requirements as discussed elsewhere herein) of infrastructure management from the cloud (from 16330) and the source (from 16130). In optional step 16240, map the infrastructure management processes from the cloud (from 16340) and the source (from 16140).

Again, comparison and/or analysis 16200 steps can involve, in one or more embodiments, examining for conflicts.

With reference to steps 16340, 16140, and 16240, comparing the actual management processes is optional. In particular, if a radical migration such as to an existing cloud is made, then typically only the application-level descriptions need to be mapped. With regard to step 16120, in one or more embodiments, infrastructure configurations are discovered for mapping to potentially different software in the target cloud (purely by way of a non-limiting example, HP event filters associated with products from Hewlett-Packard Company, Palo Alto, Calif., USA might be used in the source environment and might be mapped to IBM Tivoli Monitoring (ITM) event filters, available from International Business Machines Corporation, Armonk, N.Y., USA, which might be used in the target environment). With regard to step 16130, several source aspects that are usually obtained by human interviews can be derived from the detailed discovery, such as high-availability configurations, planned downtimes, and patch management setups. Even if still obtained by human interviews, they can be considered in automated analysis in step 16230 if the results are in a fixed format. With regard to step 16230, the application-level description of the current infrastructure typically has to be reached or exceeded, unless the business owners explicitly agree to a lower level.

In an alternative approach, instead of having a cloud description already given, derivation of the most suitable cloud description for the source environment may be part of the engagement, e.g., when the overall goal is to build a suitable private cloud for an enterprise.

By way of review and provision of additional detail, before performing any IT migration, transformation, modernization etc., it is advisable to analyze compatibility between components to be retained and new components to be used. This may include, for example, selection of what to retain and what to change, as well as effort analysis of changes to be made to achieve compatibility.

Current migration analytics, in particular the parts done with well-defined methods or even in an automated way, focus on compatibility on the operating system level, and sometimes on compatibility of key middleware such as application servers or databases. That is to say, they analyze whether an operating system version will still run on new hardware, or whether a database version will still run on a newer or related operating system version.

With the advent of clouds, in particular Managed-Infrastructure-as-a-Service (MIaaS) clouds, current migration analytics are insufficient, as these clouds also prescribe infrastructure management tooling and processes, as well as certain standards on servers that allow the infrastructure management to operate in a standard way.

One or more embodiments advantageously provide a system and method for automated migration analysis for infrastructure management aspects, primarily for cloud migrations.

One or more embodiments advantageously provide a systematic and/or automated method for infrastructure management analysis.

Analyzing for infrastructure management migration is different from analyzing for middleware compatibility, because a significant question is whether the source infrastructure management software conflicts with the standard infrastructure management software in the cloud (in particular MIaaS) and needs to be removed or modified (as opposed to whether the source infrastructure management software will run on the cloud operating system(s), which is what would be analyzed if the analysis were for middleware compatibility). Furthermore, other settings related to infrastructure management standards need to be analyzed, such as assumed minimum patch levels.

In MIaaS cloud, migration implies the need for infrastructure analysis. One or more embodiments advantageously provide the ability to systematically analyze infrastructure changes needed and to apply them in a "rapid migration" process as described elsewhere herein.

Figure 19:
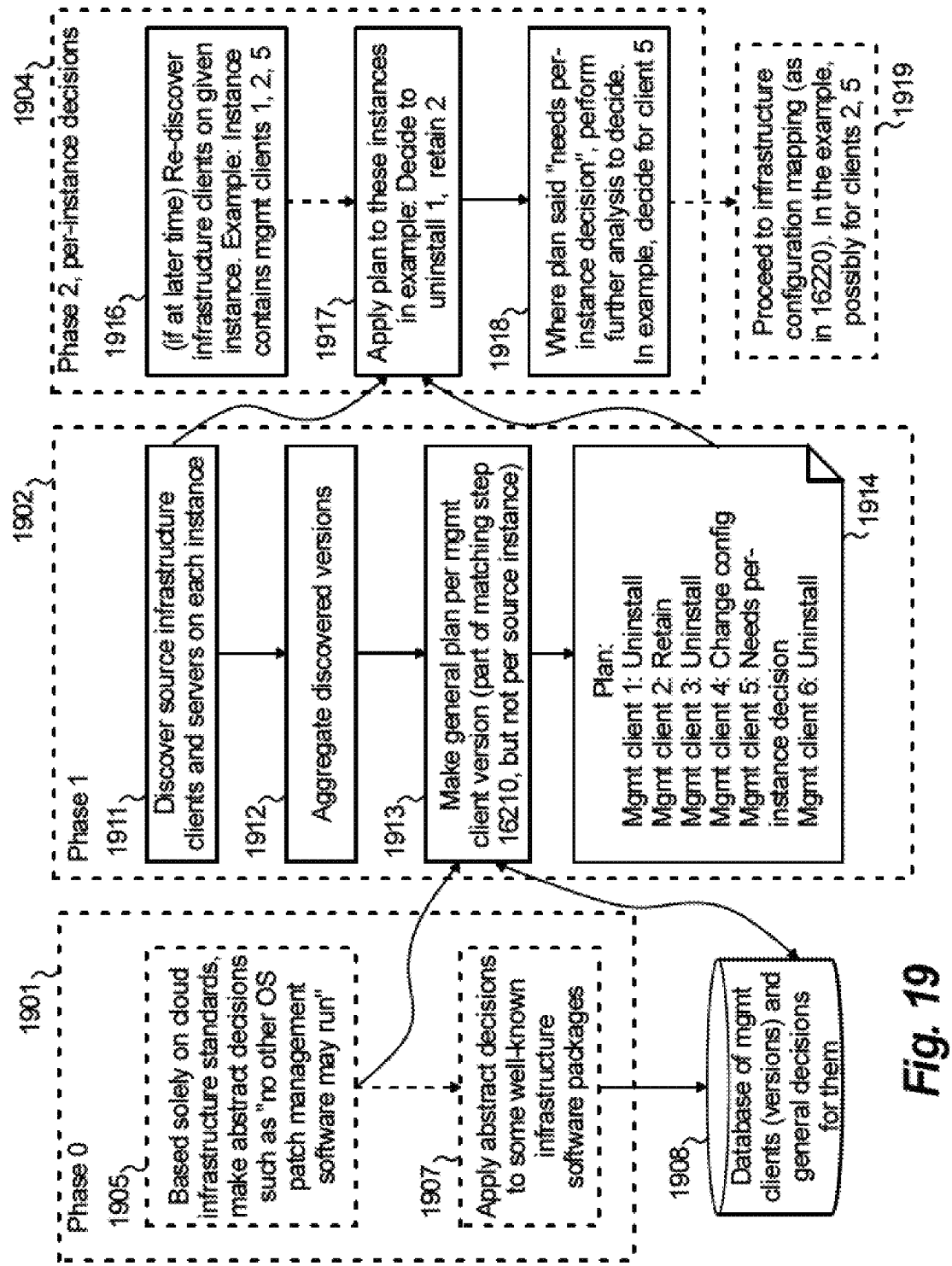
FIG. 19 shows exemplary phases in management infrastructure analysis for cloud migration in accordance with one or more aspects of the invention.

Referring now to FIG. 19, in some instances, an exemplary method is implemented in two phases. In a first phase 1902, the to-be-analyzed elements, in particular the source infrastructure clients and servers from all source systems may be aggregated and discussed with the customer (i.e., the owner of or party responsible for the source system). For example, a cloud services provider may indicate to a customer that it is necessary to uninstall all of the customer's "Vendor-X-patching systems." In a second phase 1904, the decisions are applied to individual source systems, and possibly refined if no general decision was possible in the first phase.

In one or more embodiments, it is believed advisable to detect conflicts pertaining to conflicting management in the first phase. Unless a comprehensive list of all potential infrastructure software is available (this would be the case if Phase 0, numbered 1901, could already fill in the database 1908 very well, and all software in the customer's source environment were already in such database), it is appropriate to analyze the overall software list at this time to see if there are such conflicts. Over time, the aforementioned database 1908 of conflicting and non-conflicting software can be developed.

In some instances, the discovery of source infrastructure software 16110 can be done by carrying out discovery on the actual machines to be migrated, which contain clients of this source infrastructure software (e.g., asset management agents); by detecting servers of this source infrastructure software (e.g., a central asset management server); and/or from questionnaires of deployed infrastructure tooling.

Thus, one or more embodiments advantageously provide a method for management infrastructure analysis for cloud migration including discovering infrastructure components in the source infrastructure; and analyzing the discovered infrastructure components for conflicts with mandatory infrastructure components in the target infrastructure.

In some cases, the infrastructure components include one or more of infrastructure clients, infrastructure servers, infrastructure configurations, and infrastructure processes.

In some embodiments, conflicts include those where a source infrastructure component manages the same objects that a mandatory target infrastructure component will manage.

In some cases, conflicts include those where a source infrastructure component uses the same resources, in particular a port, as a mandatory target infrastructure component uses.

Non-limiting examples of conflicts include one or more of the current lack of a mandatory target infrastructure component on a client, the existence of a mandatory target infrastructure component in a different version, and existence of a mandatory target infrastructure component with possibly different configurations.

In some embodiments, the result of the analyzing step includes one or more of the recommendations to uninstall an infrastructure component, to install an infrastructure component, to modify the configuration of an infrastructure component, to exclude servers with a particular component from migration, or to further discuss with the customer about an infrastructure component. Furthermore in this regard, the last two outcomes may occur in particular if a source infrastructure component is in a conflict, but likely to also be used to manage objects that are not under control of the cloud, e.g., middleware in a migration to an MIaaS cloud.

In some cases, the analyzing step is done in two phases; a first aggregated phase where all discovered infrastructure components are aggregated and generic recommendations given for them, and a second per-instance phase where the recommendations are applied to individual source systems, and refined if the general recommendation was not conclusive.

The analyzing step can, in at least some embodiments, include configuration comparison and/or process comparison.

With regard to configuration comparison step 16220, in some cases, it is advisable to compare configurations and make decisions for changes. This is particularly advisable if infrastructure software is used to manage both operating system (OS) aspects and application aspects. For instance, patching software on a source server may be set up to patch the OS as well as databases and web servers. If this source server is migrated to an MIaaS cloud, then the OS-level patching needs to be switched off in favor of the cloud patching software, while the database and web server patching needs to remain. On the other hand, in other cases, the source software may be uninstalled, but the server owners may wish to retain certain policies, e.g., backup frequencies or types of monitored events.

Figure 18:
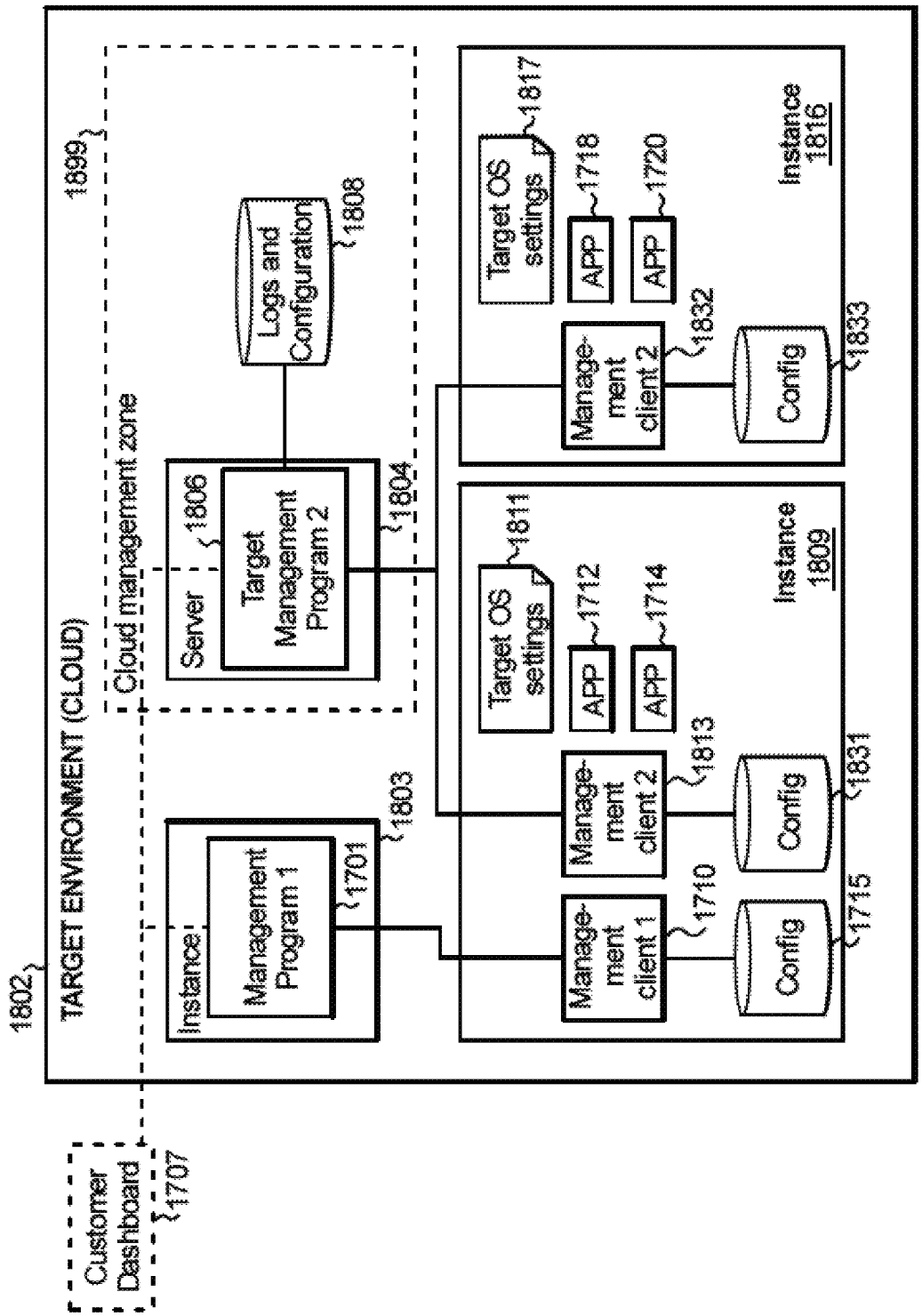
FIG. 18 depicts a target environment to which the source environment of FIG. 5 can be migrated in accordance with one or more aspects of the invention.

Consider now aspects of customer dashboards 1707 as shown in FIGS. 17 and 18. A related alignment question that can occur with MIaaS migration is integration into overall customer dashboards. For example, the customer may have a "CIO (chief information officer) dashboard" that gives an overview of the status of applications and servers. The customer may desire to retain such a dashboard after migrating some servers to MIaaS, both because the dashboard also shows applications, and/or because not all servers were migrated, but the customer would like a joint overview over migrated and non-migrated servers. In these cases, adapters from the reporting features of the MIaaS software into the customer dashboard should be provided. This aspect is shown in FIG. 18 by linking dashboard 1707 also to the target management program 2, numbered 1806, which is provided by the cloud.

Pertinent observations will now be provided regarding OS versions, patches and security. Another infrastructure aspect that an MIaaS cloud will typically prescribe are precise OS versions. For the OS, it is typically appropriate to decide what level of deviation is tolerated, and what may be automatically updated prior to migration. For example, it might be decided to tolerate deviating minor versions (e.g., v5.2 instead of 5.3) or not, and there are often automatic updates tools among minor versions. It is also appropriate to consider non-version OS types, such as releases or editions.

Patches may need to be added in some cases. However, if source servers with back-level patching are found, it is not unlikely that there were application problems with some newer patches. Ideally, an effort should be made to try to find this out from the application owners beforehand. Patch updates should typically be followed by careful application tests.

With regard to other security settings, there are a number of good practices for security such as not enabling certain services and access rights to certain OS files. The source server should be brought into compliance with such requirements. Ideally, existing deviations from such best practices are not required by applications (e.g., applications should not require that an operating system administration password is only 6 characters long), but this should be discussed with application owners beforehand too.

In one or more embodiments, there are at least two significant ways of deciding what to change regarding operating system settings and the like, and in particular security-related settings:

Compare with clean cloud images from a catalog. In some instances, this approach may be problematic, inasmuch as application-level and OS-level settings are not cleanly separated on typical operating systems. For example, if a source image has a service at a port where the catalog image does not, it is typically necessary to validate whether that is a useful application service.

Compare with a security validation mechanism if the cloud has such a mechanism, e.g., a service activation check. Settings validated here typically must be achieved. However, such a test in a cloud might be incomplete because the cloud might rely on the cleanness of its catalog images.

Thus, in some cases, there can be a general cloud migration analysis phase before both of the above-mentioned phases, wherein decisions are taken as to which security settings are mandatory. Phase 0 in FIG. 19, numbered 1901, depicts a general cloud migration analysis for management software; a similar scheme as depicted therein can also be used to carry out a general cloud migration analysis for OS settings.

Continued reference should be had to FIG. 16, and reference should also now be had to FIG. 17. FIG. 17 shows an exemplary source environment 1702 on which discovery and analysis could be carried out. Environment 1702 includes a server 1703 with a management program 1, numbered 1701. Environment 1702 also includes a server 1704 with a management program 1706 interfacing with logs and/or configurations in a data store 1708. Physically, data store 1708 may or may not reside on the same virtual or physical server as the management program 1706. That is to say, the configurations 1708 could also be inside server 1704; however, with a large management program, it is indeed possible that a configuration database 1708 is elsewhere (i.e., outside server 1704).

Two management programs are shown in FIG. 17 for brevity; in a typical scenario, long lists will be present. The management programs 1701, 1706 could correspond, for example, to "backup management" and "compliance management."

Environment 1702 also includes (in this example) two instances 1709, 1716. These are instances similar to those migrated in the rapid migration approach discussed elsewhere herein, i.e., they can be physical or virtual. The servers 1703, 1704 can in principle be virtual too, and a few of them might be migrated, so in one view they are also instances. One or more embodiments, however, address the case wherein the cloud has its own management programs (in the cloud management zone 1899 of FIG. 18) so the servers 1703, 1704 are not migrated.

Environment 1702 includes one or more clients 1710, 1713, 1732 managed by management programs 1701, 1706. These clients may, for example, reside on instances 1709, 1716 and may be clients in the sense of how they relate to management programs 1701, 1706, while instances 1709, 1716 may also function as servers on which one or more applications 1712, 1714, 1718, 1720 run. Instance 1709 is managed by both management programs 1701, 1706, while instance 1716 is managed only by management program 1706. This demonstrates the desirability of per-instance analysis.

Instance 1709 has OS settings 1711 and instance 1716 has OS settings 1717. Client 1710 has configuration file 1715; client 1713 has configuration file 1731; and client 1732 has configuration file 1733.

In FIG. 18, which depicts an exemplary target (cloud) environment 1802, it is assumed that the management program 1, numbered 1701, was retained (and thus its server was migrated in the normal way into the cloud production zone—see instance 1803), while program 2 was exchanged for a corresponding program 1806 in the cloud (particularly, on server 1804, in the cloud management zone 1899). Program 1806 utilizes logs and configurations 1808, in a similar manner as program 1706 used logs and configurations 1708.

FIG. 18 also shows that OS settings changed somewhat (security, patch, or the like); this is illustrated by different numbers 1811, 1817 as compared to settings 1711, 1717 in FIG. 17. Instance 1809 is the analog to instance 1709 in FIG. 17, i.e., the migrated version of instance 1709; it includes unchanged client 1710 with config 1715 managed by retained management program 1, numbered 1701. It also includes client 2, numbered 1813, with config 1831, and managed by program 2 numbered 1806. Instance 1816 is the analog to instance 1716 in FIG. 17; it includes client 2, numbered 1832, with config 1833, and managed by program 2 numbered 1806. Applications 1712, 1714, 1718, 1720 now run in target environment 1802.

In some cases, instead of retaining program 1, or as program 3, it is also possible that the same management program already exists in the cloud management zone. Then the corresponding client can be retained, and the issue becomes whether the "config" also stays the same or is changed to cloud standards for such "configs."

FIG. 19 shows exemplary phases in management infrastructure analysis for cloud migration. There is essentially a preparatory Phase 0, numbered 1901, followed by a two-phase analysis process including Phase 1, numbered 1902, and Phase 2, numbered 1904. In Phase 0, numbered 1901, at 1905, based solely on cloud infrastructure standards, make abstract decisions (for example, "no other OS patch management software may run"). At 1907, apply abstract decisions to some well-known infrastructure software packages. The result is (at least a partial) database 1908 of management clients (versions) and general decisions for them; database 1908 can be updated later as explained below.

During Phase 1, numbered 1902, at 1911, discover source infrastructure clients and servers on each instance. In step 1912, aggregate the discovered versions. In step 1913, make a general plan per management client version (part of matching step 210, but not per source instance). Step 1913 takes input from step 1905, step 1912, and database 1908, and also updates database 1908 with its outputs. Step 1913 results in plan 1914; it will be understood that plan 1914 is illustrative and non-limiting.

During Phase 2, numbered 1904, per-instance decisions are made. In optional step 1916, if carrying out Phase 2 at a later time, re-discover infrastructure clients on the given instance (e.g., instance contains management clients 1, 2, 5 mentioned in exemplary plan 1914). If no re-discovery is done, such knowledge is still available from step 1911. In step 1917, apply the plan to these instances. In the non-limiting example, decide to uninstall client 1, retain client 2. Step 1917 thus takes input from optional step 1916 (else from Step 1911) and from plan 1914. In step 1918, where plan 1914 indicated "needs per-instance decision," perform further analysis to decide (in the non-limiting example, decide for client 5). In optional step 1919, proceed to infrastructure configuration mapping (as in step 220). In the example, this is done, possibly, for clients 2 and 5.

Figure 20:
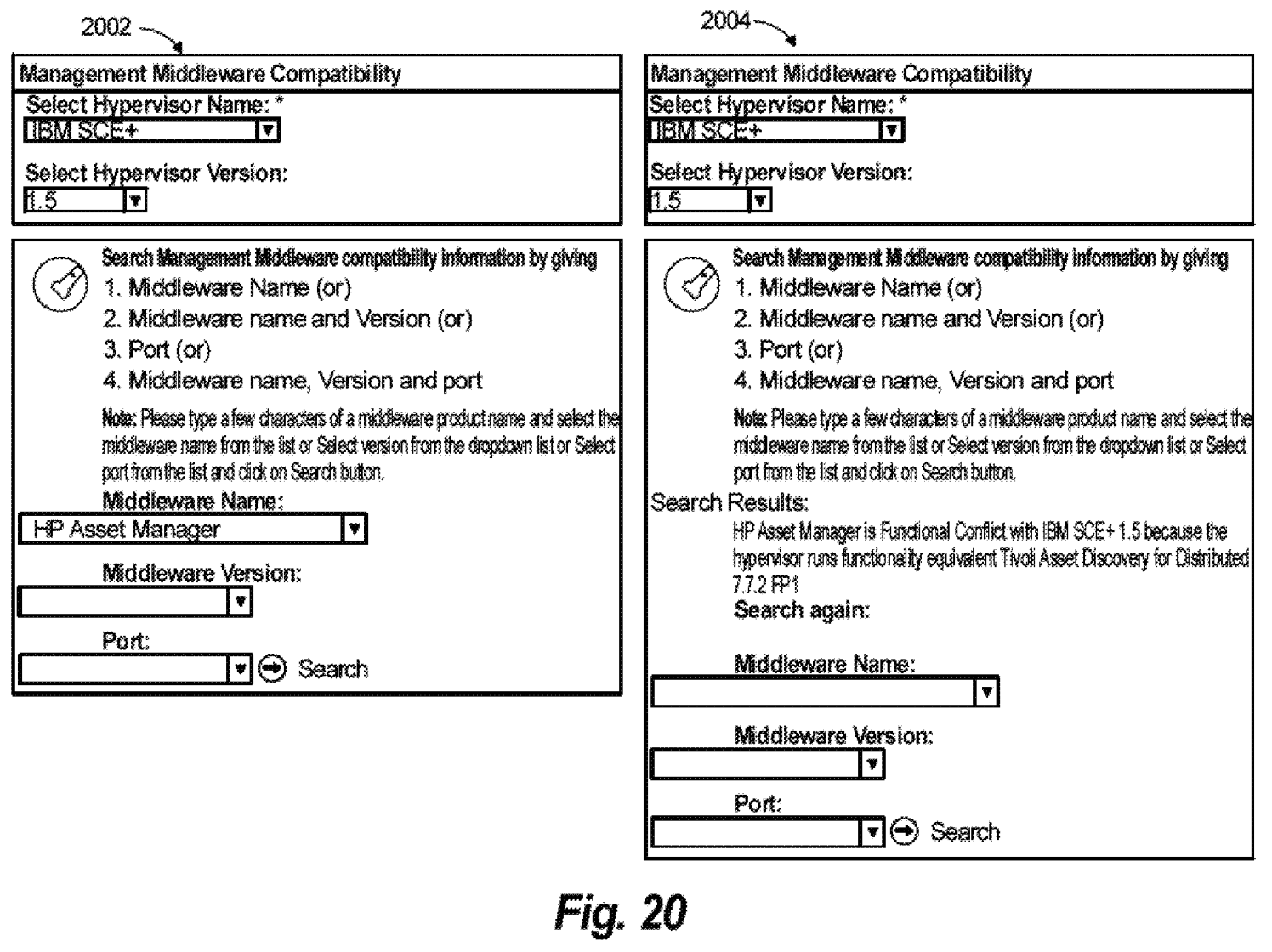

FIG. 20 shows a possible user interface for a decision about a conflict, in particular for Phase 0 (Step 1907) or Phase 1 (Step 1913) where a general recommendation for a certain management software type is made. At 2002, a query is made whether the management software entered in the field "Middleware name" conflicts with any software in the cloud SCE+, version 1.5. The response is shown at 2004: in this case, there is indeed a conflict, and an explanation of the type of conflict is given. In another usage, the port that a certain piece of software is running on might be input (in the lowest input field in view 2002) to check for port conflicts.

The following code snippet in SQL is a simplified version of code that could be used for decisions in Phase 2 (Step 1917). Assume that software (management software and applications) installed on the source instances is gathered in a table "MIDDLEWARE_INSTALL_MASTER". Furthermore, assume that component 1908 is realized as a database table "MW_MANAGEMENT_LOOKUP," where it is assumed for simplicity that everything with any conflict(s) is uninstalled, and precisely the software with known conflict(s) is collected in this table. The appropriate decision to make is whether to uninstall or not for each row in the former table, based upon whether the middleware occurs in the second table. The following query does this, assuming the decision goes into column "FUNCTION" of the former table:

```
update MIDDLEWARE_INSTALL_MASTER set FUNCTION = 'UNINSTALL'
WHERE EXISTS
    (SELECT 1
      FROM MW_MANAGEMENT_LOOKUP
      WHERE
UPPER(MIDDLEWARE_INSTALL_MASTER.MW_DISTRIBUTION_NAME)
= UPPER(MW_MANAGEMENT_LOOKUP.AGENT_NAME)
    )
```

Figure 21:
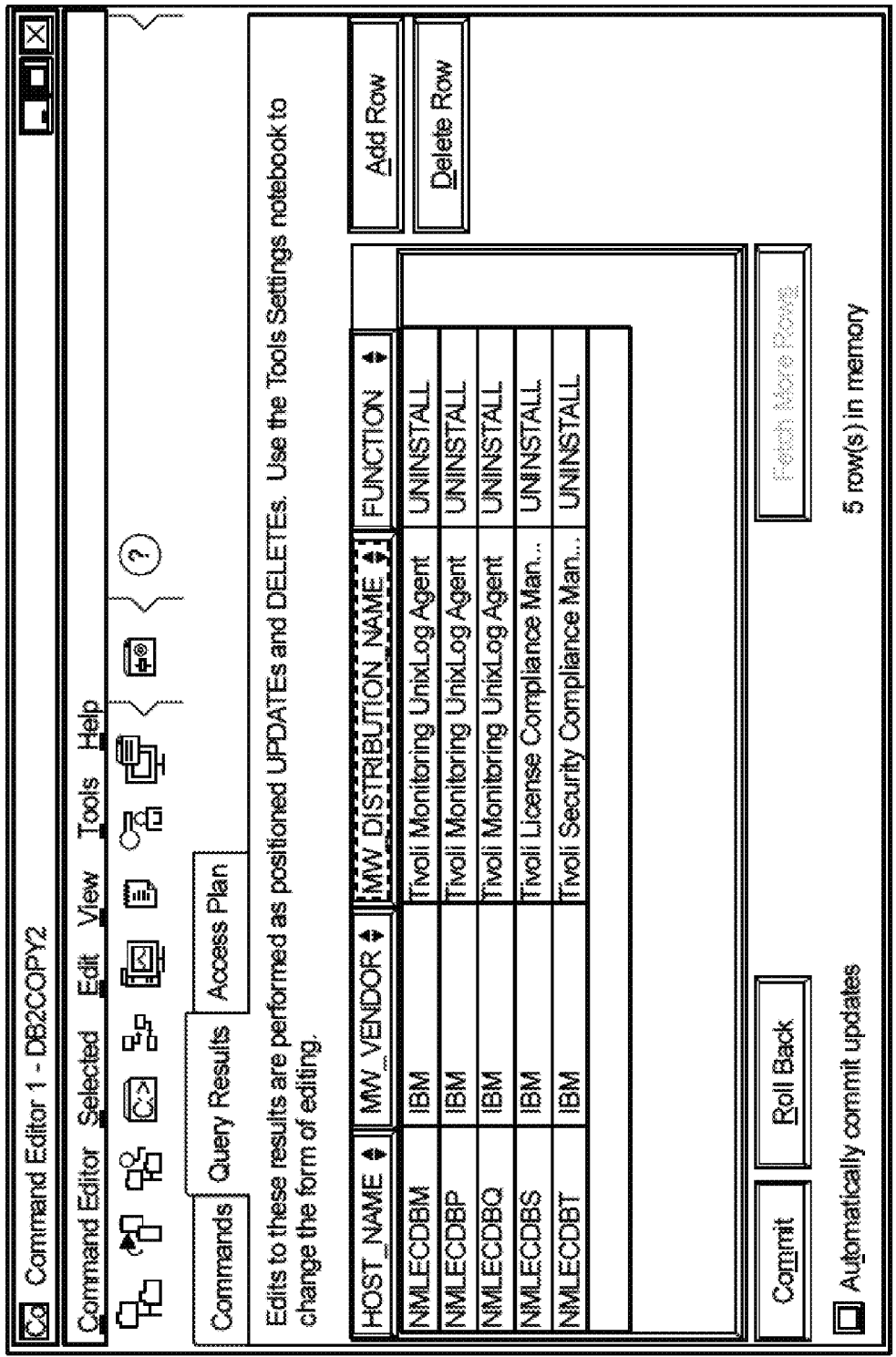
FIG. 21 shows non-limiting exemplary results for a small subset of servers in accordance with one or more aspects of the invention.

A possible result for a small subset of instances (given by column HOST NAME) is shown in FIG. 21, by way of a non-limiting example.

Given the discussion thus far, it will be appreciated that, in general terms, an exemplary method, according to an aspect of the invention, includes the step 16100 of discovering, in a source computing system 1702 having a source management infrastructure, at least one source infrastructure management component (examples given below). This step can be carried out, for example, using a suitable discovery tool, with appropriate modifications. In particular, known discovery tools cover infrastructure software. However, where per-software modules are needed in the discovery software, the focus in existing packages may so far lie on middleware (databases, web servers, etc.) that new modules for infrastructure software should be added. Furthermore, it may be appropriate to extend the reporting features of the tools to include infrastructure software, and for specific reports that characterize infrastructure software so that step 16110 has an output that makes steps 16210 and/or 16120 easy. Given the teachings herein, the skilled artisan will be enabled to make suitable changes to existing discovery tool packages to implement one or more embodiments.

A further step includes obtaining a description 16300 of a target cloud infrastructure having a target management infrastructure (e.g. layer 64). The description includes at least one mandatory target infrastructure management component. This step could be carried out, for example, by using a suitable database program to query a description 16300 stored in a database; non-limiting examples include IBM DB2 software available from International Business Machines Corporation, Armonk, N.Y., USA, and ORACLE software available from Oracle Corporation, Santa Clara, Calif., USA. It may also be done by querying a cloud portal; if possible, via a programmatic interface, otherwise via one or more user interfaces. If none of these options is available it can be obtained manually from the cloud service provider. If that is also not possible, a further option includes provisioning an image from the cloud catalog, and performing discovery on that image to see what infrastructure software is installed on same. This infrastructure software is likely to be the cloud standard.

Thus far, it has been assumed that migration to a given cloud with given standards is desired. In some instances, there may still be a choice between multiple clouds; then multiple descriptions may be given and step 16210 may additionally look for the best-matching cloud. In another aspect, the goal may be to build a private cloud for the given source environment; then, a suitable cloud infrastructure software standard may be derived in step 16210 from analysis of the discovered source infrastructure. For instance, if it is discovered that 80% of the source servers are monitored with monitoring software X, and 20% with other monitoring products, then monitoring software X may be selected as the standard for the new private cloud, and monitoring software changes will only be needed on the remaining 20% of servers.

A still further step includes analyzing the at least one source infrastructure management component to determine whether at least one conflict exists with the at least one mandatory target infrastructure management component. This step could be carried out, for example, using infrastructure comparison engine 16200; refer to description of block 16210 elsewhere herein.

In the discovering step, the at least one source infrastructure management component could include, for example, at least one source infrastructure management client 1710, 1713, 1732; at least one source infrastructure management server (1704 with program 1706) (clients and servers can be discovered in step 16110); at least one source infrastructure management configuration (e.g., in data stores 1708, 1715, 1731, and/or 1733); and/or at least one source infrastructure management log (e.g., in data store 1708) (configurations and logs can be discovered in step 16120). All the aforementioned elements things would typically be present, but they might not all be discovered. For example, the log might not be discovered. In at least some embodiments, when the focus is on install/uninstall, it is sufficient to discover the client; and for the "Phase 1" analysis, it is sufficient to find the management programs.

In some cases, a further step 16130 includes obtaining a description of non-functional requirements of the source management infrastructure (e.g., with the aforementioned discovery tool) (also referred to herein as an application-level description).

In some cases, in the obtaining step, the description of the target cloud infrastructure includes cloud infrastructure software standards 16310, cloud infrastructure software configurations 16320, and/or an application-level description 16330 of the target management infrastructure (i.e., a description of non-functional requirements on the management infrastructure). These are typically given by the enterprise application supported by the currently considered instance. These can include, for example, an SLA or non-functional requirement, but SLAs can be seen as non-functional requirements as well. Other examples include change windows, up-to-dateness policies (such as for patches or in monitoring for problems), auditing requirements, and the like. Many of these would typically be input manually. It should be ensured this is done in a fixed format to allow automatic comparison in step 16230. By way of a non-limiting example, if a cloud only provides certain patches every 4 weeks, but an enterprise application has a compliance requirement that requires such patches every week, then such enterprise application cannot be run on this particular cloud.

In cases as mentioned in the preceding paragraph, the analyzing step includes matching the cloud infrastructure software standards with the at least one source infrastructure management client and the at least one source infrastructure management server, as at 16210; mapping the description of the non-functional requirements of the source management infrastructure with the description of the non-functional requirements of the target management infrastructure, as at 16230; and mapping the cloud infrastructure software configurations with the at least one source infrastructure management configuration and the at least one source infrastructure management log, as at 16220.

As indicated by the arrows from block 16210 to block 16220 and from block 16230 to block 16220, in some cases, the mapping, at 16220, of the cloud infrastructure software configurations with the at least one source infrastructure management configuration and the at least one source infrastructure management log is at least partially based on the matching, at 16210, of the cloud infrastructure software standards with the at least one source infrastructure management client and the at least one source infrastructure management server, and the mapping, at 16230, of the description of the non-functional requirements of the source management infrastructure with the description of the non-functional requirements of the target management infrastructure.

In some embodiments, in the discovering step, the at least one source infrastructure management component further includes at least one source infrastructure management process, as shown at 16140; in the obtaining step, the description of the target cloud infrastructure further includes at least one target infrastructure management process 16340; and, as seen at 16240, the analyzing further includes mapping the at least one source infrastructure management process with the at least one target infrastructure management process.

As indicated by the arrow from block 16230 to block 16240, in some cases, the mapping of the at least one source infrastructure management process with the at least one target infrastructure management process, at 16240, is at least partially based on the mapping of the description of the non-functional requirements of the source management infrastructure with the description of the non-functional requirements of the target management infrastructure, at 16230.

In some cases, in the analyzing step, the at least one conflict includes the at least one source infrastructure management component managing at least one object that the at least one mandatory target infrastructure management component will manage in the target cloud infrastructure.

In some embodiments, in the analyzing step, the at least one conflict includes the at least one source infrastructure management component using at least one resource (e.g. port) that the at least one mandatory target infrastructure management component will use in the target cloud infrastructure.

In some cases, in the analyzing step, the at least one conflict includes one or more of the current lack of a mandatory target infrastructure component on a client, the existence of a mandatory target infrastructure component in a different version, and the existence of a mandatory target infrastructure component with possibly different configurations.

Consider the current lack of a mandatory target infrastructure component on a client. For example, if the cloud requires event monitoring agent "ABC" in version 6.1 on all instances (i.e., ABC is a mandatory component like 1813), and a source instance 1709 does not contain ABC in any version, a decision would be to install ABC. Consider the existence of a mandatory target infrastructure component in a different version. For example, if source instance 1709 already contains ABC in version 4.5 or 6.0, but the cloud requires 6.1, then it may be necessary to upgrade (probably easy if it was 6.0) or uninstall and reinstall (may be needed if it was 4.5, i.e., rather old).

Consider further the existence of a mandatory target infrastructure component with possibly different configurations. If ABC in version 6.1 was already there, or 6.0 was present and it has an upgrade feature to 6.1, it may have a local configuration specifying what events it monitors. On an instance provisioned from a cloud catalog image, a different configuration for ABC 6.1 may be present that monitors a different set of events. One solution is to overwrite the source configuration with the cloud standard configuration. Another is, in this example, to join the two configurations such that the union of the two sets of events gets monitored. This is possible if the corresponding central cloud management program, say "ABCServer" (corresponding to 1706), tolerates when unexpected events come in. If ABCServer is the only tool that processes these events, it may still be useless, but if it forwards events to a customer dashboard 1707, it might pass these unexpected events through. This could help if, e.g., the event monitoring system(s) was used both to monitor events from an application 1712 (say crashes and restarts of this application) as well as OS-level events. The application 1712 remains under control of the customer and the customer might still want to see these events in the dashboard 1707.

In some cases, the analyzing step includes one or more of (i) recommending un-installation of a source infrastructure component; (ii) recommending installation of a target infrastructure component; (iii) recommending modifying configuration of an infrastructure component; (iv) recommending excluding servers in the source environment with a given source infrastructure component from migration; and/or (v) further discussing a given infrastructure component with a customer. The last two outcomes (exclusions (iv)/further discussions (v)) may occur in particular if a source infrastructure component is in a conflict, but the same source infrastructure component is likely to be used to manage objects that are not under control of the cloud, e.g., middleware in a migration to an MIaaS cloud (corresponding to application 1712, 1714 etc.). With regard to possibilities (i)-(iii), the infrastructure component(s) mentioned could be in the source environment prior to migration, could be adjusted during rapid migration and/or after transport, and so on. With regard to possibility (iii), the same might start on either side—typically modification takes place if there was both a source configuration and a standard target configuration for the same software, and some compromise is appropriate. With regard to (i), it could be decided that event monitoring software other than ABC is not desired and any such software other than ABC could be uninstalled.

It is worth noting that "further discussion" option (v) may involve human agency. However, the automatic engine may need to output this as a recommendation. For example, if in 90% of the instances it can make an automated decision, but in 10% of the cases it cannot, it is already well worthwhile using such an engine. But the engine cannot simply guess in the remaining 10% cases, it must admit that it doesn't know. In some embodiments, these questions pop up in an interface with a structured format to answer them so that automation can proceed from there on. If several people need to decide a collaboration tool can be provided.

In some cases, the discovering includes discovering, in the source computing system, a plurality of source infrastructure management components; and the analyzing includes: initially aggregating all of the plurality of source infrastructure management components; developing generic recommendations for the aggregated plurality of source infrastructure management components; applying the recommendations on a per-instance basis; and refining at least some of the applied recommendations in cases where the generic recommendations are inconclusive. See, e.g., FIG. 19 and accompanying text.

In some instances, the discovering is carried out on at least one physical machine 1709, 1716 in the source computing system, and on this at least one physical machine is software 1710; 1713 or 1732 that is a client of the at least one source infrastructure management component. On the other hand, in some cases, the discovering is carried out on at least one physical machine in the source computing system, and the at least one physical machine is a server 1704 on which the at least one source infrastructure management component runs. Questionnaires can also be used.

In some cases, an additional step includes providing a system, including distinct software modules; each of the distinct software modules is embodied on a non-transitory computer-readable storage medium. The distinct software modules include a discovery tool module to carry out discovery 16100, a description module to hold and access description 16300 (see discussion above of obtaining description 16300), and an infrastructure comparison engine module to implement engine 16200 and carry out analysis. Examples of a description module include a suitable database program to query a description 16300 stored in a database; cloud portal query code (querying, if possible, via a programmatic interface, otherwise via one or more user interfaces); or code to provision an image from the cloud catalog, and perform discovery on that image to see what infrastructure software is installed on same. This infrastructure software is likely to be the cloud standard.

Non-limiting examples of discovery tools include IBM Tivoli Application Dependency Discovery Manager (TADDM) available from International Business Machines Corporation, Armonk, N.Y., USA, the IBM Galapagos tool, and the like. With regard to the IBM Galapagos tool, see, e.g., Galapagos: model-driven discovery of end-to-end application-storage relationships in distributed systems, IBM Journal of Research and Development archive, Volume 52 Issue 4, July 2008, Pages 367-377. In some instances, with respect to the discovery tool at least a portion (e.g., scripts or agents) typically runs in the source environment 1702, while another portion runs on a dedicated server in the target environment. However, the entire discovery tool could run on a dedicated server in the target environment with a connection or connections to the source environment 1702. In some instances, the entire discovery tool could run on the environment 1702. Engine 16200 and the database with description 16300 would typically reside in the target environment (e.g., FIG. 3). They can also reside in a separate analysis environment, e.g., on servers of the team that performs the analysis. As discussed above, existing tools can be modified to implement aspects of the invention.

Use of Snapshots to Reduce Risk in Migration to a Standard Virtualized Environment A hardware infrastructure as a service cloud (HIaaS Cloud) provides bare bone virtual machines as a service. It may also provide an operating system and applications; however, support is typically not provided for any software installed on the virtual machine (VM). A non-limiting example is the Amazon Elastic Compute Cloud (Amazon EC2) available from Amazon Web Services LLC Seattle, Wash., USA. A managed infrastructure as a service cloud (MIaaS Cloud) provides full service virtual machines. The service contract includes providing software services for the underlying virtual machine. These services include software upgrades, patch support, support for compliance, license management, and the like for the provided software infrastructure. A non-limiting example is the IBM SmartCloud Enterprise+ also known as IBM SCE+, cloud environment available from International Business Machines Corporation, Armonk, N.Y., USA. Image-based migration uses customer images for migration of the application to the cloud. This approach minimizes expensive application re-installation. A cloud standard is the minimum set of requirements needed to be met by a customer image to be run and managed in cloud.

From an information technology (IT) management perspective, a hosting environment (a cloud is a non-limiting example) that aggressively enforces standardization (e.g., at operating system (OS), middleware, and/or application layer) can lead to significant management cost savings. However, migration of custom systems (called source systems) into such a standardized environment requires changes to be made to the software stack of the source system in order to comply with the standard. Those changes potentially carry a high risk of breaking the source system, rendering it unusable.

In the recent years companies have increasingly adopted virtualization to achieve hardware consolidation. One or more embodiments address migration into a standardized virtualized environment. One example of such a standardized virtualized environment is an Infrastructure as a Service (IaaS) Cloud. In one or more embodiments herein, a cloud environment is employed as a non-limiting example of a standardized virtualized environment. However, it is to be understood that one or more embodiments are broadly applicable to a general standardized virtualized environment that may or may not expose the same kinds of APIs of an IaaS cloud.

One or more embodiments advantageously provide a system that reduces the risk of migration via the use of snapshots to systematically capture system states at critical points of time during migration. Moreover, one or more instances provide a system that supports two types of snapshots: short term snapshots (STS) and long term snapshots (LTS), each optimized for specific usage scenarios. Furthermore, one or more embodiments provide a method that balances various requirements of "snapshotting" (resource utilization, performance impact, long-term preservation, and the like) through a combination of short term snapshots and long term snapshots. Even further, one or more instances provide a system that supports roll-back to any type of snapshot. Yet further, one or more embodiments provide a system that automatically provides an audit of the exact changes applied to the source system through the migration process. The changes can be viewed at two granularities: file level and product level. Two levels of information are available for a long term snapshot: the file system (including meta-data information about each file such as file name, owner, permission, modified date, and optionally a hash of the content of the file); and the products (software packages) contained within the system.

For the avoidance of doubt, "snapshots" as used herein include both long-term snapshots and short-term snapshots; however, the process of "snapshotting" refers to the creation of a short-term snapshot while the creation of a long-term snapshot is referred to as checking in or check in.

The following is a non-limiting example of file-level and product-level changes referred to as "diffs":

<removed-file name="/Program Files/Altiris/Altiris Agent/Software Delivery/pkgdlvlk.tmp" digest="sha1:da39a3ee5e6b4b0d3255bfef95601890afd80709"/>
<added-file name="/cygwin/usr/share/groff/1.19.2/tmac/mm/locale" digest="sha1:da39a3ee5e6b4b0d3255bfef95601890afd80709"/>
<added-file name="/IBM/ITM/InstallITM/MiaError.log" digest="sha1:da39a3ee5e6b4b0d3255bfef95601890afd80709"/>
<modified-file name="/Documents and Settings/Administrator/NTUSER.DAT" old-digest="sha1:33aca147bd43c253fbf904fea76aa63c1aab3b32" new-digest="sha1:7a12613062e36b27a4c20147ebd702671e0272ca"/>
<added-product vendor="IBM" name="IBM ITCAM for Microsoft Applications Entry" version="6.2"/>

Advantageously, one or more embodiments reduce the risk of migration by providing a "time capsule" of the system being migrated, at critical points of time during migration, such that the system can be rolled back to a "known good state" in case of failures. A customer will also know what changes have been applied to its system during migration before the system is on-boarded into the cloud. The reduced risk translates to improved engagement success rate, reduced downtime of applications, and lower migration cost due to reduced debugging time during failures.

It is worth noting that virtual machine (VM) snapshot and roll back is a general mechanism available in modern hypervisors, which have been used in various scenarios, such as system debugging and/or system security. In one or more embodiments, the "short term snapshot" is essentially the same as a VM snapshot; however, the usage scenario is different (reducing risk in migration). Additionally, one or more embodiments employ novel long term snapshots and the novel combination of the two types of snapshots.

It is also worth noting that traditional backup tools are used to back up a system and later on restore the system to the state before the back-up. In one or more embodiments, the long-term snapshot is stored as an image object in an image library; existing backup systems deal with the concept of a file system, whereas an image is a super-set of a file system. An image also includes aspects of a virtual machine, such as central processing unit (CPU), memory configuration, and so on. An image library provides versioning and analytics capabilities.

Figure 22:
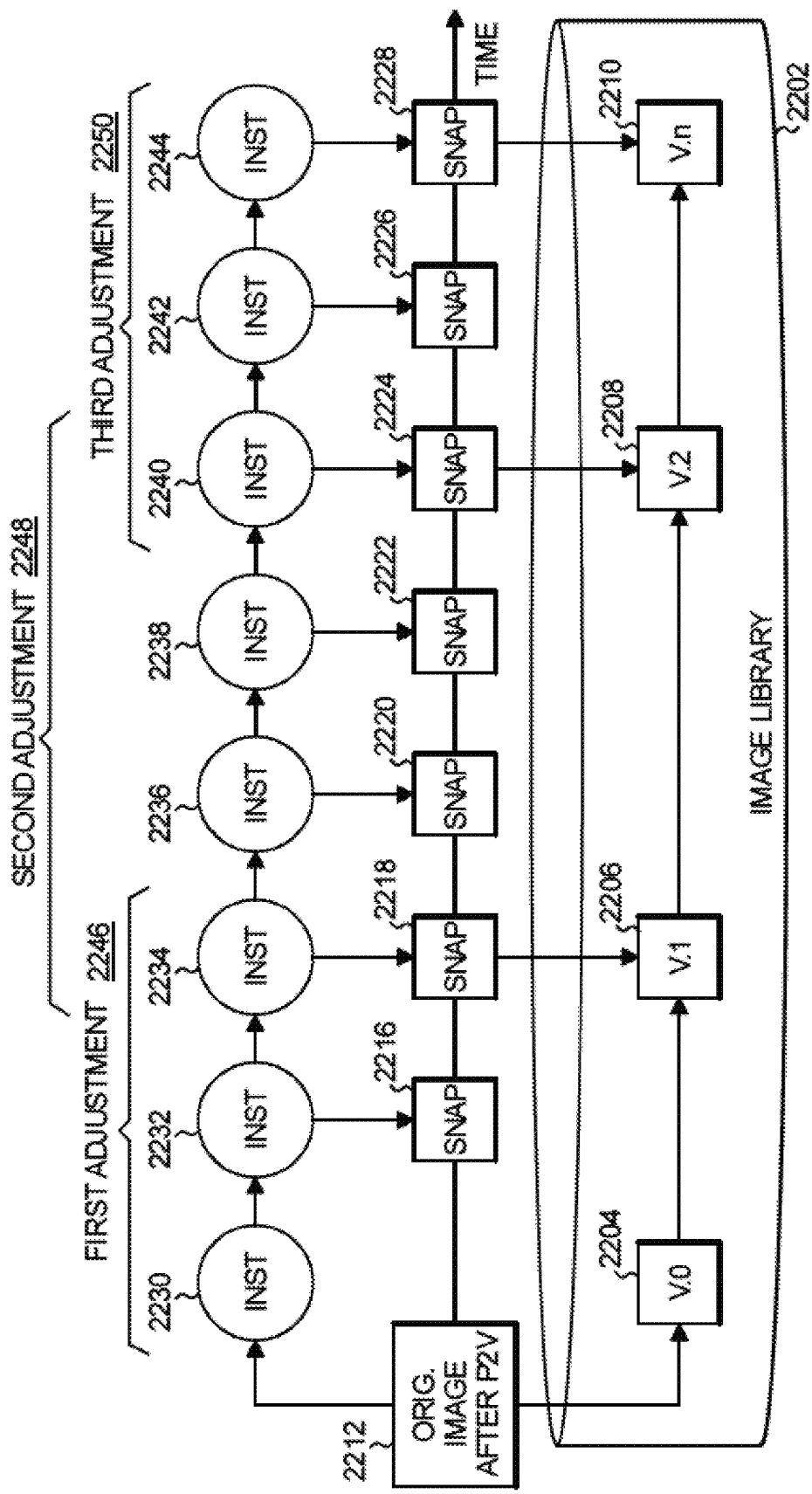
FIG. 22 presents an exemplary system block diagram, according to an aspect of the invention.

Referring now to FIG. 22, one or more embodiments advantageously reduce migration risk by using an image library 2202. Here the "snapshot" action produces short term snapshots, so 2216-2228 are short term snapshots. The act of "check in" into the image library 2202 produces long term snapshots 2206, 2208, 2210. In one or more instances, the states at critical points of time are captured to form an image version chain (e.g., version zero 2204, version one 2206, version two 2208, and version "n" 2210). In the case of a system malfunction, one or more embodiments revert to the "last known good state." One or more instances retroactively "introspect" image versions (i.e., inspect the content of the system at a point of time in the past). One or more instances "diff" (i.e., carry out a comparison to identify differences) any pair of versions at the file level to understand changes made between them. Furthermore in this regard, one or more embodiments, as part of the introspection aspect, reconstruct an earlier state. For example, when an image is checked into the image library, the contents (meta-information) are parsed and stored in the image library and the resulting data structure can subsequently be inspected. In the short term case (short-term snapshot such as in VMware) a rollback process can be carried out.

Still referring to FIG. 22, the process begins with an original image 2212 (after physical-to-virtual ("P2V") translation). This original image is imported into the image library 2202 as version zero, at 2204. An instance of the original image is started at 2230. A first adjustment is made at 2246, to transition from instance 2230 to instance 2234. Snapshots 2216, 2218 are taken of each incremental change; i.e., of instance 2232 and instance 2234 (instance 2230 is simply an instantiation of the original image after P-2-V so no snapshot is needed, although one could be taken if desired). The snapshots are of a short term nature. Upon completion of the first adjustment 2246, snapshot 2218 is checked into the (long term) image library as version one at 2206. A second adjustment is made at 2248, to transition from instance 2234 to instance 2240. Snapshots 2220, 2222, 2224 are taken of each incremental change, i.e., of instances 2236, 2238, 2240. Upon completion of the second adjustment 2248, snapshot 2224 is checked into the image library as version two at 2208. An even further adjustment is made at 2250, to transition from instance 2240 to instance 2244. Snapshots 2226, 2228 are taken of each incremental change, i.e., of instances 2242, 2244. Upon completion of the third adjustment 2250, snapshot 2228 is checked into the image library as version "n" at 2210. As indicated by the ellipsis, any desired number of adjustments can be made. Time increases along the axis from left to right. Again, the arrows from 2232-2244 to 2216-2228 represent a short-term snapshotting process and the arrows from 2218, 2224, 2228 to 2206, 2208, 2210 represent a long-term check-in process.

Elements 2230-2244 represent the same running instance at different points of time. Each small change is snapshotted as at 2216-2228; however, only the completion of significant adjustments 2246, 2248, 2250 triggers the check-in of long-term snapshots 2206, 2208, 2210. The frequency of long-term and short-term snapshots is thus different.

Short-term snapshots are relatively short-lived (such as the duration of the migration window, which typically ranges from several hours to a weekend) and contain memory states. Short-term snapshots are employed for temporary debugging purposes, and are typically intended to be discarded after debugging completes. Short-term snapshots occur more frequently, thus requiring fast (on the order of seconds) operation. Short-term snapshots can be supported by a modern hypervisor; VMware is a non-limiting example (VMware software is available from VMware, Inc., Palo Alto, Calif., USA). However, each snapshot creates a new node in a snapshot chain. In almost all implementations of snapshots in modern hypervisors, the technique of copy-on-write is used where a copy-on-write child is created on top of a read-only parent, allowing a very fast creation operation (no data copying). Subsequent write operations only go to the child, whereas read operations go to both the child and the parent. When multiple snapshots are created for the same VM, a snapshot chain is formed where each snapshot is a node in the chain. The performance of a read operation then depends on the length of the chain, because the hypervisor may have to traverse the chain all the way to the head, in order to retrieve the data being asked for.

In at least some instances, long chains lead to performance degradation and instability, and thus may not be appropriate for production systems. In one or more embodiments, short term snapshots 2216-2228 of virtual machine instances 2232-2244 are taken frequently and stored in the hypervisor as virtual machine images. Long term snapshots 2204-2210 are taken less frequently (e.g., at an initial state 2212 and after adjustments 2246, 2248, 2250) and checked in as images (2204), 2206, 2208, 2210 in image library 2202. Long term snapshots resemble long term backups but are different in several ways.

In particular, with regard to long-term snapshots, in some instances, problems may occur long after migration (e.g., in steady-state); in such cases it is still necessary to revert to the "last known good state." The customer may require a snapshot of the original image before adjustment (e.g. for audit and/or compliance purposes). Use of an image library 2202 is more suitable in such circumstances. One or more embodiments thus store images in an image library as persistent data for long term preservation. In addition, the image library provides versioning and analytics capabilities for the stored long-term snapshots. However, long-term snapshots in an image library are typically less efficient in operation (on the order of tens of minutes).

Figure 23:
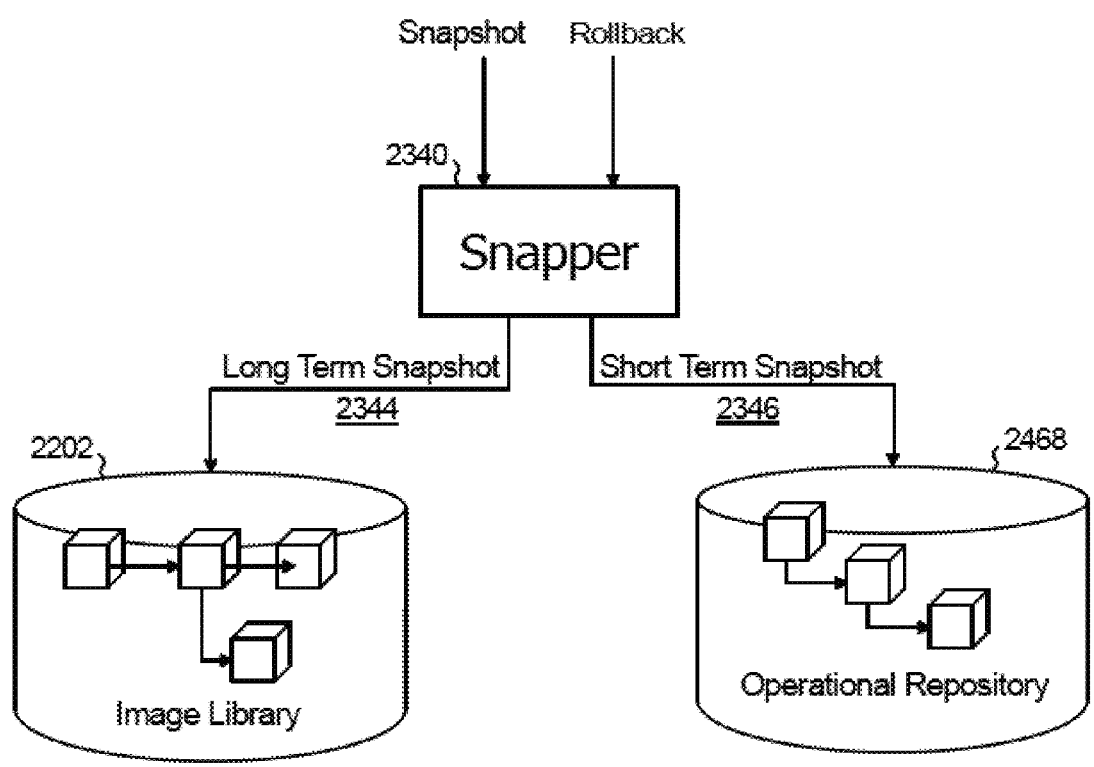
FIG. 23 presents an exemplary snapshot manager, according to an aspect of the invention.
Figure 24:
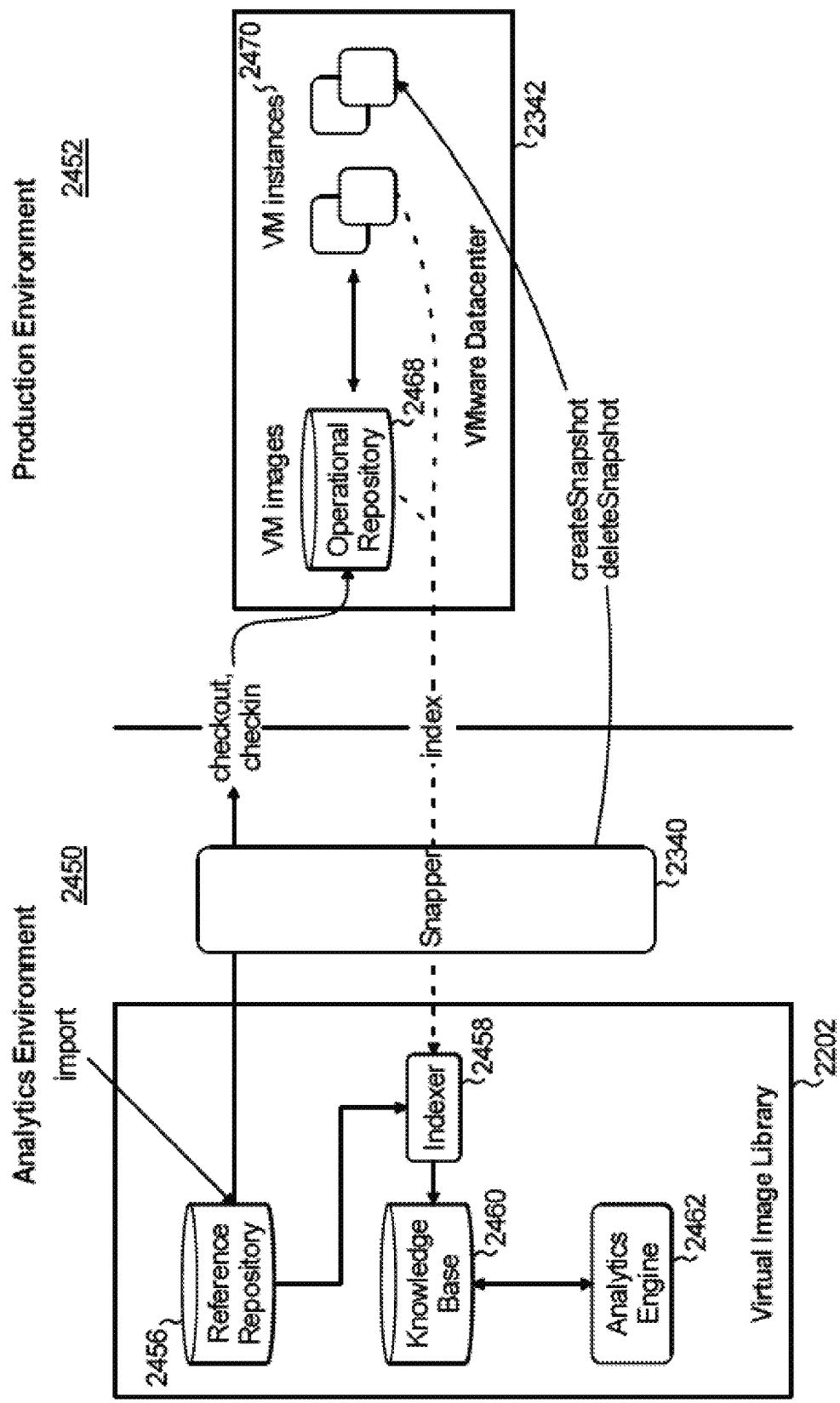
FIG. 24 presents an exemplary implementation based on a virtual image library, according to an aspect of the invention.

Referring now to FIGS. 23 and 24, in one or more instances, a snapshot management system (labeled in the figures as a "snapper" for brevity) 2340 manages both short-term snapshots 2346 and long-term snapshots 2344 (the snapshot management system also initiates rollbacks as described below). In one or more non-limiting exemplary embodiments, short-term snapshots 2346 are VMware snapshots (VM images of VM instances) that reside on an operational repository 2468 in VMware data center 2342, while long-term snapshots 2344 are checked into the reference repository 2456 of virtual image library 2202. As used herein, an operational repository is defined as a storage location where a hypervisor stores image files corresponding to running, suspended, and/or stopped VM instances. Snapshot management system 2340 creates and deletes short-term snapshots in the form of VM instances 2470 within VMware data center 2342. Images of the instances are checked in and out of the operational repository 2468 as needed. The VMware data center is used for short-term snapshots for rollback in the production environment 2452. When a long-term snapshot is desired, an image in the operational repository is checked into the reference repository 2456 within analytics environment 2450. Indexer 2458 indexes images in reference repository 2456, and optionally also indexes images in operational repository 2468 and/or VM instances 2470, to create knowledge base 2460. This knowledge base is used by engine 2462 to carry out analysis.

Furthermore in this regard, snapshot management system 2340 creates (frequently) short-term snapshots of executing virtual machine instances 2470 (snapshot management system 2340 also deletes the short term snapshots from time to time). The short term snapshots are stored as virtual machine images of the virtual machine instances 2470 executing on the hypervisor, in repository 2468. When it is desired to create a long-term snapshot (e.g., prior to an adjustment), snapshot management system 2340 causes a corresponding one of the virtual machine images in repository 2468 to be placed in reference repository 2456. On the other hand, as seen in FIG. 25, when a rollback is desired, snapshot management system 2340 checks the image out of reference repository 2456 as a template, and places it into operational repository 2468 (as seen at 2572) and then reconfigures the template to match an existing VM instance and instantiates a new virtual machine 2573 based on the template, which VM image 2573 is swapped with the existing VM instance 2574 for which rollback is desired.

For the avoidance of doubt, "check-in" refers to placing something into the virtual image library and "check-out" refers to taking something out of the virtual image library (with version control); these terms are not used in reference to the VMware data store because in this context VMware does not have version control and what occurs is simply a file copy operation. In one or more embodiments, both long-term and short-term snapshots are triggered by adjustments. Short term snapshots are taken at each incremental step in an adjustment, but long term snapshots are only taken at the beginning and end of a significant adjustment process, skipping all incremental adjustments in the middle. This is shown in FIG. 22. Other approaches could be used in other embodiments.

Note that the VIL 2202 in FIG. 24 is the same as the Image Library 2202 in FIG. 23; and the operational repository 2468 in FIGS. 23 and 24 could be, for example, a VMware data store.

Figure 25:
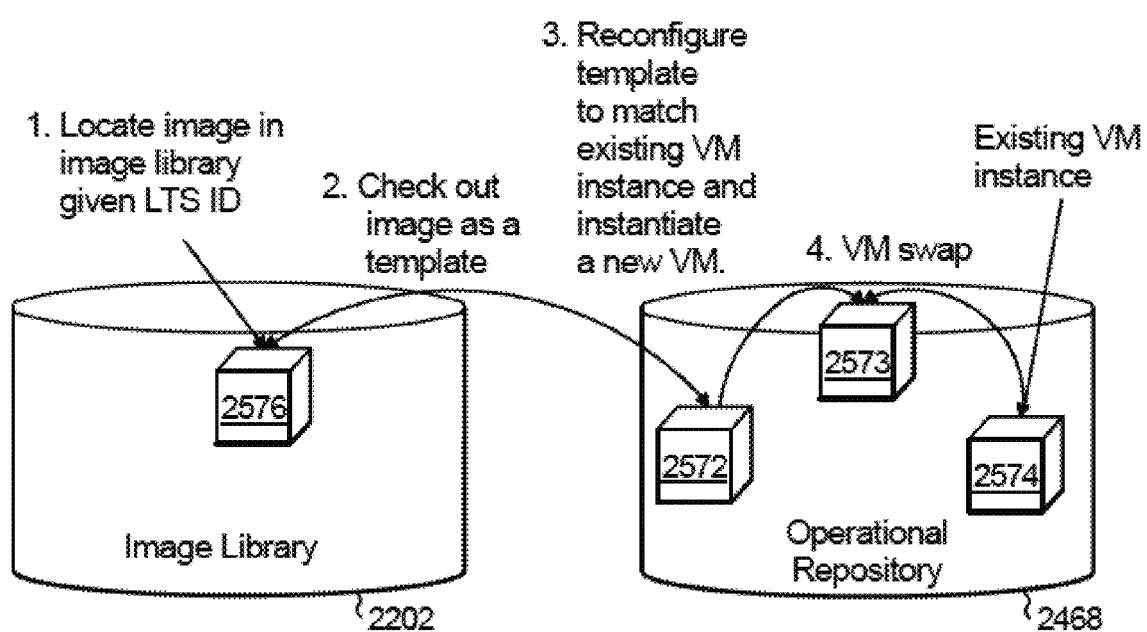
FIG. 25 presents an exemplary rollback to a long term snapshot, according to an aspect of the invention.

FIG. 25 thus shows an exemplary rollback to a particular long term snapshot. In step 1, image 2576 is located in image library 2202 based on its long term snapshot identifier (LTS ID). In step 2, the image is checked out as a template 2572 in operational repository 2468. In step 3, the template is reconfigured to match the existing VM instance 2574, and a new VM 2573 is instantiated. In step 4, the new VM 2573 is swapped for the existing virtual machine instance 2574.

Figure 26:
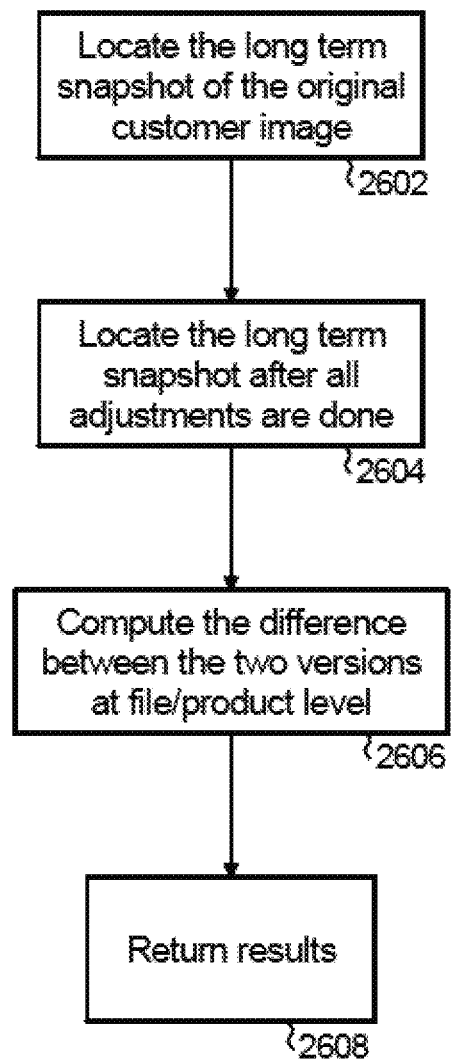
FIG. 26 is a flowchart showing steps to compute exact changes made to an image during migration, according to an aspect of the invention.

Again, to summarize, in one or more embodiments, rolling back to a long term snapshot involves the following steps:

1. Locating the image in the library given a long term snapshot ID
2. Check out the image from the library into an operational repository as an image template
3. Reconfigure template to match existing VM instance and instantiate a new VM
4. Swap the image file associated with the newly created VM instance with that of the existing VM FIG. 26 shows an exemplary flow chart for a method to compute exact changes made to an image during migration. In step 2602, locate the long term snapshot of the original customer image (e.g. 2204). In step 2604, locate the long term snapshot after all adjustments are complete (e.g. 2210). In step 2606, compute the difference (see example above) between the two versions at the file and/or product level; then, in step 2608, return the results.

Figure 27:
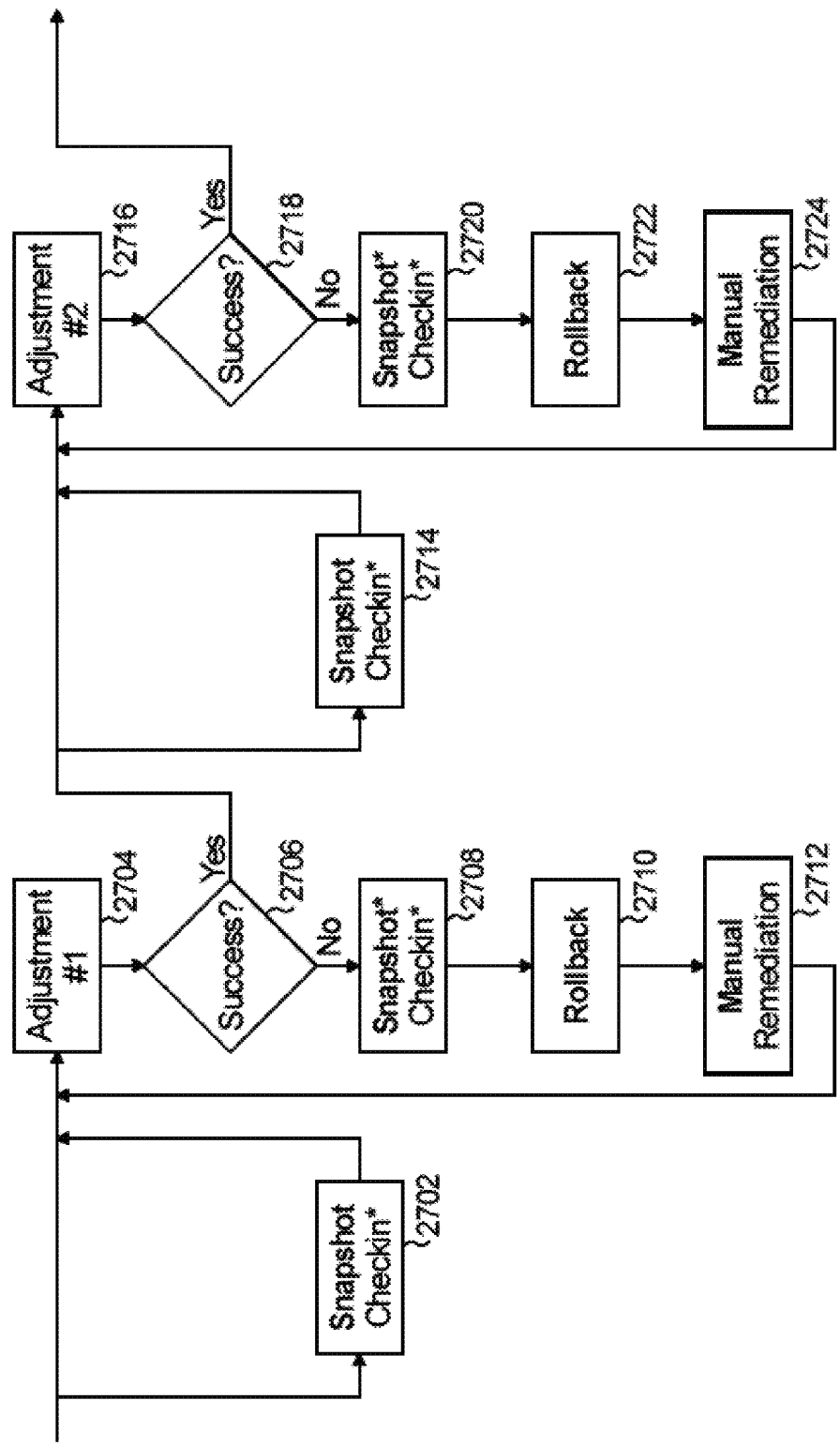
FIG. 27 is an exemplary process flow, according to an aspect of the invention.

FIG. 27 shows an exemplary process flow. As seen at 2702, a snapshot is taken of an initial state, with a selective check-in (the asterisk next to a snapshot or check-in in FIG. 27 denotes a selective snapshot or a selective check-in as the case may be). Again, a snapshot creates short term snapshots, whereas check-in creates long term snapshots. In 2704, a first adjustment is made (e.g., adjustment 2222 in FIG. 22). In decision block 2706, a determination is made (manually and/or computer-aided) as to whether the first adjustment was successful. If not, a selective snapshot and selective check-in are made in step 2708, and a rollback to the previous configuration is carried out in step 2710, with any required manual remediation carried out in step 2712. The first adjustment can then be re-tried if desired. On the other hand, if the first adjustment was successful, as seen at 2714, a snapshot is taken of the updated state, with a selective check-in. A second adjustment is then made in step 2716 (e.g., adjustment 2226 in FIG. 22). In decision block 2718, a determination is made as to whether the second adjustment was successful. If not, a selective snapshot and selective check-in are made in step 2720, and a rollback to the previous configuration is carried out in step 2722, with any required manual remediation carried out in step 2724. The second adjustment can then be re-tried if desired. On the other hand, if the second adjustment was successful, the process can continue; for example, with a snapshot of the further updated state and a selective check-in, followed by any further adjustments (not shown).

One or more embodiments thus advantageously provide a system that reduces risk in migration by using a combination of short term and long term snapshots to systematically capture system states and support roll-back to any snapshot. One or more instances provide a method for initiating short term and long term snapshots and separating them, as well as Virtual Image Library-based (VIL-based) long term snapshots. As seen in FIG. 25, one or more embodiments provide a method for rolling back to a long term snapshot. One or more embodiments permit comparison of long term snapshots at the product and/or file levels. Further, as seen in FIG. 26, one or more instances provide a method for computing the product-level and file-level changes made to the custom image during the migration process, the output of which could serve as an audit record for clients that desire same. Even further, as seen in FIG. 27, one or more embodiments provide a process that integrates snapshot and rollback with each risky operation (e.g., adjustments 2222, 2226, 2230) on a VM.

It is worth noting that, while the idea of a checkpoint has been around for a long time, it is mainly used to periodically save the states of a long running system so that if the system fails it can resume computation from the last checkpoint rather than starting from time zero (as opposed to being used for cloud migration, as in one or more embodiments).

Given the discussion thus far, it will be appreciated that, in general terms, an exemplary method, according to an aspect of the invention, includes the step of, during a process of migrating a source system into a standardized virtual environment, snapshotting virtual machine instances 2470 of the source system executing in a hypervisor 2342 as virtual machine images in an operational repository 2468 of the hypervisor. The virtual machine images in the operational repository are short-term snapshots 2216-2228. This step can be carried out, for example, by the snapshot management system 2340 invoking or issuing a command to the hypervisor (VMware is a non-limiting example of the latter). The method also includes, from time to time during the migration process, creating long-term snapshots 2344 of the source system. The long-term snapshots are created by checking given ones of the virtual machine images from the hypervisor operational repository into an image library 2202 as image objects (e.g., in reference repository 2456). This step can be carried out, for example, by the snapshot management system 2340 invoking or issuing a command to the virtual image library 2202.

Figure 28:
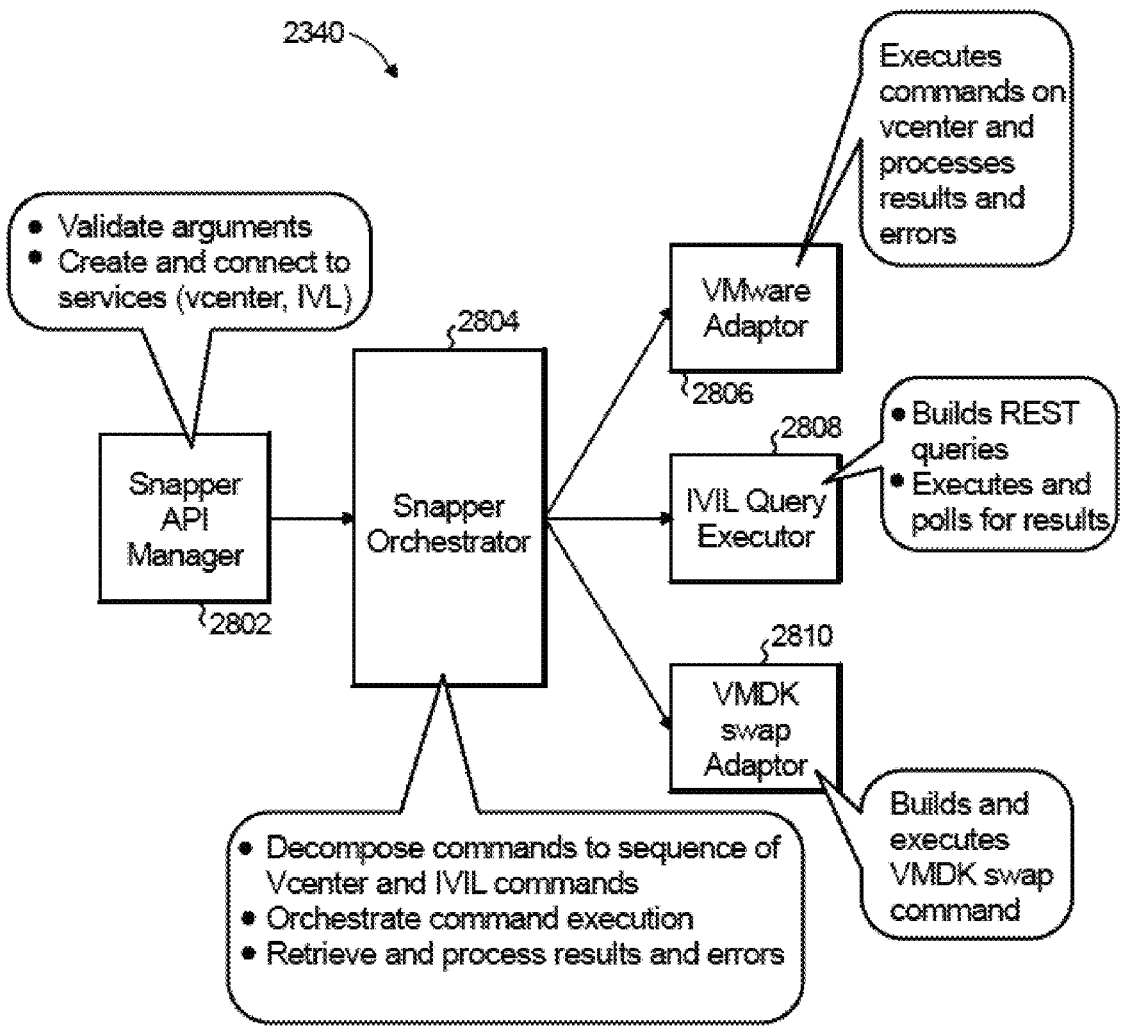
FIG. 28 is an exemplary software architecture diagram of a snapshot management system, in accordance with an aspect of the invention.

Furthermore with regard to the step of snapshotting, snapshotting mechanisms per se are typically provided by known hypervisors. However, in one or more embodiments, snapshot management system 2340 issues a command to or invokes the hypervisor. That is to say, existing hypervisors have snapshotting capability per se but in one or more embodiments, a new piece of code, namely, snapshot management system 2340, is provided. Referring to the exemplary details in FIG. 28, system 2340 has logic to determine when to issue commands. In one or more embodiments, snapshot management system 2340 has a data structure or mapping table or the like that can map a given VM ID into a long-term snapshot. System 2340 also has logic such that when asked to roll back to a long term snapshot, system 2340 will know from the mapping which version of the long term snapshot is to be obtained from the image library, checked out, and swapped as shown in FIG. 25. Snapshot management system 2340 is thus a piece of software that implements the logic in FIGS. 23 and 25 based on external input. As seen in FIG. 23, inputs include a command to take a long-term snapshot, a command to take a short-term snapshot, or a command to roll back to a previous state. API manager 2802 validates the arguments of input commands and creates and connects to any required services. Orchestrator 2804 decomposes the commands as needed to a sequence of commands that can be understood by the pertinent hypervisor and virtual image library (in this non-limiting example, VMware vCenter and IBM VIL, respectively). Orchestrator 2804 also orchestrates command execution and retrieves and processes results and errors.

For the taking of a short-term snapshot, orchestrator 2804 invokes VMware program API 2806 or other VMware adapter after the appropriate checking and conversion to an object are carried out. For the taking of a long-term snapshot, virtual image library query executor 2808 is employed to interact with image library 2202 as shown in FIG. 25. VMDK swap adapter 2810 builds and executes the VMDK swap command to implement the swapping process shown in FIG. 25.

Thus, the step of creating the long-term snapshots is carried out by the VIL 2202 under control of snapshot management system 2340. One suitable virtual image library is the IBM SmartCloud Provisioning Virtual Image Library available from International Business machines Corporation, Armonk, N.Y., USA.

It will be appreciated that a cloud, such as an MIaaS cloud or other cloud, is one non-limiting example of a standardized virtual environment.

In some cases, the creating of the long-term snapshots from time-to-time includes creating the long-term snapshots prior to significant adjustments (e.g., 2222, 2226, and 2230 in FIG. 22) during the migration process.

Some cases, as best seen in FIG. 25, further include initiating a rollback. This can be done by:
- locating a given one of the image objects 2576 in the image library 2202, as per step 1;
- checking the given one of the image objects out of the image library as a template 2572, as per step 2;
- placing the template 2572 into the hypervisor operational repository 2468; and
- instantiating the template from the hypervisor operational repository as a rolled-back virtual machine instance in the hypervisor (where it replaces an existing VM instance 2574 that was problematic, so that rollback to a previous state was desired), as per steps 3 and 4 and locations 2573, 2574.

As noted, in one or more embodiments, such rollbacks can be initiated during a steady state condition after the migration.

As shown in FIG. 26, in some cases, changes made during the migration can be determined by locating a first given one of the image objects in the image library, as per step 2602. The first given one of the image objects corresponds to one of the long-term snapshots associated with an original customer image of the source system (e.g., 2204). A further step in determining changes includes, as per step 2604, locating a second given one of the image objects in the image library. The second given one of the image objects corresponds to one of the long-term snapshots associated with a customer image of the source system after the significant adjustments are complete (e.g., 2210). In step 2606, the differences between the first and second given ones of the image objects are computed (e.g., with engine 2462—in some cases, a "diff" feature of the aforementioned IBM SmartCloud Provisioning Virtual Image Library can be employed). An even further step includes making a representation of the differences available to a human operator (e.g., via a suitable graphical user interface (GUI) displaying same on a display 24 or the like). The differences that are computed can be, for example, file-level differences and/or product-level differences.

In some cases, a further step can include assigning a version number to each of the long-term snapshots as shown in FIG. 22; i.e., V.1, V.2, . . . , V.n. The result is a version chain of images, each corresponding to significant adjustments made; effectively providing a source control system.

In another aspect, an apparatus includes a memory (e.g., RAM 30, cache 32); and at least one processor 16, coupled to the memory, and operative carry out or otherwise facilitate any one, some, or all of the aforementioned method steps. Optionally, the apparatus further includes a plurality of distinct software modules 42. Each of the distinct software modules is embodied on a computer-readable storage medium, and the distinct software modules include a snapshot management system module, a hypervisor module, and a virtual image library module, as discussed elsewhere herein. The snapshot management system module optionally includes one, some, or all of the sub-components in FIG. 28.

Replacing Virtual Machine Disks

A virtual machine (VM) is a software implementation of a computer that executes programs like a physical machine. Virtual machines may have one or more virtual disks associated therewith. One or more embodiments advantageously facilitate the growth of cloud computing by providing one or more of:

- techniques to migrate one or more disks associated with a source virtual machine (image or instance) into a target virtual machine;
- techniques to restore a virtual machine using a different set of virtual disks; and/or
- techniques that can accomplish migration and/or restoration without the need to alter the unique IDs associated with a virtual machine.

Advantageously, one or more embodiments provide techniques for replacing the disks associated with an existing virtual machine with disks of another virtual machine, or images thereof, without impacting functionality or the identity of the virtual machine. Indeed, one or more embodiments provide techniques to support the ability to replace the disks associated with a virtual machine with the disks associated with another virtual machine or image; techniques which determine the compatibility of the virtual machine configurations and their disks; and/or techniques which ensure that the resulting virtual machine continues to function after the disks have been replaced.

Figure 34:
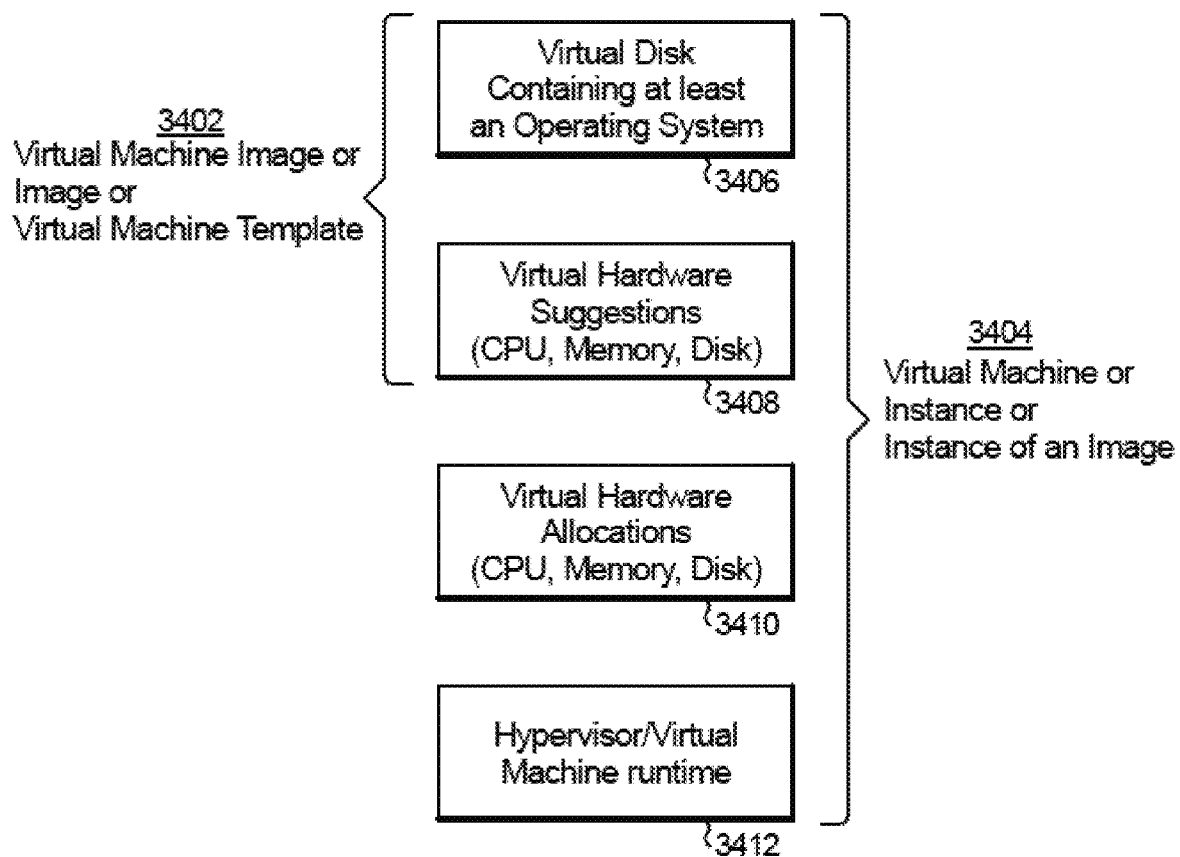
FIG. 34 depicts pertinent aspects of virtual machine images and instances.

Furthermore in this regard, and referring now to FIG. 34, in at least some embodiments, there are four states overall, as listed below. An "image" is offline/dormant/static, as in "image" of a virtual machine. An instance is a running virtual machine or registered to be able to run in a virtual machine, as in an "instance" of an image. As in FIG. 34, a "virtual machine image" or "image" or "virtual machine template" 3402 includes a virtual disk 3406 containing at least an operating system, and virtual hardware suggestions 3408 such as CPU, memory, and/or disk. A "virtual machine" or "instance" or "instance of an image" 3404 includes 3406 and 3408, as well as virtual hardware allocations 3410 of CPU, memory, and/or disk, and a hypervisor of virtual machine runtime 3412. The aforementioned four states include:

1. an image which is existing independent of a hypervisor (i.e. file on a file system)—Virtual Machine Image
2. an image which is registered to a hypervisor (i.e. template or clone source)—Virtual Machine Image
3. a virtual machine registered to a hypervisor but is not running (i.e. powered off virtual machine)—Virtual Machine
4. a virtual machine registered to a hypervisor and is running (powered on virtual machine)—Virtual Machine The replacing of the target could occur from any one of these source states. Therefore, in the most general case, the source can, but need not, be an "image" format as in (1) and (2) or it could be transported directly as per (3) or (4).

Furthermore, one or more embodiments provide a systematic way to enable a cloud to adopt an existing server without the need to migrate the application to a net new cloud instance; and/or a rule system to capture which attributes of a source and a target virtual machine should be preserved in order to maintain virtual machine functionality and to be undetectable to the parent hypervisor and/or cloud.

In at least some cases, virtual machines can be replaced without making it known to external elements, such as, for example, a cloud management stack. This capability allows for substantial changes to be made to a virtual machine (for example, replacing the contents of all disks) without the hypervisor or dependent management stack being aware of the change. One or more embodiments can be used, for example, to migrate an external virtual machine into a managed cloud, thus enabling the cloud to import existing virtual machines. Furthermore, one or more embodiments can be used to restore a virtual machine to a previous state.

Figure 29:
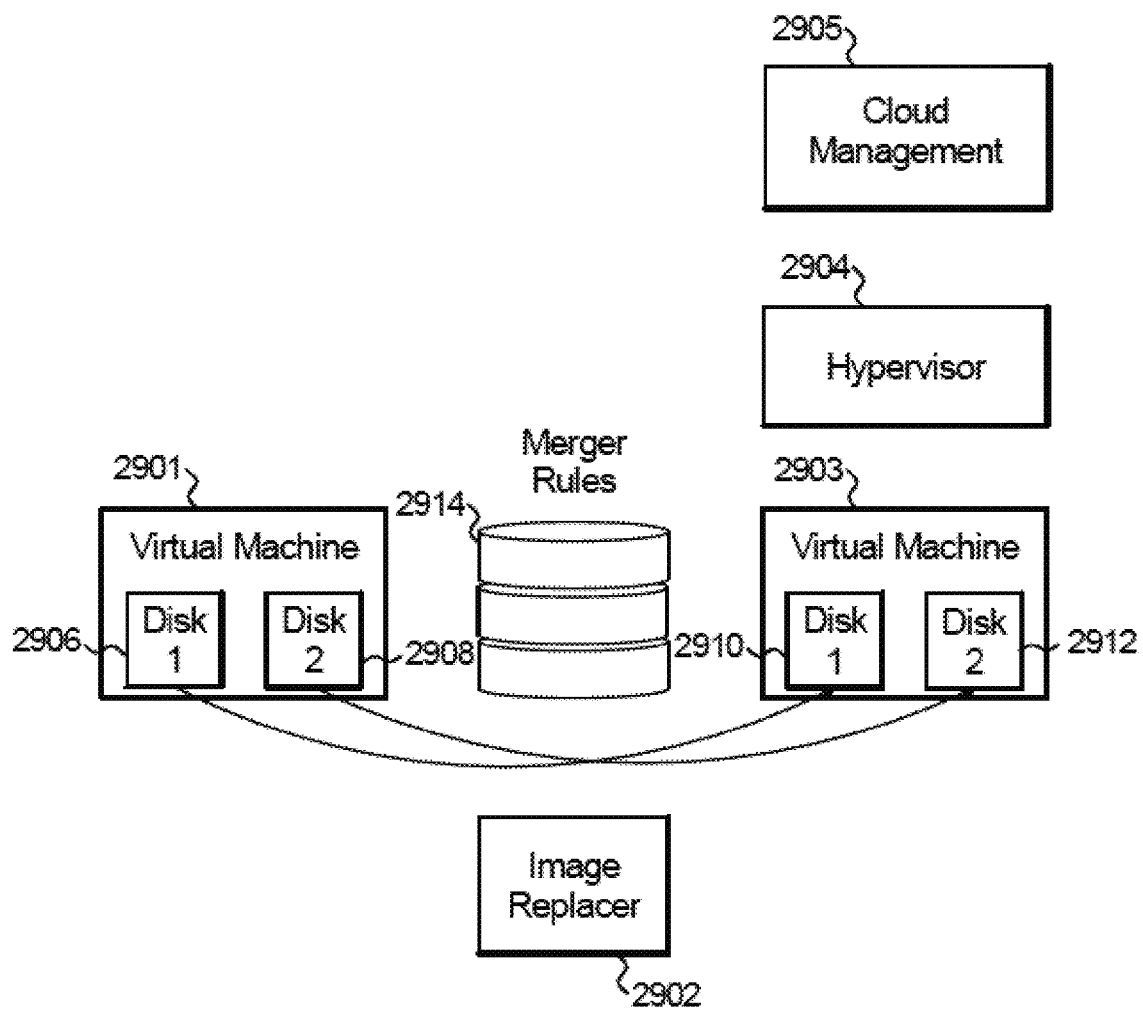
FIG. 29 presents an exemplary system diagram, according to an aspect of the invention.

Attention should now be given to the system diagram of FIG. 29. Note source virtual machine 2901 with one or more disks such as disk 1, numbered 2906, and disk 2, numbered 2908. Disks 2906, 2908, 2910, 2912 are all virtual disks. Virtual disks are discussed further in connection with, e.g., FIG. 36. The system also includes a virtual machine disk replacer such as image replacer 2902, which operates in accordance with merger rules 2914. It is desired to replace Disk 1 and Disk 2, 2910, 2912, on target VM 2903 with disks 2906, 2908. The disks 2910, 2912 also represent the after-migration state; that is, prior to migration, Disk 1 2910 and Disk 2 2912 are in an original state and after migration they have effectively been replaced with disks 2906, 2908 respectively. The target virtual machine 2903 is managed by hypervisor 2904 and the overall target cloud environment is managed by cloud management software 2905.

Figure 30:
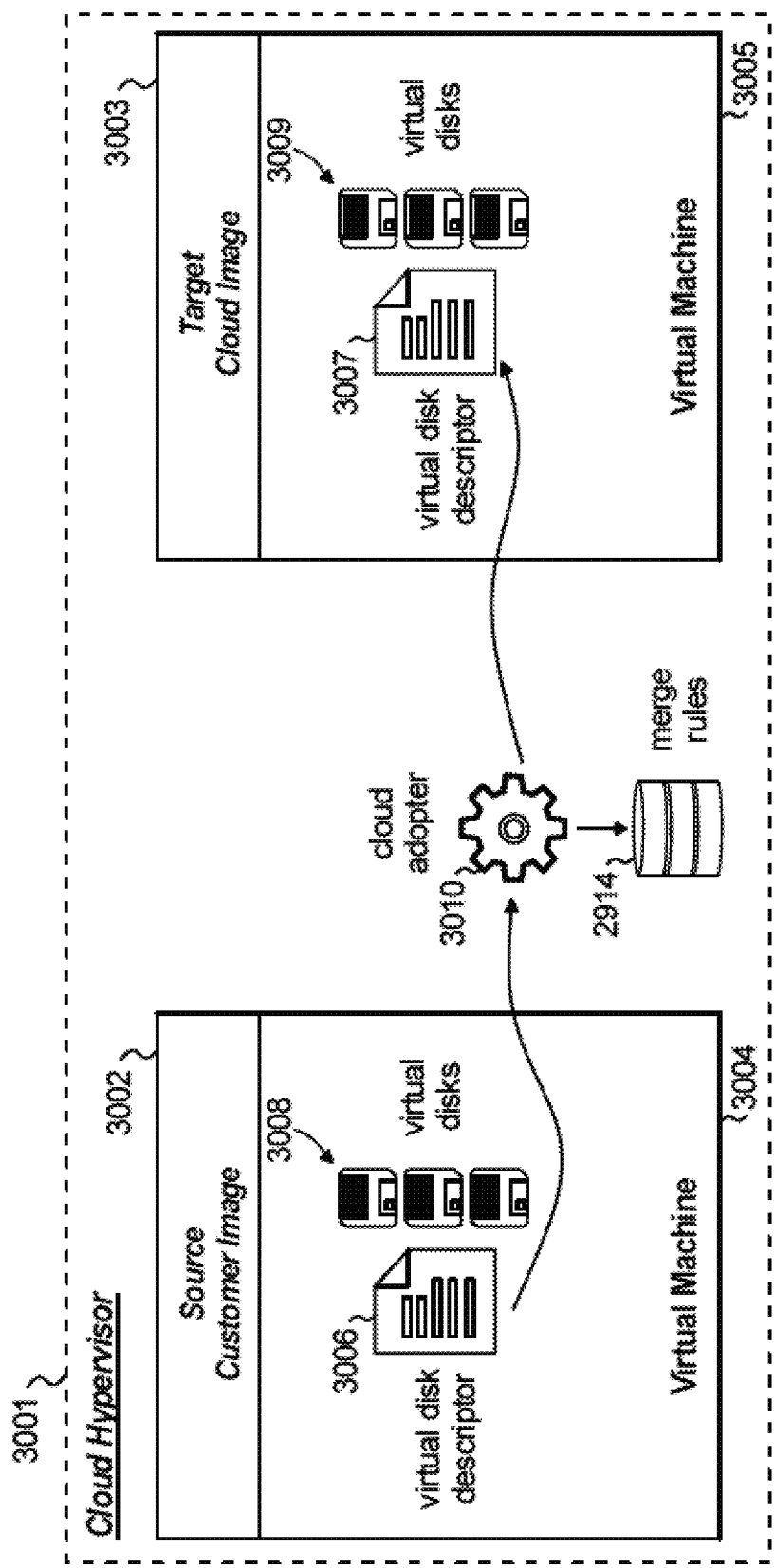
FIG. 30 presents an exemplary method, according to an aspect of the invention.

Referring now also to FIG. 30, cloud hypervisor 3001 (same as hypervisor 2904) is a hypervisor which is managed by the desired target cloud; all instances running within the hypervisor 3001 are assumed to be managed by the cloud. Note that in FIG. 29, the source is depicted external to the cloud hypervisor, while in FIG. 30, both source and target are located on the same hypervisor. These scenarios are different but both are valid and possible. The customer image is imported into the cloud environment and is the source 3002 in the technique shown in FIG. 30; cloud image 3003 is the target. As noted elsewhere, an image of source is not always required. Source 3002 is implemented on virtual machine 3004. Virtual disk descriptor 3006 is a meta-file describing the attributes of the virtual disk(s) 3008, which are the actual block allocations where the disk content is stored.

Figure 36:
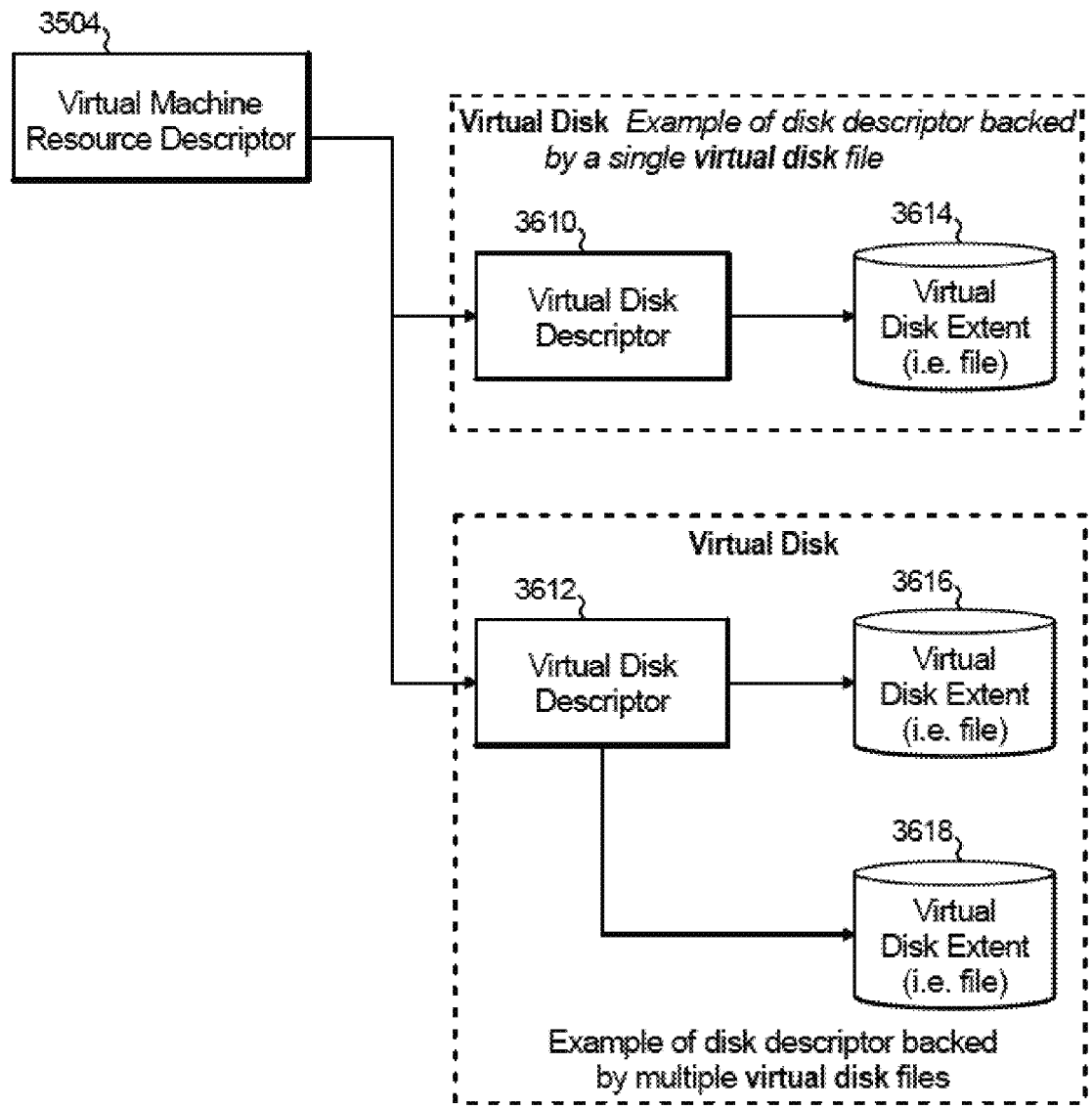
FIG. 36 shows a second embodiment of a virtual machine resource descriptor, according to an aspect of the invention.

The cloud adopter 3010 implements one or more techniques described herein in accordance with merge rules 2914. Merge rules 2914 in FIG. 30 and merger rules 2914 in FIG. 29 are the same. Element 3010 is the same as element 2902; element 3004 is the same as element 2901; and element 3005 is the same as element 2903. Disks 3008 include one of 2906, 2908. Disks 3009 include one of disks 2910, 2912. Note that FIG. 36 provides additional details on the relationships of virtual disk descriptors to virtual disk extents to virtual disks. The merge rules 2914 provide specific rules about which attributes of the source virtual disk descriptor(s), the target virtual disk descriptor(s) and process are included in the final target disk descriptor 3007. The merge rules ensure that the resulting virtual machine 3005 executes and that the cloud management layer and hypervisor 3001 cannot notice a difference. The virtual disks 3009 are the actual block allocations where the disk content is stored in the new virtual machine 3005.

Figure 31:
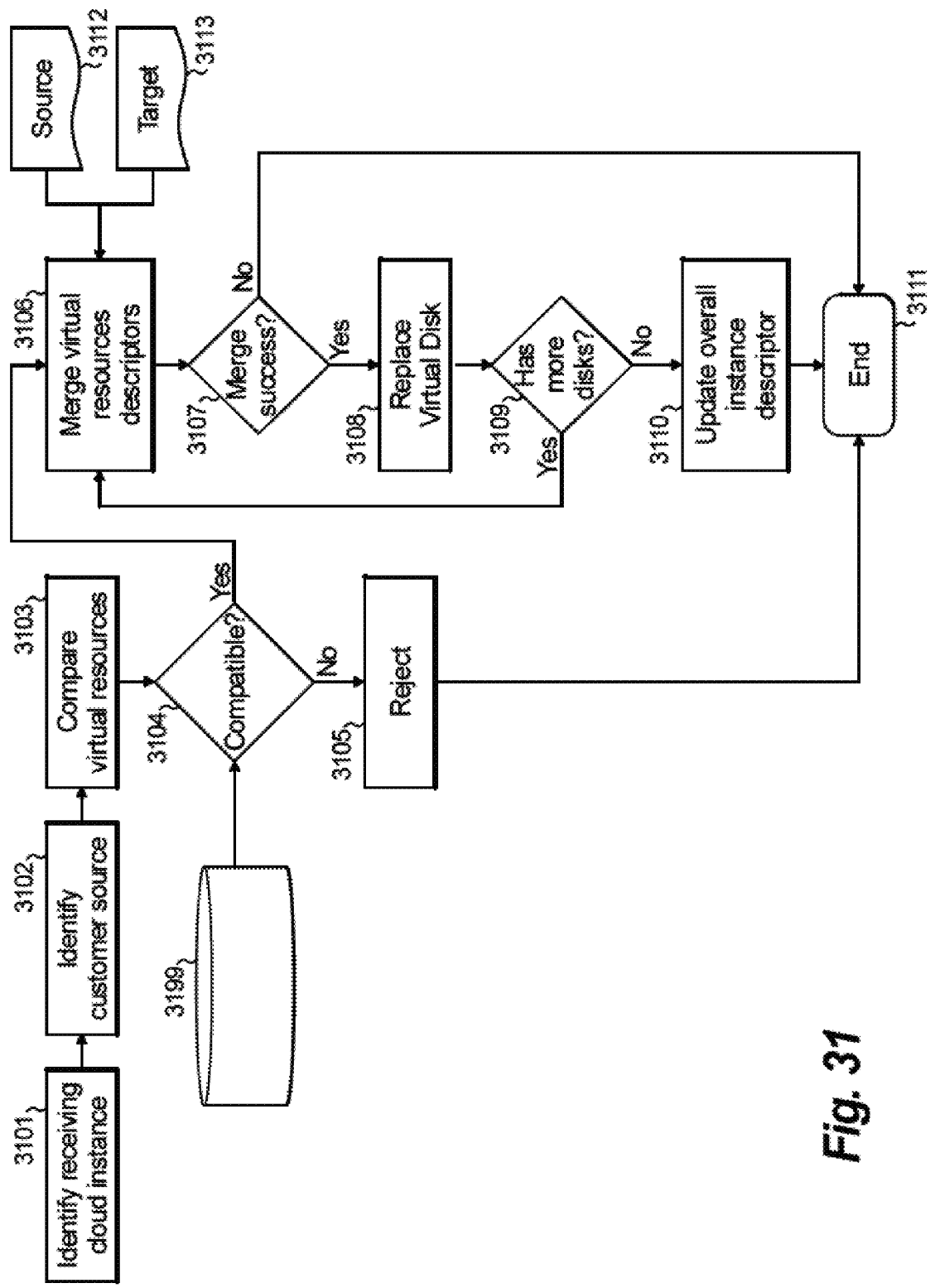
FIG. 31 presents an exemplary "swap" flow chart, according to an aspect of the invention.

With continued attention to FIGS. 29 and 30, consider also FIG. 31, which depicts a process of replacing a set of disks of a VM 2903, 3005 with those of a source virtual machine 2901, 3004. In step 3101, identify the receiving cloud instance 2903, 3003. In one or more embodiments, the target is a virtual machine (instance) that is in a powered-off state. In step 3102, identify the customer source 2901, 3002. In step 3103, compare the virtual resources of VM 2901, 3004 with those of VM 2903, 3005. In step 3104, determine if the resources are compatible; if not, reject the proposed replacement at 3105 and then the process ends at 3111.

Figure 35:
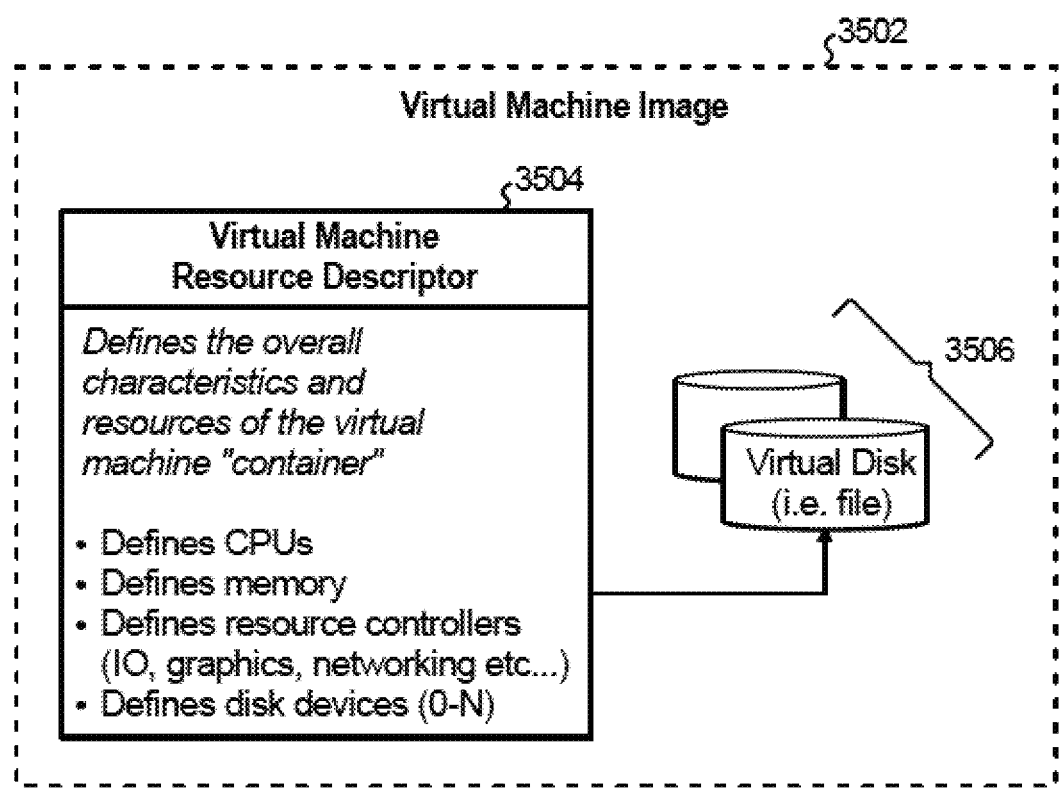
FIG. 35 shows a first embodiment of a virtual machine resource descriptor, according to an aspect of the invention.

Reference should now be had to FIGS. 35 and 36. Note VM image 3502. In a hypervisor there is typically an overall VM description (file) 3504 setting forth all the virtual hardware characteristics of the virtual machine. In some cases, as shown in FIG. 35, all pertinent disk information regarding virtual disks 3506 is contained in this single master file. In other cases, as seen in FIG. 36, the master file 3604 references other files (descriptors) 3610, 3612 which include the details of one or more virtual disks 3614, 3616, 3618.

FIG. 36 is thus an example of a virtual machine image or instance which has one level of indirection between the VM resource descriptor and the actual virtual disk. The Virtual Disk Descriptor contains meta-information about one or more backing disks. This example would present two disks to the virtual machine operating system but is realized by three separate virtual disk files.

Returning now to FIG. 31, if the virtual resources are compatible, as shown at the YES branch of decision block 3104, merge the source virtual resource descriptors 3112 (e.g., virtual disk descriptors 3006) and the target virtual resource descriptors 3113 (e.g., virtual disk descriptors 3007) in step 3106. Furthermore in this regard, elements 3007 and 3113 represent the target disk descriptor before the replacement occurs. After the merge and replace, element 3007 becomes an updated version which is a combination of parameters for the source and the target. Part of step 3108 includes the step to write the new target disk descriptor 3007. See FIG. 32.

In decision block 3107, determine if the merge of the virtual resource descriptors in step 3106 was successful; if not, the process ends at 3111. On the other hand, if the merge of the virtual resource descriptors in step 3106 was indeed successful, proceed to step 3108 and replace the virtual disk as shown at 3303 in FIG. 33. In decision block 3109, determine whether the source VM has more disks; if yes, repeat steps 3106-3109 as needed; if not, update the overall instance descriptor in step 3110. Step 3110 is optional and depends on whether the approach of FIG. 35 or FIG. 36 is used by the VMs that are being operated on. Processing ends at 3111.

Furthermore with regard to FIGS. 35 and 36, implementations can differ in that all virtual machine resource information (including disks) can be stored in a single file as in FIG. 35 or it can be separated into many files as in FIG. 36. The approach is dependent on the hypervisor and has to do with the level of decoupling of components (i.e. for the examples with virtual disk descriptors there is a reference in the overall virtual machine definition linking to those descriptors, then more information in the descriptors about the actual characteristics of the underlying disk). Step 3110 is appropriate where the approach of FIG. 36 is utilized.

Figure 32:
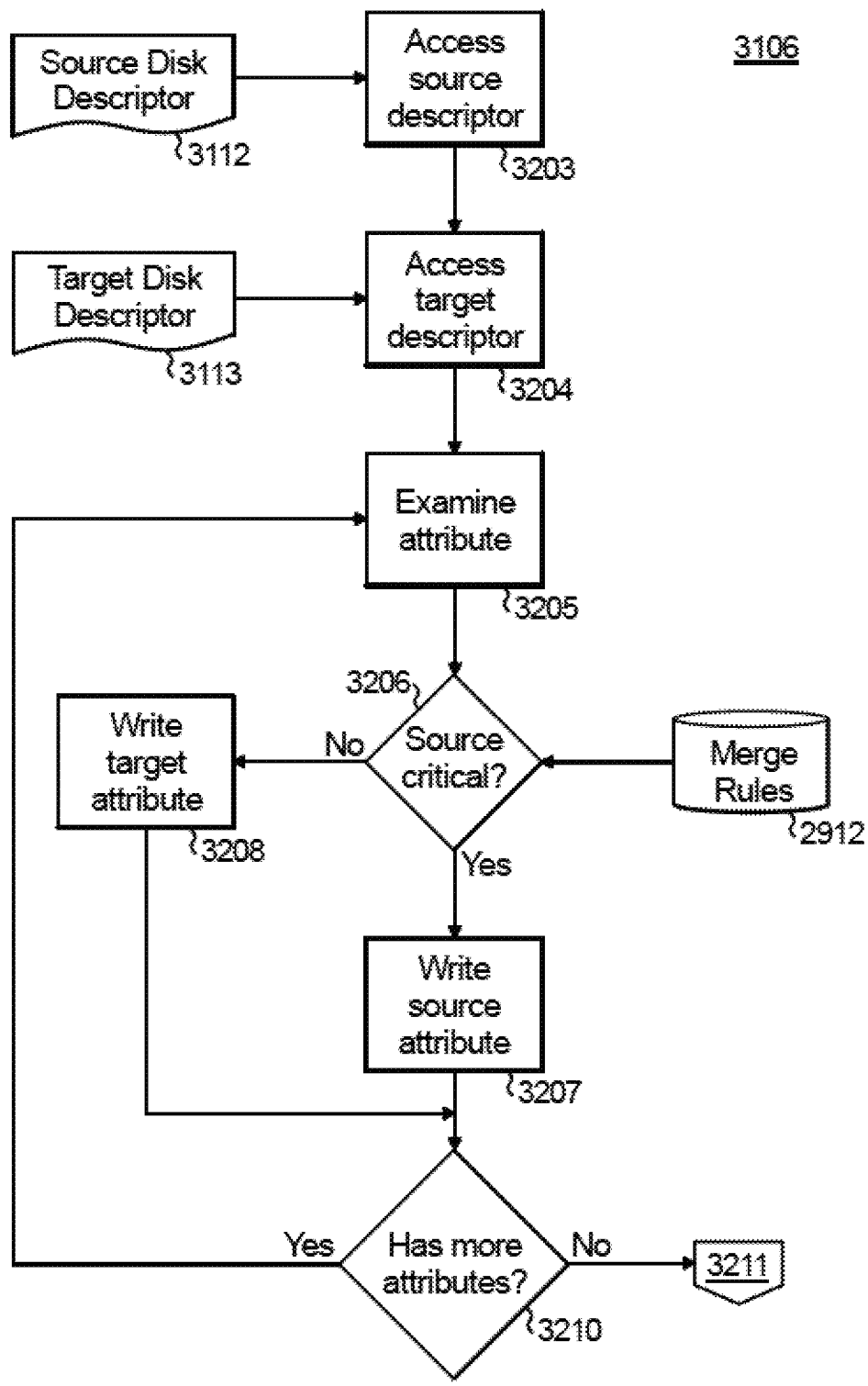
FIG. 32 presents an exemplary "merge virtual resource descriptors" flow chart, according to an aspect of the invention.

FIG. 32 presents exemplary details of the merging step 3106. In step 3203, access the source descriptors 3112. In step 3204, access the target descriptors 3113. In step 3205, examine an attribute. In decision block 3206, determine at least whether the attribute in question is critical to the source, based on the merge rules 2912.

In this regard, the merge rules 2912 are specific to the target hypervisor (non-limiting examples include VMware virtualization software available from VMware, Inc., Palo Alto, Calif., USA; KVM software (for Kernel-based Virtual Machine) (available from RedHat, Inc. Raleigh, N.C., USA), Xen software (available from Citrix Systems, Inc., Ft. Lauderdale, Fla., USA), and so on). In step 3205 and decision block 3206, a number of determinations are made as attributes of both the source and target environments are examined. Steps 3206-708 are discussed further below with regard to FIG. 37. With regard to source attributes, it may be determined, for example, that Attribute A of the source must persist to ensure continued virtual machine functioning in the target cloud. Examples of such source attributes include the Virtual disk input-output (IO) controller, the block size, the number of blocks, and so on. The same are written to the "new" target descriptor (which is a combination of both source and target parameter/values) in step 3207—see discussion of FIG. 37 below. With regard to target attributes, it may be determined, for example, that Attribute B of the target must persist to ensure that the cloud successfully adopts the virtual machine (nether hypervisor nor cloud notices a difference). Examples of such target attributes include the virtual disk unique identifier. The same are written to the new merged descriptor in step 3208. Processing then flows to step 3210.

In decision block 3210, check to see if there are additional attributes; if so, loop back to step 3205 and repeat the process until all the attributes have been examined. If there are no more attributes, the process ends at step 3211 and flow proceeds to step 3107 in FIG. 31.

Figure 37:
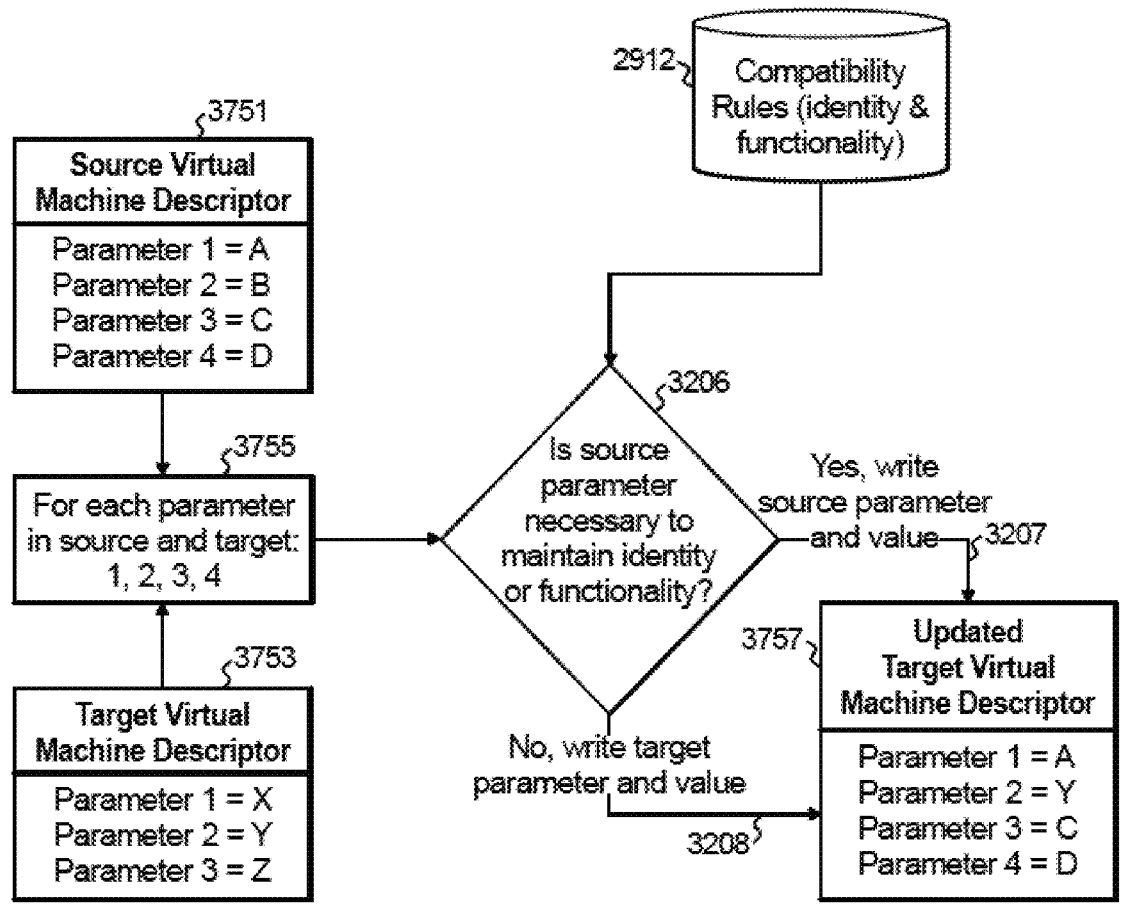
FIG. 37 is a flow chart of exemplary method steps for updating a target virtual machine descriptor, according to an aspect of the invention.

Considering now FIG. 37, source virtual machine descriptor 3751 includes Parameters 1-4 with respective values A, B, C, and D. Target virtual machine descriptor 3753 includes Parameters 1-3 with respective values X, Y, and Z. As indicated at 3755, the logic in step 3206 is applied for each parameter in the source and target descriptors, i.e., Parameters 1-4. In step 3206, target parameters dominate unless the source parameter is needed to maintain functionality or compatibility. Thus, by default, all target parameters are retained in updated target virtual machine descriptor 3757, but only the needed source parameters are retained. In the example in FIG. 37, the source parameter values for parameters 1, 3, and 4 were necessary while the target value of "Y" for parameter 2 was retained by default because that source parameter was not needed to maintain identity or functionality. It should be noted that target parameters are assumed to all be compatible as they were the initial values for the existing virtual machine which presumably functioned and was properly known to the hypervisor/management layer.

Thus, one or more embodiments provide a system and method to support the ability to replace the disks associated with a virtual machine with the disks associated with another virtual machine or image; a method which determines the compatibility of the virtual machine configurations and their disks; and/or a method which ensures that the resulting virtual machine continues to function after the disks have been replaced.

Figure 33:
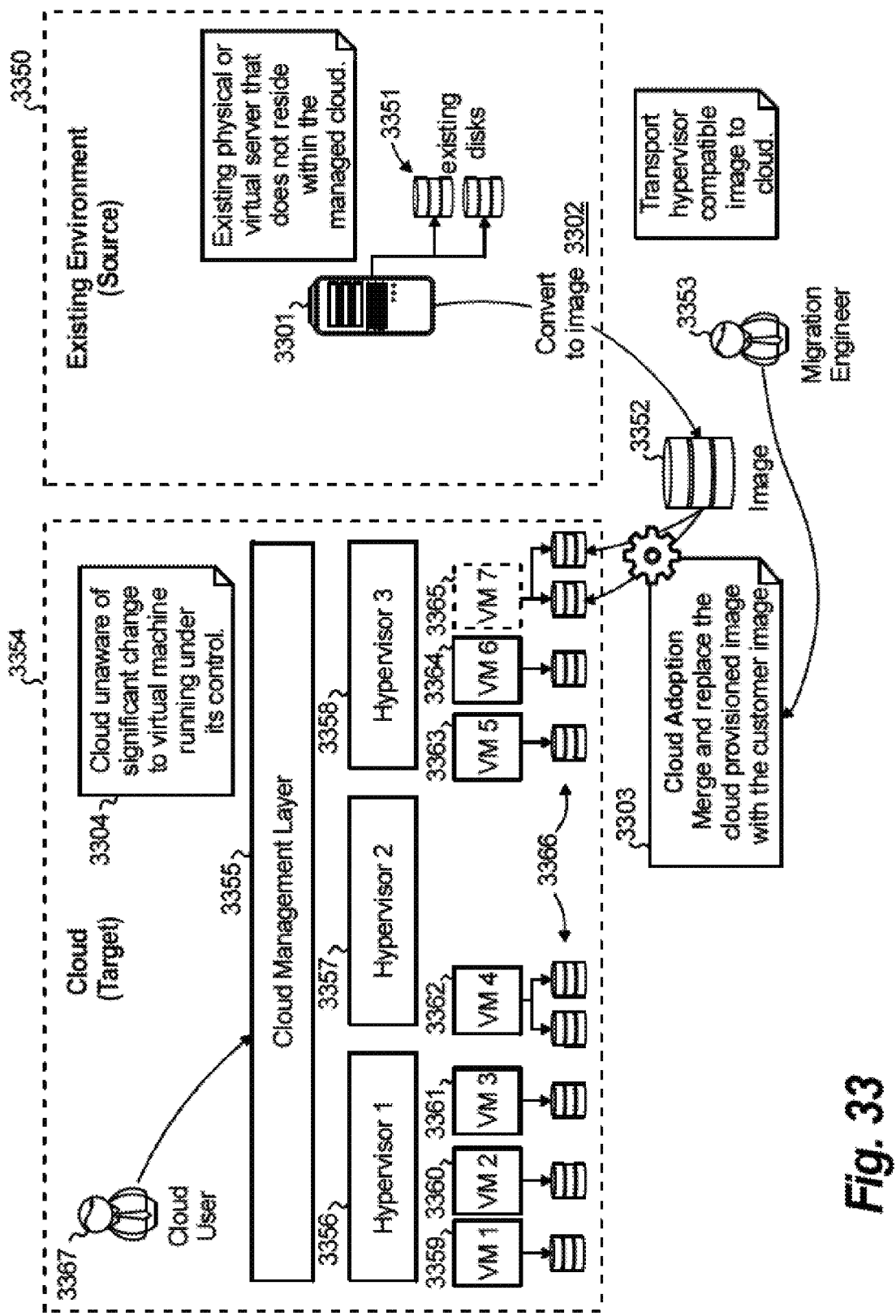
FIG. 33 presents another exemplary system diagram, according to an aspect of the invention.

Referring now to the system diagram of FIG. 33, one or more embodiments consider an existing physical or virtual server 3301 that does not reside within the managed cloud; rather, server 3301 resides in existing source environment 3350. Server 3301 has existing disks 3351. As seen at 3302, server 3301 is converted to an image 3352. This hypervisor-compatible image is then transported into the target cloud 3354. During cloud adoption process 3303, merger and replacement of the cloud provisioned image with the customer image is carried out. This process can, in some instances, be facilitated by migration engineer 3353. The cloud is unaware of any significant change to a virtual machine (here, VM7 numbered 3365) running under its control, as indicated at 3304.

Target cloud 3354 includes a management layer 3355 (which in at least some instances can be similar to layer 64 described above). Cloud user 3367 interacts with management layer 3355. Management layer 3355 manages hardware and software of the cloud environment 3354 including one or more hypervisors such as 3356, 3357, 3358. The hypervisors in turn manage one or more virtual machines 3366; in the example of FIG. 33, Hypervisor 1, numbered 3356, manages VMs 1-3 numbered 3359-3361; Hypervisor 2, numbered 3357, manages VM 4 numbered 3362; and Hypervisor 3, numbered 3358, manages VMs 5-7 numbered 3363-3365.

Thus, one or more embodiments provide a method which allows a non-cloud provisioned image to be adopted by the cloud and be treated as any other cloud provisioned instance; a process which defines how to move an existing physical or virtual server into a cloud without formal support; a system that supports merging virtual machine descriptors; and/or replacing target image disks with source image disks; and/or a method of merging virtual resource descriptors. This latter method can include, for example, retrieving virtual resource descriptor(s) from a source and target image; comparing the attributes of each virtual resource descriptor; and/or merging both descriptors into a third descriptor which is compatible with the target virtual machine configuration, the target hypervisor, the target virtual machine operating system and the target cloud.

One or more embodiments thus provide the capability to replace one or more virtual disks associated with a source virtual machine over the same number of virtual disks associated with a target virtual machine. This capability enables the ability to migrate either a virtual machine or virtual machine image into an existing virtual machine definition. This is relevant, for example, in a cloud or managed cloud scenario where the identity and features of the virtual machine are managed at a higher level (i.e. to track capacity, licensing, and so on). If the identity changes, the management layer would lose track of the system. Another scenario allows for the restoration of a virtual machine to a previous state by allowing its current set of virtual disks to be replaced by a previously captured set of virtual disks. A further possibility allows the re-use of virtual machine "containers" by simply replacing the virtual disk contents as opposed to creating entirely new containers each time.

Given the discussion thus far, it will be appreciated that, in general terms, an exemplary method, according to an aspect of the invention, includes the step 3106 of merging at least one target virtual disk descriptor 3007, 3113 that describes at least one virtual disk 2910, 2912, 3009 associated with an existing target virtual machine 2903, 3005 in a target virtualized environment with at least one source virtual disk descriptor 3006, 3112 that describes at least one virtual disk 3352 associated with a source. The merging is carried out in order to obtain at least one merged virtual disk descriptor (also represented by 3007; i.e., element 3007 represents the descriptor before the merge and also after the merge at which point it has some source parameters). The at least one merged virtual disk descriptor is compatible with the target virtualized environment. In some cases, step 3106 can be carried out using a "MergeDiskMetaData" sub-module 3913 of a swap module 3901, executing on at least one hardware processor, as described below in connection with FIG. 39. A further step 3108 includes replacing the at least one virtual disk associated with the existing target virtual machine in the target virtualized environment with the at least one virtual disk associated with the source, in accordance with the merged plurality of virtual resource descriptors. In some cases, step 3108 can be carried out using a "PutDisk" sub-module 3915 of a swap module 3901, executing on at least one hardware processor, as described below in connection with FIG. 39.

Figure 39:
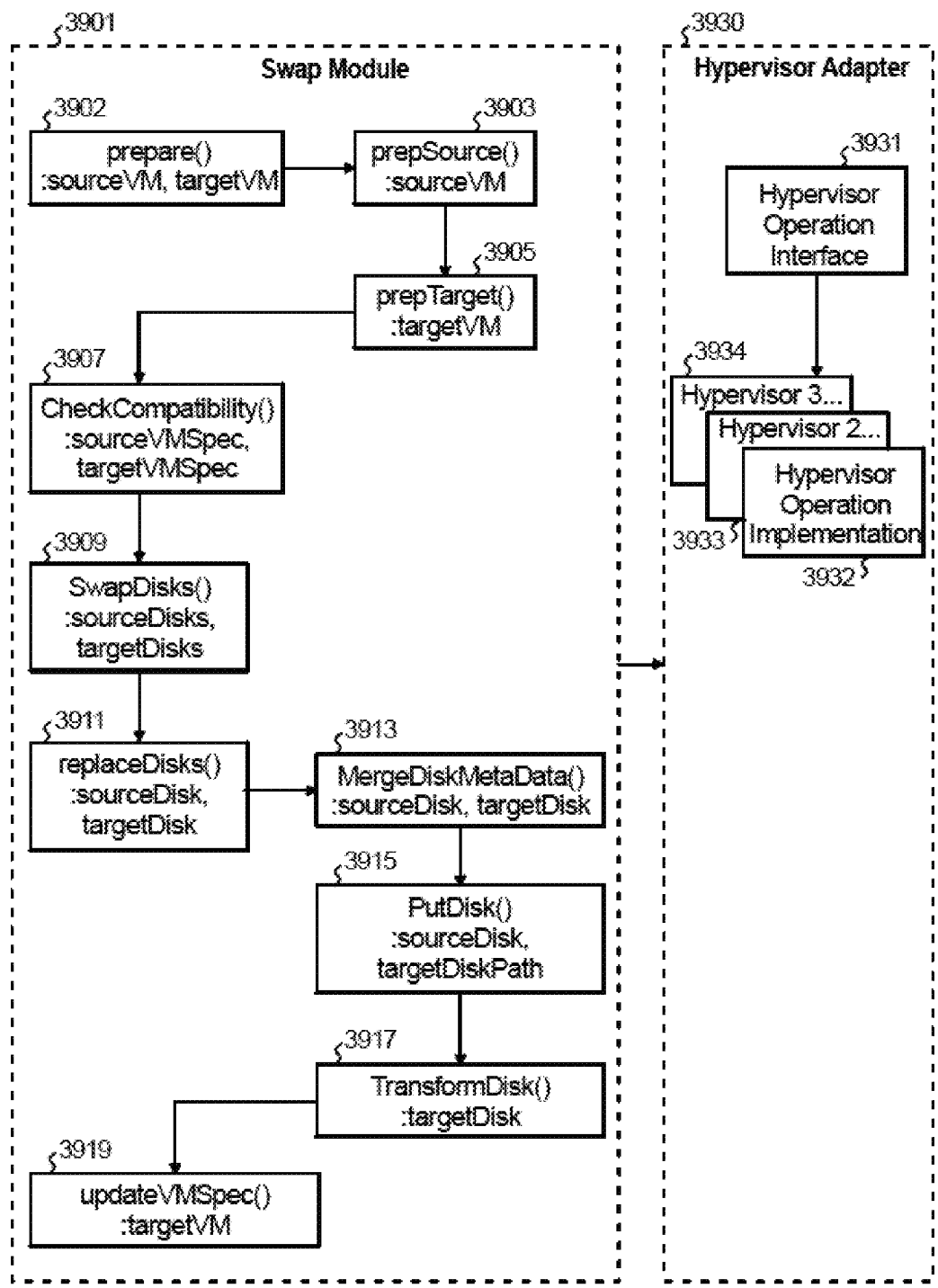
FIG. 39 is an exemplary software architecture diagram, according to an aspect of the invention.

Furthermore in this regard, in FIG. 39, note swap module 3901. Preparation sub-module 3902 ensures that the source and target VMs are in a state wherein they can be operated upon (image versus instance). Any needed preparations are carried out by prepSource sub-module 3903 and prepTarget sub-module 3905, for the source and target, respectively. CheckCompatibility sub-module 3907 makes sure that the source and target are compatible. SwapDisks sub-module 3909 and replaceDisk sub-module 3911 include control logic to implement the looping in FIG. 31 through the tasks assigned to sub-modules 3913 and 3915; i.e., steps 3106 and 3108.

TransformDisk sub-module 3917 addresses issues if the source does not match the target specification; it transforms the actual virtual disk to make it indistinguishable. One example is if the source and target virtual disks are of different sizes. This will typically not impact the hypervisors but could cause issues with future operations such as "extend disk." The updateVMSpec sub-module 3919 carries out the optional step 3110 associated with FIG. 36-type configurations. Hypervisor adapter module 3930 merges in each of the functions to the APIs 3931 exposed by the hypervisors 3932, 3933, 3934; namely, the ability to copy files, move files, obtain descriptors, and update descriptors. The ellipses with regard to 3933, 3934 refer to "operation implementation" as spelled out in 3932.

Figure 38:
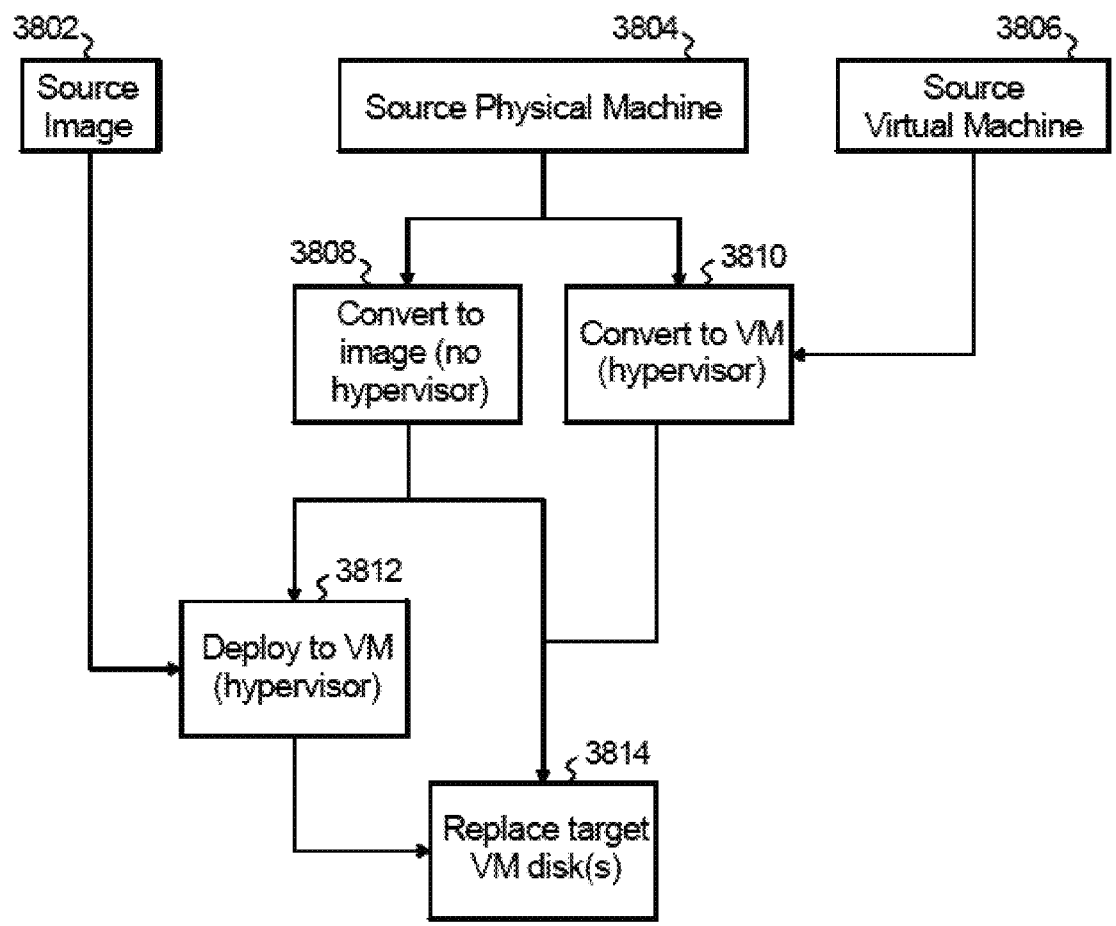
FIG. 38 is a flow chart of exemplary preparatory method steps, according to an aspect of the invention.

Furthermore with regard to prepare block 3902, refer to FIG. 38. The prepare function obtains or accesses the source image 3802, source physical machine 3804, or source virtual machine 3806 and brings same to a state where the replace operation can be carried out. Source image 3802 can simply be deployed to a VM under a hypervisor, as shown at 3812. Source physical machine 3804 can be converted to an image in the case of no hypervisor, as shown at 3808, or converted to a VM in the case of a hypervisor, as shown at 3810. Source VM 3806 can also be converted to a VM as in 3810. In each case, flow proceeds as appropriate to the target VM disk replacement at 3814.

The modules and/or sub-modules shown in FIGS. 38 and 39 can be written in a variety of languages; Perl is a non-limiting example.

In some cases, the target virtualized environment is a target cloud environment. One or more embodiments are believed to be especially useful with respect to clouds because clouds are sensitive to the changing of identity.

One or more embodiments thus address the replacement of virtual disks which is supported by the merging of meta-data about those virtual disks.

In some instances, the source is a customer source outside the target cloud environment, and the replacing includes migrating the at least one disk associated with the source to the at least one disk associated with the existing target virtual machine, as depicted, e.g., in FIG. 33.

In at least some embodiments, an additional step 3103 includes comparing virtual resources of the at least one disk associated with the existing target virtual machine and the at least one disk associated with the customer source outside the target cloud environment. In such cases, the merging is in response to the comparing of the virtual resources indicating compatibility thereof, as per the YES branch of decision block 3104.

In at least some embodiments, an additional step 3107 includes checking for success of the merging step. In such cases, the replacing in is response to the checking indicating the success of the merging step, as per the YES branch of decision block 3107.

With regard to the decision in decision block 3104, one or more embodiments make use of a data repository 3199 which tracks known compatibilities. These compatibilities, for instance, would compare the IO adapter or the like across the source and target to determine if the source operating system would be able to function with the target adapter (if different). In some embodiments, a check is also made to ensure that the number of disks matches (i.e. might be unable to merge a source with two disks into a target with one disk). Overall, the content of database 3199 may, for example, be mined from the technical limitations associated with both the operating system and software contained within the virtual machine/image as well as any compatibility issues at the hypervisor level (i.e. maximum disk size, maximum number of disks, and so on).

An analogous approach may be used to develop a data store (omitted from figure to avoid clutter) on which the decision in block 3107 may be based.

As indicated by decision block 3109, in some cases, the merging and replacing steps are repeated for one or more additional source virtual disks. This overall flow can operate on each virtual disk associated with the source image/virtual machine. The decision block 3104 check is a go/no-go before any changes are made. The 3106, 3108 processes are the actual updating of the disk meta-data and replacing of the disk.

In at least some cases, an additional step 3110 includes updating an overall instance descriptor. Again, step 3110 is optional and depends on whether the approach of FIG. 35 or FIG. 36 is used by the VMs that are being operated on.

In some cases, the merging step 3106 includes, as seen at 3205, examining at least one source attribute associated with the at least one source virtual disk descriptor and examining at least one target attribute associated with the at least one target virtual disk descriptor. A further step 3206 includes applying a plurality of merge rules 2912 to the at least one source attribute and the at least one target attribute to obtain the at least one merged virtual disk descriptor. The merge rules persist, in the at least one merged virtual disk descriptor, source attributes needed to ensure continued virtual machine functioning in the target cloud and target attributes required for the target cloud to successfully adopt the virtual machine.

Furthermore in this regard, in one or more embodiments, there are descriptors for the source, the target before the merge, and the target after the merge. The source and target merge to create an updated target. The target virtual machine continues to function properly as does the runtime of the virtual disks which have been replaced into it.

Non limiting examples of merge rules used in applying step 3206 include persisting a virtual disk input-output controller of the at least one virtual disk associated with the source; persisting a block size and number of blocks of the at least one virtual disk associated with the source; and persisting a virtual disk unique identifier of the at least one virtual disk associated with the existing target virtual machine.

In some cases, a source disk image is already available. Also, as discussed above, the replacing of the target could occur from any one of source states (1)-(4), and in the most general case, the source can, but need not, be an "image" format. In some cases, as seen at 3302, an additional step includes converting a source instance to obtain a source disk image 3352.

In at least some cases, the target virtual machine 2903, 3005 has a target virtual machine configuration; the target virtual machine 2903, 3005 is hosted on (a guest of) a target hypervisor 2904, 3001; and the target virtual machine 2903, 3005 optionally has a target operating system. In the merging step 3106, the compatibility with the target virtualization environment includes at least compatibility with the target virtual machine configuration and the target hypervisor. Optionally the compatibility with the target virtualization environment further includes compatibility with the target operating system.

With regard to the target virtual machine not having an operating system in some cases, one example is a PXE boot system or system booting from CD/DVD; the same could have all of its disks replaced without impacting the "operating system."

In addition to migration applications, in some cases, the source 2901 is a back-up source; and the replacing includes restoring the at least one disk (e.g., 2910 or 2912) associated with the existing target virtual machine using the at least one disk image associated with the back-up source.

As noted elsewhere, in one or more embodiments, there is no change to functionality and identity of the VM 2903, 3005, 3365, and/or the process is not detectable to the parent hypervisor 3358 and cloud management 3355. It should be noted that hypervisors typically have the concept of a unique identifier for the virtual machine that is not duplicated within the virtualization environment. The skilled artisan will be familiar with same, for example, from VMware and KVM (for Kernel-based Virtual Machine, a full virtualization solution for Linux on x86 hardware containing virtualization extensions). The VMware Virtual Machine UUID (backed by a field called uuid.bios in the virtual machine descriptor file—a .vmx) is a non-limiting example of a unique identifier. This, in one or more embodiments, any type of unique identifier or associated data stored in the hypervisor or management stack remains consistent and unchanged. The operation/behavior of the replaced target disks is equivalent to that of the original runtime with the source disks. Thus, in some cases, when replacing the at least one virtual disk associated with the existing target virtual machine in the target virtualized environment with the at least one virtual disk associated with the source, a unique identifier of the existing target virtual machine is maintained prior and subsequent to the replacement.

In another aspect, an apparatus includes a memory (e.g., RAM 30, cache 32); and at least one processor 16, coupled to the memory, and operative carry out or otherwise facilitate any one, some, or all of the aforementioned method steps. Optionally, the apparatus further includes a plurality of distinct software modules 42. Each of the distinct software modules is embodied on a computer-readable storage medium, and the distinct software modules include a MergeDiskMeta-Data module and a PutDisk module; as discussed elsewhere herein.

Adjustment to Managed-Infrastructure-as-a-Service Cloud Standard

A hardware infrastructure as a service cloud (HIaaS Cloud) provides bare bone virtual machines as a service. It may also provide an operating system and applications; however, support is typically not provided for any software installed on the virtual machine (VM). A non-limiting example is the Amazon Elastic Compute Cloud (Amazon EC2) available from Amazon Web Services LLC Seattle, Wash., USA. A managed infrastructure as a service cloud (MIaaS Cloud) provides full service virtual machines. The service contract includes providing software services for the underlying virtual machine. These services include software upgrades, patch support, support for compliance, license management, and the like for the provided software infrastructure. A non-limiting example is the IBM SmartCloud Enterprise+ also known as IBM SCE+, cloud environment available from International Business Machines Corporation, Armonk, N.Y., USA. Image-based migration uses customer images for migration of the application to the cloud. This approach minimizes expensive application re-installation. A cloud standard is the minimum set of requirements needed to be met by a customer image to be run and managed in cloud.

One or more embodiments advantageously provide a system and method for rapid, reliable, and reduced cost adjustment to MIaaS cloud standard. One or more embodiments take an arbitrary customer instance and perform a set of changes so that the MIaaS management layer can manage the customer application exactly as it would manage an application created from its own golden masters (reference models from which copies are mass-produced). One or more embodiments provide a process which is rapid (the end-to-end duration of standardization is small (e.g., <4 hours)); exhibits reduced cost (the amount of time spent by a migration engineer is quite small (e.g., <30 minutes); and reliable (images coming out of the process are standard with high reliability and meet all customer preferences). Furthermore, one or more embodiments provide a two-step process wherein customers and cloud engineers formulate a flexible standardization plan in line with customer preferences and cloud standard, and wherein an automated framework executes the plan in a reliable fashion in conformance with the rules.

In one or more embodiments, rules are used to uniformly encode adjustment recipes across various kinds of images; image adjustments are used for standardization; and/or a generic orchestration framework is used to deal with multiple types of adjustment actions.

Currently, with regard to attempts to standardize migration to MIaaS environments, it should be noted that an MIaaS delivery model is dependent on having pre-fabricated virtual machine images, which meet all the services requirements. Currently, standardization for image-based migration is manual and suffers from being time consuming, costly, and unreliable. Current techniques are time-consuming because a large number of long running steps are needed. Current techniques are costly because all steps are performed manually. Furthermore, current techniques are unreliable; furthermore in this regard, since source instances are different, a migration engineer needs to manually identify the right set of steps to be performed on each source instance. The result is that required steps may be missed; unwanted steps may be performed and corrupt the instance; and/or many decisions are not technical and need to be taken in consultation with the customer. That is to say, the migration engineer may not be suited for deciding on the fly.

Figure 40:
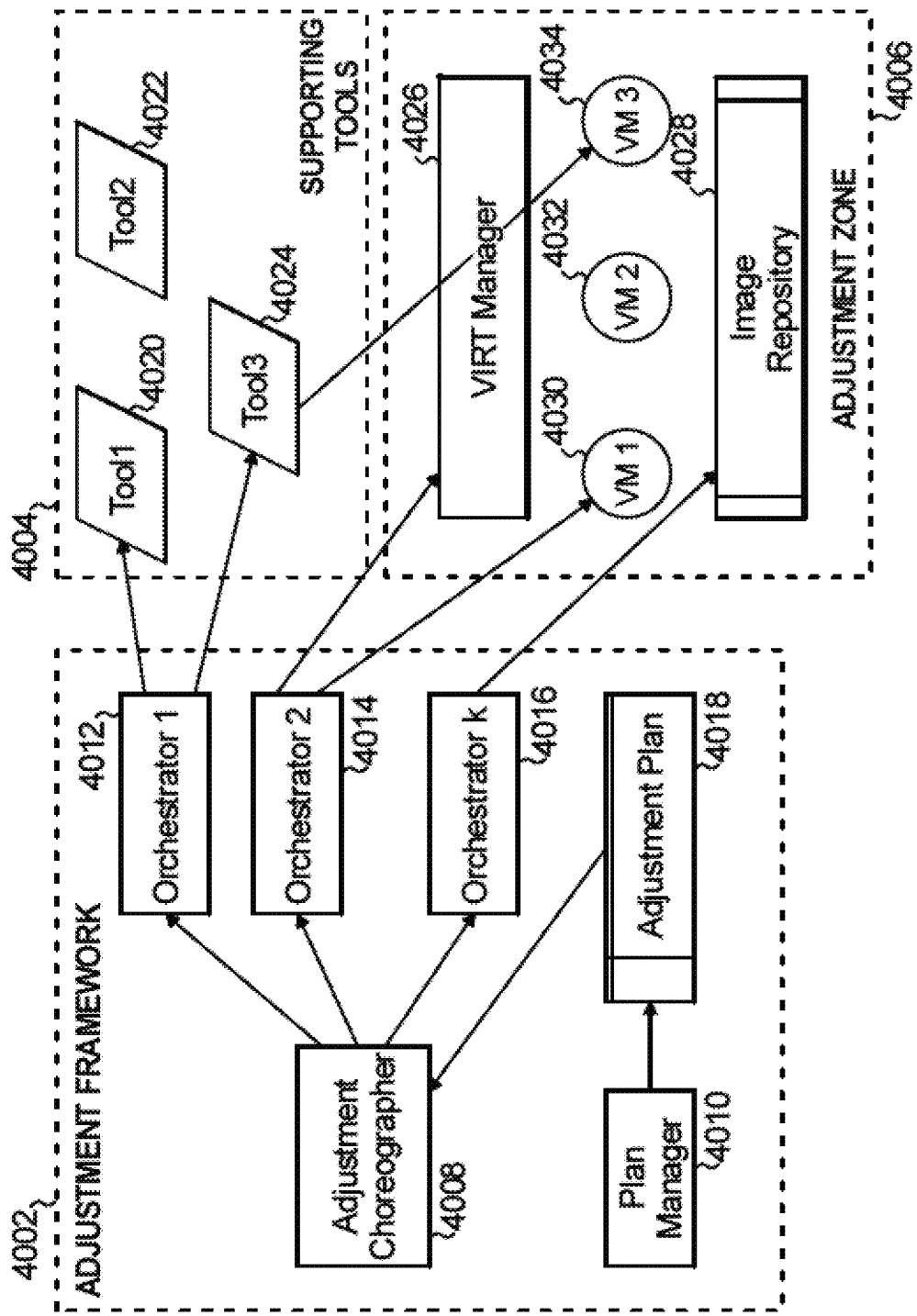
FIG. 40 presents a standardization framework, according to an aspect of the invention.

One or more embodiments advantageously provide a rapid standardization approach. One or more embodiments define a generic framework, as seen in FIG. 40, in which standardization plans can be injected. Note adjustment framework 4002; supporting tools 4004 including individual tools 4020, 4022, 4024; and adjustment zone 4006. Adjustment plans 4018 can encompass a wide variety of adjustment actions. Each type of action is orchestrated by its orchestrator 4012, 4014, 4016; the orchestrators operate under control of adjustment choreographer 4008. New actions can be added to an existing plan, allowing the framework to be extensible. Adjustment actions can also include offline adjustments, which do not require an instance to be running.

New orchestrators 4012, 4014, 4016 and actions can be registered in the adjustment plan 4018 (for example, using a suitable plan manager 4010). Each orchestrator 4012, 4014, 4016 may interact with the virtual machines 4030, 4032, 4034 (online), image repository 4028 (offline), virtualization manager 4026, or any other supporting tools (e.g., IBM Tivoli® Endpoint Manager (TEM) server, IBM Tivoli Provisioning Manager available from International Business Machines Corporation, Armonk, N.Y., USA; VMware vCloud Director available from VMware, Inc. Palo Alto, Calif. USA).

One or more embodiments provide a rapid standardization system and method which utilizes offline adjustments. Offline adjustments are file system patches that can be applied to a virtual machine image. Adjustments will make changes to the image to meet the cloud standard (e.g., install a Secure Shell (SSH) service). Offline adjustments can be applied in parallel and without using up any compute resources, thus enabling rapid adjustments. Offline adjustments include simple file system copies or other operations not requiring the VM to be activated. This takes much less time than actual execution of the install/configuration steps (again, enabling rapid adjustment). Offline adjustments can be applied without booting up the image and do not need network access to the image. This advantageously solves the chicken-and-egg problem wherein access to the VM in cloud requires configuration (thus removing manual steps).

Figure 41:
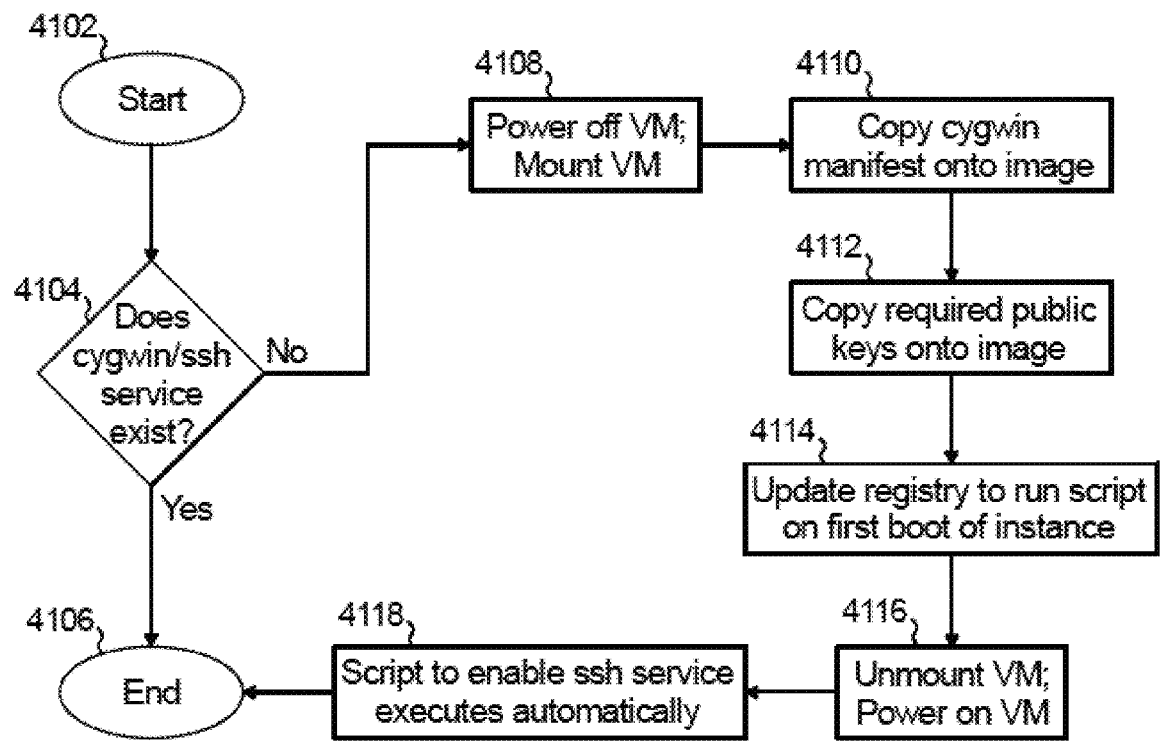
FIG. 41 presents a flow of a sample offline adjustment, according to an aspect of the invention.

The flow chart of FIG. 41 shows the flow of a sample offline adjustment. The flow chart begins at 4102. In decision block 4104, determine, for example, whether cygwin/ssh service exists. In this regard, Cygwin is a Unix-like environment and command-line interface for Microsoft Windows. Cygwin provides native integration of Windows-based applications, data, and other system resources with applications, software tools, and data of the Unix-like environment. Thus it is possible to launch Windows applications from the Cygwin environment, as well as to use Cygwin tools and applications within the Windows operating context.

In this example, as seen at the "YES" branch of block 4104, if the cygwin/ssh service already exists, further processing is not needed so proceed to the end and 4106. On the other hand, if the cygwin/ssh service does not already exist, as seen at the "NO" branch of block 4104, in step 4108, power of the virtual machine and mount the virtual machine. In step 4110, copy the cygwin manifest onto the image. In step 4112, copy the required public keys onto the image. In step 4114, update the registry to run the script on the first boot of an instance. In step 4116, dismount the virtual machine and power on the virtual machine. In step 4118, the script to enable the ssh service now executes automatically; proceed to end step 4106. It should be emphasized that FIG. 41 is but one specific detailed example demonstrating how an offline adjustment can be carried out in one or more embodiments. Furthermore in this regard, as noted, offline adjustments are file system patches that can be applied to a virtual machine image; implementing cygwin/ssh service is thus a non-limiting specific example of many kinds of offline adjustments that can be carried out in one or more embodiments.

Figure 42:
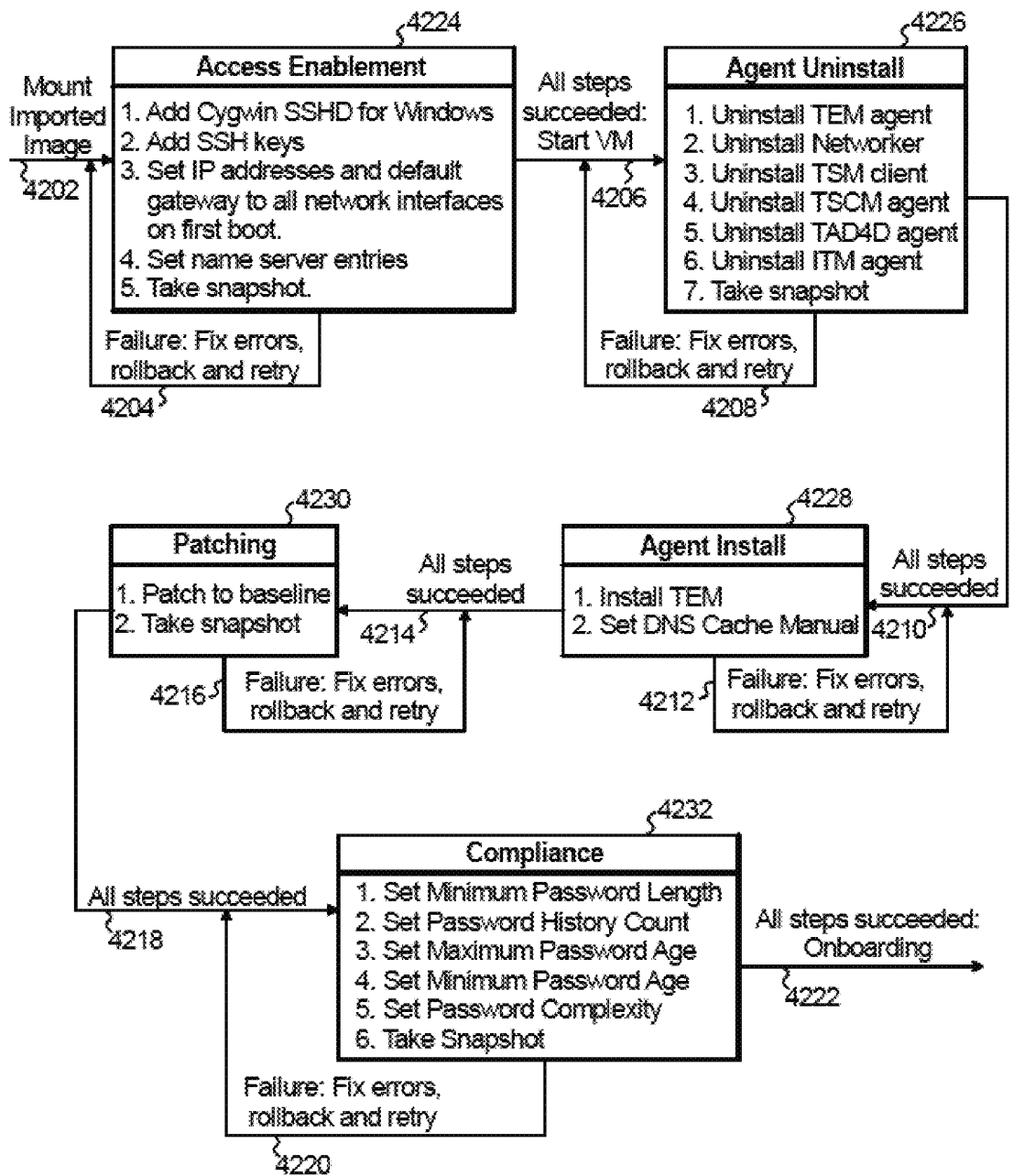
FIG. 42 presents an exemplary flow diagram, according to an aspect of the invention.
Figure 43:
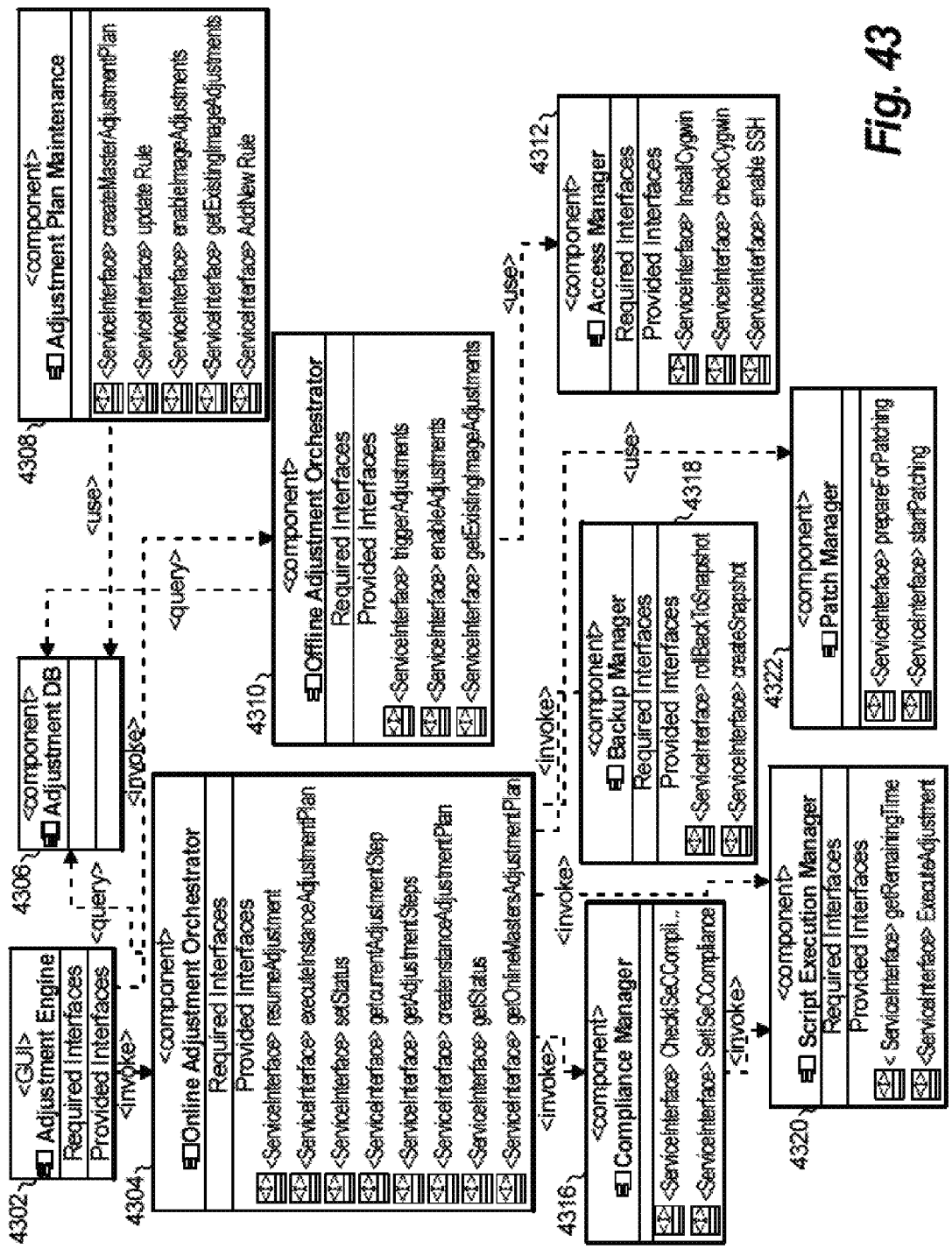
FIG. 43 presents an exemplary standardization architecture, according to an aspect of the invention.

Reference should now be had to FIGS. 42 and 43. One or more embodiments provide reduced cost standardization via an automated adjustment engine 4302. One or more embodiments include an adjustment orchestrator 4304 and/or 4310. The orchestrator 4304 and/or 4310 defines a set of phases where a dependent phase is executed only after all its antecedent phases have been executed. Steps in each phase are encapsulated as a script. Scripts can be run on the adjustment engine 4302, on target virtual machines, or on any other management tool (e.g., integrated with vCenter (VMware vCenter Server provides a centralized and extensible platform for managing virtual infrastructure, and is available from VMware, Inc. of Palo Alto, Calif., USA) or TEM). In one or more embodiments, a single user interface 4302 is provided for all kinds of images (e.g., Windows, Linux, AIX). Furthermore in this regard, in an exemplary embodiment, element 4302 is the adjustment portal and the master choreographer 4008, which decides the order in which the individual orchestrators 4012, 4014, 4016 will be invoked. The adjustment engine is the sum of all components. The portal is an optional entity in element 4302 as the choreographer can be invoked directly using a programmable API. In summary, in the non-limiting example, element 4302 equals the choreographer plus, optionally, the portal. In one or more embodiments, multiple images can be adjusted in parallel (this reduces the amount of time spent per image being standardized).

One or more embodiments provide reliable standardization. One or more embodiments provide a flexible rule framework that takes conditions and actions. Conditions provide the flexibility to handle different types of source images. Conditions and actions come up with associated scripts. In at least some cases, this involves a two-step process. The customer approves the valid set of rules for his or her data center and bootstraps the Adjustment Orchestrator 4304 and/or 4310 (see also 4012-4016) with the rules. The tool allows migration engineers to execute the standardization in conformance with the rules. A log is maintained to audit the standardization process any later time. Furthermore, in one or more embodiments, snapshots are employed to allow rollback to a reliable version of the image in case of standardization failures. In some embodiments, at least a two-step process is employed; however, in certain cases a multiple step process is utilized. The customer may define a set of migration rules and the migration engineer may provide feedback that some rules cannot be enforced and thus, there could be an iterative back-and-forth.

The following is an exemplary, illustrative rule set that may be used in the reliable standardization process described just above:

If (Cygwin not installed) Then (Install Cygwin)
If (ITM (IBM Tivoli Monitoring software, available form International Business Machines Corporation, Armonk, N.Y., USA) is present) Then (Uninstall ITM)
If (True) Then (Insert ssh keys)
If (Symantec Antivirus is not present) Then (Install Symantec Antivirus)
If (Password Expiration=90 days) Then (Set Password Expiration=180 days)
If (Patch X not present) Then (Deploy Patch X) (Patch X here represents any needed patch; a non-limiting example could be, for example, Microsoft Patch MS08-067)
If (TEM agent not registered) Then (Register TEM Agent)

Refer now to FIG. 42. At 4202, mount the imported image. In step 4224, carry out access enablement; for example:
1. Add Cygwin SSHD (OpenSSH=sshd) for Windows;
2. Add SSH keys;
3. Set IP addresses and default gateway to all network interfaces on first boot;
4. Set name server entries; and
5. Take a snapshot.

In the event of any failure, as seen at 4204, fix the errors, rollback, and retry. Once all steps are successful, whether on the first attempt or a subsequent re-try, as seen at 4206, start the VM. Then implement an agent un-install procedure 4226; for example:
1. Uninstall TEM agent
2. Uninstall EMC Networker (available from EMC Corporation, Hopkinton, Mass., USA)
3. Uninstall TSM client (IBM Tivoli Storage Manager (TSM) software available from International Business Machines Corporation, Armonk, N.Y., USA)
4. Uninstall TSCM agent (IBM Tivoli Security Compliance Manager (TSCM) software available from International Business Machines Corporation, Armonk, N.Y., USA)
5. Uninstall TAD4D agent (Tivoli Asset Discovery for Distributed, available from International Business Machines Corporation, Armonk, new York, USA)
6. Uninstall ITM agent (IBM Tivoli Monitoring software, available form International Business Machines Corporation, Armonk, N.Y., USA)
7. Take snapshot In the event of any failure, as seen at 4208, fix the errors, rollback, and retry. Once all steps are successful, whether on the first attempt or a subsequent re-try, as seen at 4210, proceed to the agent install process 4228; for example:
1. Install TEM
2. Set Domain Name System (DNS) Cache Manual In the event of any failure, as seen at 4212, fix the errors, rollback, and retry. Once all steps are successful, whether on the first attempt or a subsequent re-try, as seen at 4214, proceed to the patching process 4230; for example:
1. Patch to baseline
2. Take snapshot In the event of any failure, as seen at 4216, fix the errors, rollback, and retry. Once all steps are successful, whether on the first attempt or a subsequent re-try, as seen at 4218, proceed to the compliance process 4232; for example:
1. Set Minimum Password Length;
2. Set Password History Count
3. Set Maximum Password Age
4. Set Minimum Password Age
5. Set Password Complexity
6. Take a snapshot.

In the event of any failure, as seen at 4220, fix the errors, rollback, and retry. Once all steps are successful, whether on the first attempt or a subsequent re-try, as seen at 4222, proceed to the on-boarding process.

FIG. 43 shows exemplary standardization architecture. Included are adjustment engine 4302 (which may be provided as a graphical user interface or GUI or a set of APIs to a master choreographer); and online and offline adjustment orchestrators 4304, 4310, respectively (both of which are in the form of components). Other components include adjustment database 4306, adjustment plan maintenance module 4308, access manager 4312, compliance manager 4316, backup manager 4318, script execution manager 4320, and patch manager 4322. Engine 4302 invokes the online and offline adjustment orchestrators 4304, 4310. These in turn query adjustment database 4306, which is maintained by using adjustment plan maintenance module 4308. The adjustment plan maintenance component is used by the migration team in consultation with the customer to create an adjustment plan in advance. This plan contains all the rules to guide the adjustment process.

Offline adjustment orchestrator 4310 uses access manager 4312 to provide required access and interfaces.

Online adjustment orchestrator 4304 invokes compliance manager 4316, backup manager 4318, and script execution manager 4320. Compliance manager 4316 also invokes script execution manager 4320. Online adjustment orchestrator 4304 uses patch manager 4322.

Figure 44:
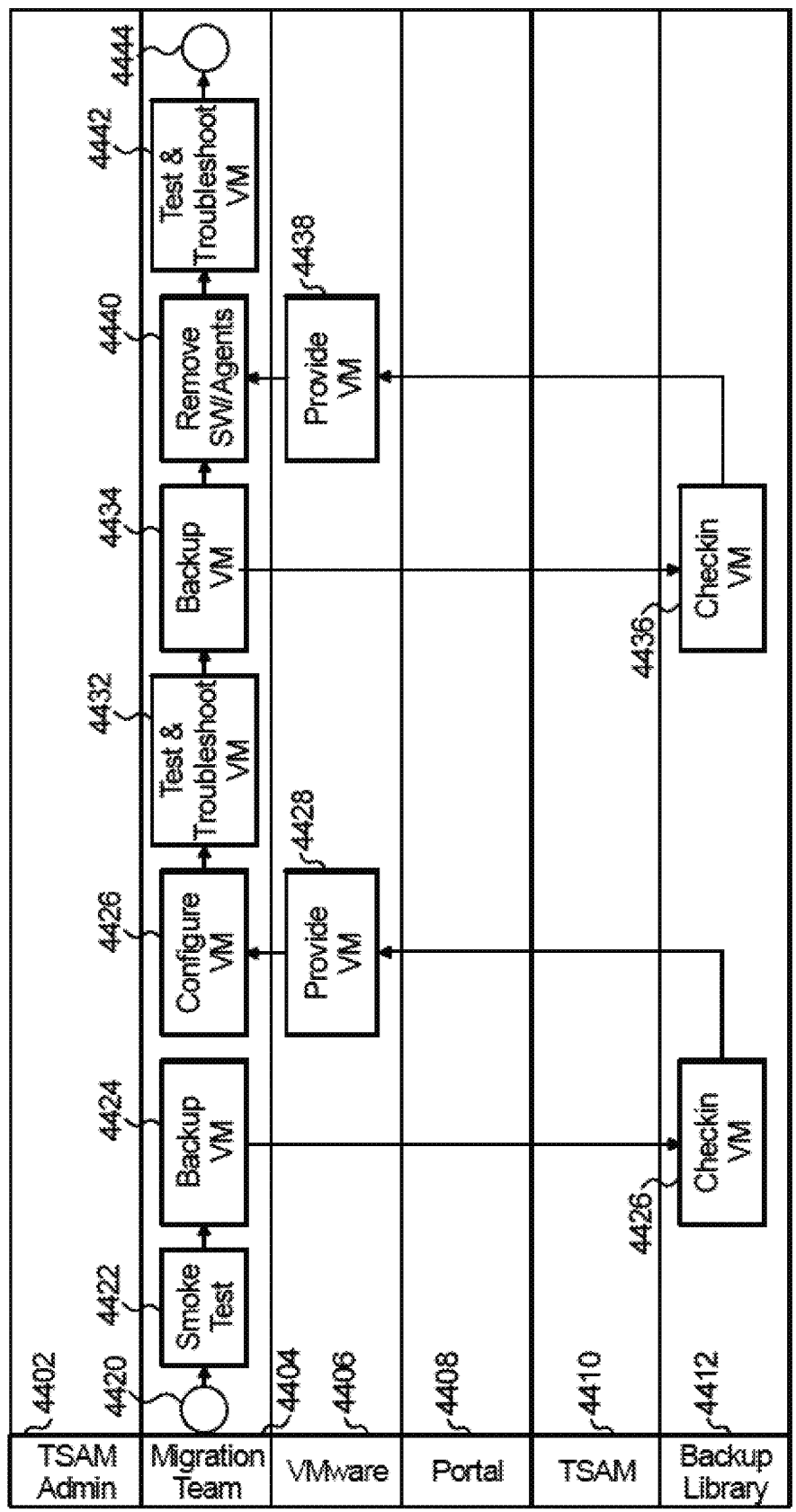
FIGS. 44-46 shown an exemplary adjustment phase, according to an aspect of the invention.
Figure 45:
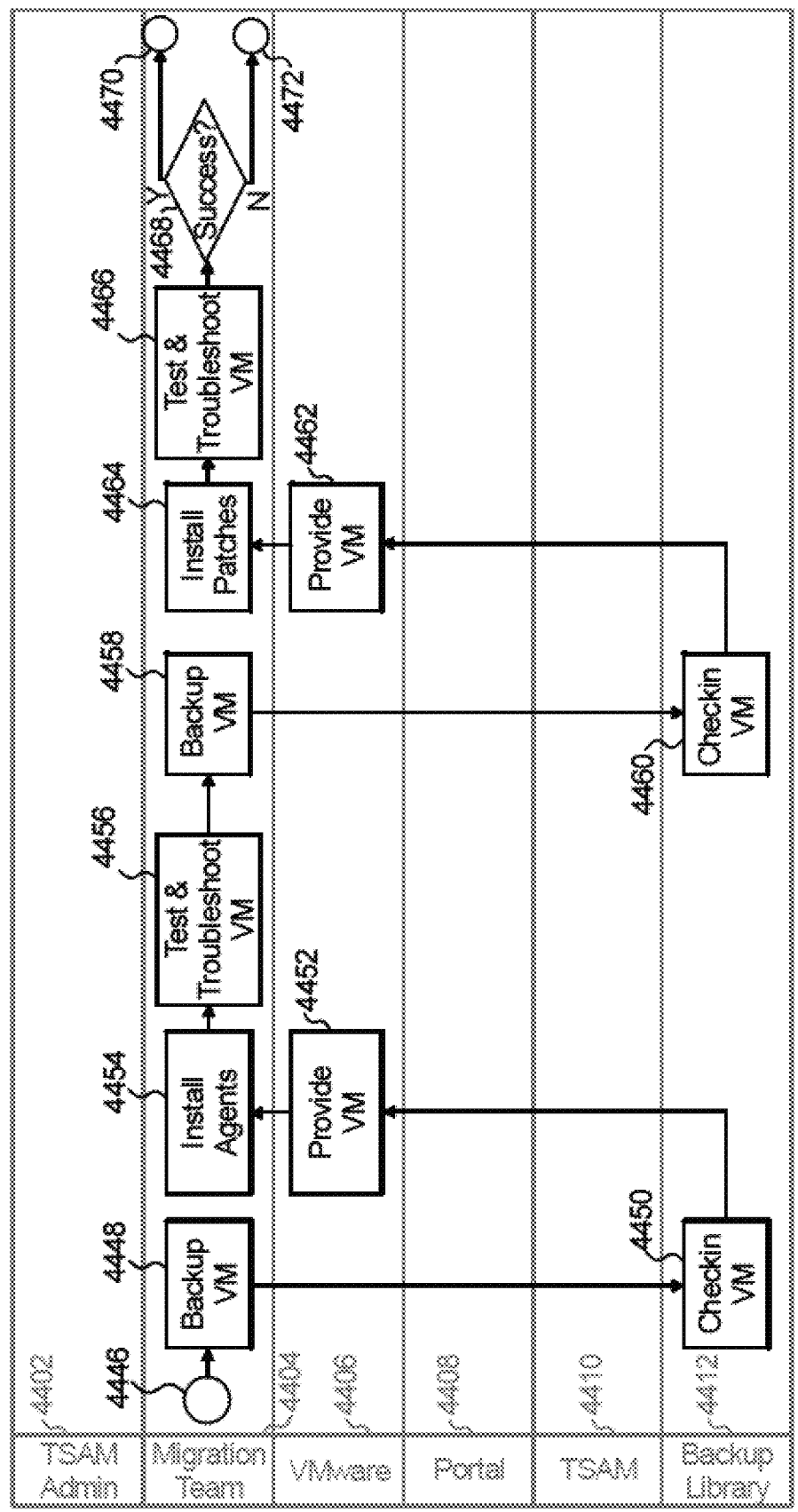
Figure 46:
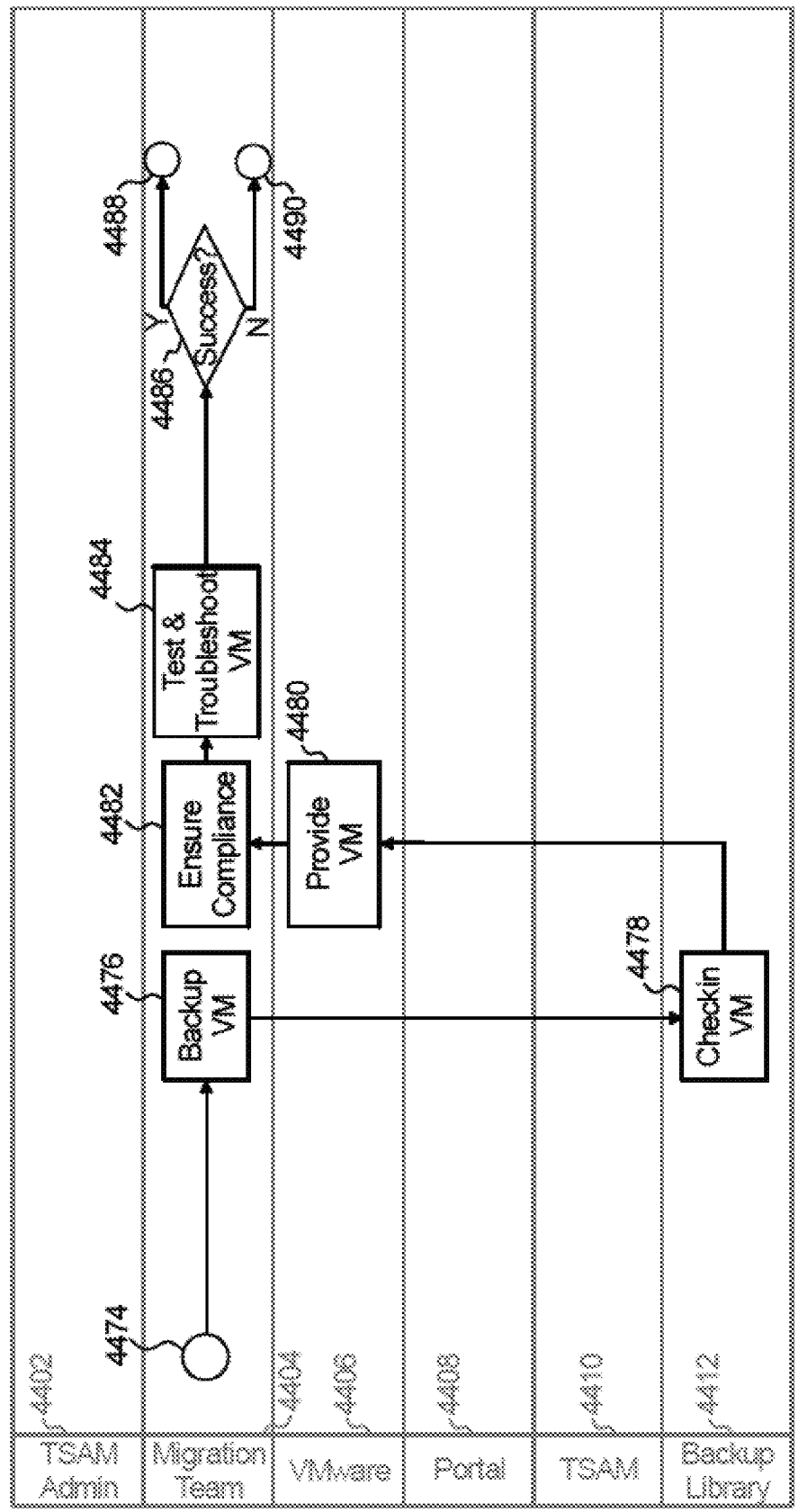

Attention should now be given to FIGS. 44-46, which show exemplary detailed steps in an adjustment phase. Each step is shown in a "swim lane" indicating what module or entity carries out the particular step in the exemplary embodiment. Please note that elements 4402, 4408 (cloud portal), and 4410 are not needed for the process depicted in FIG. 44 but are included for illustrative purposes. Migration team 4404 captures all activities performed by the migration team. This includes activities that are performed by using the Adjustment GUI or invoking the Adjustment APIs as well as manual steps to check for success and failure. Test and Troubleshoot VM steps 4432, 4442 represent a manual process in the example of FIG. 44. The remaining steps are typically automated and involve clicking a button on the portal or calling an API. The entities include the TSAM (IBM Tivoli® Service Automation Manager software available from International Business Machines Corporation, Armonk, N.Y., USA) administrator 4402, migration team 4404, VMware vSphere Virtualization Manager 4406, Portal 4408, TSAM 4410, and back-up library 4412. Processing begins at 4420. In step 4422, carry out smoke testing (i.e., a process of validating code changes before the changes are checked into the product's source tree). In step 4424, back up the VM in question; in step 4426, check same into the back-up library. In step 4428, the hypervisor provides the VM; in step 4430, configure the VM. Step 4430 is analogous to step 4224 in FIG. 42. In step 4432, test and troubleshoot the VM. In step 4434, back up the configured and tested VM; in step 4436, check same into the back-up library. In step 4428, the hypervisor provides the configured and tested VM; in step 4440 remove inappropriate software and/or agents. Step 4440 is analogous to step 4226 in FIG. 42. In step 4442, test and troubleshoot the updated VM with the inappropriate software and/or agents removed. Processing continues at 4444.

In FIG. 45, processing begins at point 4446 (which is identical to point 4444). In step 4448, back up the updated VM with the inappropriate software and/or agents removed; in step 4450, check same into the back-up library. In step 4452, the hypervisor provides the updated VM with the inappropriate software and/or agents removed; in step 4454 install appropriate agents. Step 4454 is analogous to step 4228 in FIG. 42. In step 4456, test and troubleshoot the updated VM with the appropriate agents installed. In step 4458, back up the updated VM with the appropriate agents installed; in step 4460, check same into the back-up library. In step 4462, the hypervisor provides the updated VM with the appropriate agents installed; in step 4464 install patches. Step 4464 is analogous to step 4230 in FIG. 42.

In step 4466, test and troubleshoot the updated VM with the patches installed. In decision block 4468, determine if the testing was successful; if yes, at 4470, proceed to the flow in FIG. 46; if no, at 4472, fix errors, rollback, and retry, as at 4216 in FIG. 42. In FIG. 46, processing begins at point 4474 (which is identical to point 4470). In step 4476, back up the updated VM with the patches installed; in step 4478, check same into the back-up library. In step 4480, the hypervisor provides the updated VM with the patches installed; in step 4482 ensure compliance. Step 4482 is analogous to step 4232 in FIG. 42. In step 4484, test and troubleshoot the post-compliance-check VM. In decision block 4486, determine if the testing was successful; if yes, at 4488, proceed with on-boarding; if no, at 4490, fix errors, rollback, and retry, as at 4220 in FIG. 42. In general, in case of errors, roll back to any backup step in the flow is possible.

Figure 47:
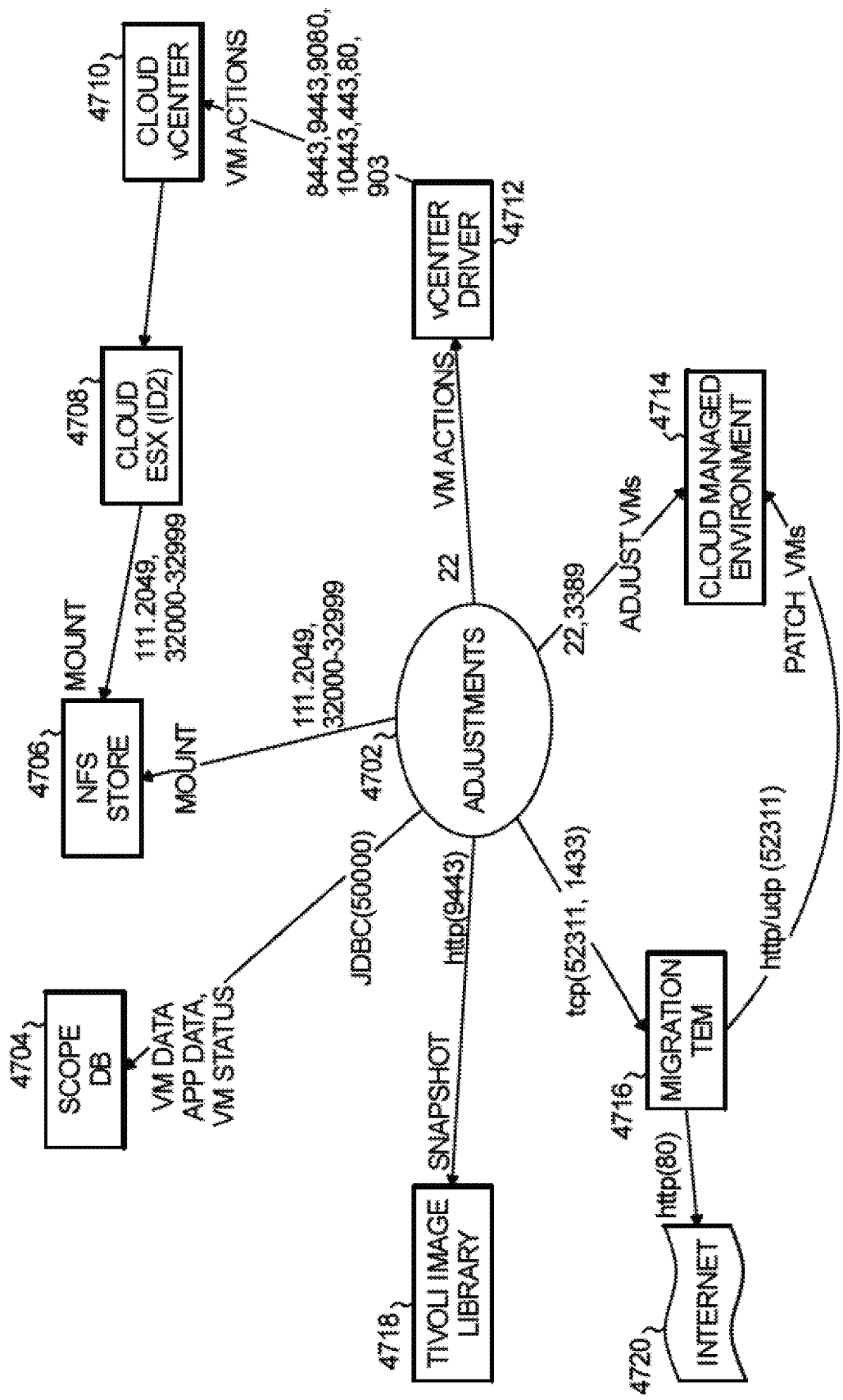
FIG. 47 shows an exemplary architecture, according to an aspect of the invention.

FIG. 47 shows an exemplary architecture, to assist the skilled artisan in understanding an exemplary system in a pertinent context. One or more adjustments 4702 are carried out to standardize an arbitrary customer instance. Prior to attempting adjustments, it is preferable to place a snapshot in a suitable image library such as IBM Tivoli Image Library 4718. This can be carried out, for example, using hypertext transfer protocol (http) on port 9443 using IBM Tivoli Image Library. Reference can be had to scope database 4704 to access pertinent data regarding VMs and applications, and to determine the status of VMs. This can be carried out, for example, using Java Database Connectivity (JDBC). The image to be adjusted is mounted in the network file system (NFS) storage 4706. Any required VM actions are carried out by cloud vCenter 4710, controlled, by vCenter driver 4712; this results in creation and/or modification of VMs in cloud 4708 which are in turn mounted in NFS storage 4706.

An IBM Tivoli® Endpoint Manager (TEM) server 4716 may be employed for migration purposes; communication with same may be had, for example, via transfer control protocol (tcp). The TEM controls VM patching for the cloud managed environment 4714 in which adjusted VMs reside; communication can be via http or User Datagram Protocol (udp). TEM 4716 communicates with Internet 4720 via http on port 80.

One or more embodiments thus provide a system and method to adjust images so that they meet the image standard of a managed environment 4714 and can be managed using standard processes and tools. In one or more embodiments, such a system includes one or more adjustment type orchestrators 4012, 4014, 4016 handling specific types of adjustments; an adjustment plan 4018 capturing all the adjustments; and an adjustment plan maintenance component 4010.

Non-limiting examples of orchestrators include an Access Enablement Orchestrator 4224 to ensure that all source images can be accessed by all relevant management entities (including other orchestrators); an Uninstall Orchestrator 4226 to uninstall unwanted software; an install orchestrator 4228 to install required software; a Patch Orchestrator 4230 to ensure patch standardization; and a compliance orchestrator 4232 to ensure compliance with one or more cloud standards. Different embodiments could include additional orchestrators, fewer orchestrators, or precisely the orchestrators just described, for example.

The managed environment 4714 may be, for example, an MIaaS cloud (e.g., IBM SCE+).

The orchestrators may operate on file system virtual machine images (e.g., in image repository 4028) or on VM instances 4030, 4032, 4034.

In some cases, the actions executed by each of the orchestrators are determined by a rule engine. Furthermore in this regard, the rule engine is not shown explicitly in the figures to avoid clutter; however, in one or more embodiments a rule evaluation engine is implicitly implemented in each orchestrator, which needs to evaluate each condition and execute the action only if the condition is satisfied. In some cases, such a rule engine includes a set of condition-action pairs (e.g., If (Cygwin not installed) Then (Install Cygwin) and so on, as discussed above); in such cases, the action is executed only when the condition is satisfied. In some cases, new rules can be injected in the rule engine to extend the tool for dealing with new kinds of customer images; for example, such rules can be injected by an adjustment plan maintenance component such as plan manager 4010, which allows for creation, editing, and/or deletion of rules.

In at least some cases, the overall adjustment flow can be tuned by changing the adjustment plan 4018 and/or changing the order of the orchestrators 4012-416 or 4224-632.

Recapitulation

Given the discussion thus far, it will be appreciated that, in general terms, an exemplary method, according to an aspect of the invention, includes the step transferring an arbitrary customer instance (generally, one or more such instances) from a customer environment to a target infrastructure-as-a-service cloud environment (4714; FIG. 3) as a (generally, one or more) transferred image. "Transferring" should be broadly understood to include acts by the provider of the infrastructure-as-a-service cloud environment and/or acts by the customer. This step can be carried out, for example, by a transfer core component (e.g., a module 42 in the target infrastructure-as-a-service cloud environment configured to obtain the arbitrary customer instance from a customer environment). A further step includes formulating an image adjustment plan 4018 capturing at least one adjustment required to render the transferred image(s) compliant with standards of the target infrastructure-as-a-service cloud environment. "Formulating" should be broadly understood to include acts performed solely by a machine (e.g., storing instructions, input by a human, which codify the plan) or acts by both a machine and a human. This step can be carried out, for example, by adjustment plan maintenance component 4010. A further step includes executing the image adjustment plan to adjust the transferred image(s) to obtain an adjusted image compliant with standards of the target infrastructure-as-a-service cloud environment. This step can be carried out by an orchestration component; e.g., choreographer 4008 and one or more orchestrators 4012-4016. A still further step includes onboarding the adjusted image(s) into the infrastructure-as-a-service cloud environment as a standard image thereof (generally, one or more standard image(s)). "Standard" implies that the image then works in the same manner as if it had been made from the systems own "golden masters." This step can be carried out, for example, by cloud management layer 64.

In some cases, the transferred image is adjusted online while running as an instance in the infrastructure-as-a-service cloud environment (e.g., 4030, 4032, 4034). In such cases, the executing step includes executing the image adjustment plan with an automated framework including at least one online orchestrator 4304 interacting with the instance in the infrastructure-as-a-service cloud environment.

In some cases, the transferred image is adjusted offline in a file system 4028 of the infrastructure-as-a-service cloud environment. In such cases, the executing step includes executing the image adjustment plan with an automated framework including at least one offline orchestrator interacting 4310 with the transferred image in the file system of the infrastructure-as-a-service cloud environment.

In some cases, the executing step includes executing the image adjustment plan with an automated framework including at least one orchestrator interacting with a virtualization manager 4026 (and/or supporting tools 4004) of the infrastructure-as-a-service cloud environment.

In at least some embodiments, the infrastructure-as-a-service cloud environment includes a managed infrastructure-as-a-service cloud environment having a management layer 64. In such cases, in at least some instances, a further step includes managing the standard image with the management layer together with at least one application created from a managed infrastructure-as-a-service cloud environment application golden master (i.e., an application created from a golden master associated with the managed infrastructure-as-a-service cloud environment; not meant to imply that it is somehow a golden master of the whole cloud environment).

In some embodiments, the image adjustment plan is executed with an automated framework including at least one of an access enablement orchestrator 4224 which ensures that the adjusted image can be accessed by a management layer of the target infrastructure-as-a-service cloud environment; an agent uninstall orchestrator 4226 which uninstalls unwanted software from the transferred image; an agent install orchestrator 4228 which installs required software to the transferred image; a patching orchestrator 4230 which ensures that the adjusted image has installed thereon patches required by the standards of the target infrastructure-as-a-service cloud environment; and a compliance orchestrator 4232 which ensures that the adjusted image conforms to the standards of the target infrastructure-as-a-service cloud environment.

In some cases, the executing step includes executing the image adjustment plan with an automated framework by using an access enablement orchestrator 4224 to ensure that the adjusted image can be accessed by a management layer of the target infrastructure-as-a-service cloud environment; using an agent uninstall orchestrator 4226 to uninstall unwanted software from the transferred image; using an agent install orchestrator 4228 to install required software to the transferred image; using a patching orchestrator 4230 to ensure that the adjusted image has installed thereon patches required by the standards of the target infrastructure-as-a-service cloud environment; and using a compliance orchestrator 4232 to ensure that the adjusted image conforms to the standards of the target infrastructure-as-a-service cloud environment.

In some cases, adjustment plan 4018 includes rules that uniformly encode adjustment recipes across different kinds of images. Preferably but optionally, the orchestration framework is generic and can deal with multiple types of adjustment actions. In at least some cases, the adjustment orchestrator(s) define(s) a set of phases with steps in each phase encapsulated in a script. Such scripts may run in an adjustment engine and may target VMs 4030-4034, management tools 4020-4024, or the like. Some techniques adjust multiple images in parallel. In some cases, the adjustment orchestrator(s) is/are bootstrapped with rules. The actions of the orchestrators are determined by a rule engine (a set of condition/action pairs); new rules can be injected by adjustment plan maintenance component 4010. The adjustment flow can be changed by changing the plan and/or changing the order of the orchestrators. The framework can be extended by adding and/or registering a new action and/or orchestrator to an existing plan.

In another aspect, an exemplary apparatus includes a memory (e.g., RAM 28, cache 32); at least one processor 16, coupled to the memory; and a non-transitory computer-readable storage medium 34, embodying in a non-transitory manner a plurality of distinct software modules 42. The plurality of distinct software modules in turn include an adjustment plan maintenance component module 4010 including instructions which, when loaded into the memory, configure the at least one processor to formulate an image adjustment plan 4018 capturing at least one adjustment required to render a transferred image compliant with standards of a target infrastructure-as-a-service cloud environment. The transferred image includes an arbitrary customer instance from a customer environment. Also included are an adjustment orchestration module (e.g., 4008 and 4012-4016) including instructions which, when loaded into the memory, configure the at least one processor to execute the image adjustment plan to adjust the transferred image to obtain an adjusted image compliant with standards of the target infrastructure-as-a-service cloud environment; and a cloud management module 64 including instructions which, when loaded into the memory, configure the at least one processor to on-board the adjusted image into the infrastructure-as-a-service cloud environment as a standard image thereof.

In some cases, the adjustment orchestration module includes instructions which, when loaded into the memory, configure the at least one processor to adjust the transferred image online while running as an instance in the infrastructure-as-a-service cloud environment, as at 4030-4034. In some cases, the adjustment orchestration module includes instructions which, when loaded into the memory, configure the at least one processor to adjust the transferred image offline in a file system 4028 of the infrastructure-as-a-service cloud environment.

In some embodiments, the adjustment orchestration module includes instructions which, when loaded into the memory, configure the at least one processor to interact with a virtualization manager 4026 of the infrastructure-as-a-service cloud environment. In some embodiments, the adjustment orchestration module includes instructions which, when loaded into the memory, configure the at least one processor to interact with a supporting tool 4020-4024 of the infrastructure-as-a-service cloud environment.

In at least some cases, the infrastructure-as-a-service cloud environment includes a managed infrastructure-as-a-service cloud environment 4714 having a management layer 64. The management layer can, for example, manage the standard image together with at least one application created from a managed infrastructure-as-a-service cloud environment application golden master.

In some embodiments, the adjustment orchestration module includes an adjustment choreographer 4008 and at least one of: an access enablement orchestrator 4224 which ensures that the adjusted image can be accessed by a management layer of the target infrastructure-as-a-service cloud environment; an agent uninstall orchestrator 4226 which uninstalls unwanted software from the transferred image; an agent install orchestrator 4228 which installs required software to the transferred image; a patching orchestrator 4230 which ensures that the adjusted image has installed thereon patches required by the standards of the target infrastructure-as-a-service cloud environment; and a compliance orchestrator 4232 which ensures that the adjusted image conforms to the standards of the target infrastructure-as-a-service cloud environment.

In some cases, the adjustment orchestration module includes an adjustment choreographer 4008; an access enablement orchestrator 4224 which ensures that the adjusted image can be accessed by a management layer of the target infrastructure-as-a-service cloud environment; an agent uninstall orchestrator 4226 which uninstalls unwanted software from the transferred image; an agent install orchestrator 4228 which installs required software to the transferred image; a patching orchestrator 4230 which ensures that the adjusted image has installed thereon patches required by the standards of the target infrastructure-as-a-service cloud environment; and a compliance orchestrator 4232 which ensures that the adjusted image conforms to the standards of the target infrastructure-as-a-service cloud environment.

Exemplary System and Article of Manufacture Details

As will be appreciated by one skilled in the art, aspects of the present invention may be embodied as a system, method or computer program product. Accordingly, aspects of the present invention may take the form of an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In some cases, some aspects of the invention may be implemented in hardware in an appliance that a migration team brings into a customer environment.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). However, one or more embodiments are particularly significant in the context of a cloud or virtual machine environment. Reference is made back to FIGS. 1-3 and accompanying text.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and or sub-modules/sub-blocks in FIGS. 16-19, such as a discovery tool module to carry out functionality 16100 (optionally with sub-modules to carry out 16110, 16120, 16130, and/or 16140), a description module to hold description 16300 (optionally with sub-data-structures for data 16310, 16320, 16330, and/or 16340), and an infrastructure comparison engine module 16200 (optionally with sub-modules to implement functionality 16210, 16220, 16230, and/or 16240). The customer environment 1702 may have one or more modules to implement one or more transfer agents and/or may have some or all of the discovery tool functionality as discussed elsewhere. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   discovering, in a source computing system having a source management infrastructure, at least one source infrastructure management component, wherein said at least one source infrastructure management component is an instance of an image, and wherein said at least one source infrastructure management component is running in a customer environment;
   querying a database to obtain a description of a target cloud infrastructure;
   analyzing said at least one source infrastructure management component using said description of said target cloud infrastructure to determine that said at least one source infrastructure management component is appropriate for infrastructure configuration mapping to said target cloud infrastructure;
   stopping an application executing on said at least one source infrastructure management component determined appropriate for infrastructure configuration mapping; and
   capturing said at least one source infrastructure management component determined appropriate for infrastructure configuration mapping for migration to said target cloud infrastructure.

2. The method of claim 1, wherein, in said discovering step, said at least one source infrastructure management component comprises at least one of:
   at least one source infrastructure management client;
   at least one source infrastructure management server;
   at least one source infrastructure management configuration; and
   at least one source infrastructure management log.

3. The method of claim 2, further comprising deriving a description of non-functional requirements of said source management infrastructure.

4. The method of claim 3, wherein:
   in said discovering step, said at least one source infrastructure management component comprises at least:
     said at least one source infrastructure management configuration; and
     said at least one source infrastructure management log;
   in said querying step, said description of said target cloud infrastructure comprises at least one of:
     cloud infrastructure software standards;
     cloud infrastructure software configurations; and
     a description of non-functional requirements of a target management infrastructure of said target cloud infrastructure;
   said analyzing comprises:
     matching said cloud infrastructure software standards with at least a corresponding one of:
       said at least one source infrastructure management client; and
       said at least one source infrastructure management server;
     mapping said description of said non-functional requirements of said source management infrastructure with said description of said non-functional requirements of said target management infrastructure; and
     mapping said cloud infrastructure software configurations with said at least one source infrastructure management configuration and said at least one source infrastructure management log.

5. The method of claim 4, wherein said mapping of said cloud infrastructure software configurations with said at least one source infrastructure management configuration and said at least one source infrastructure management log is at least partially based on:

said matching of said cloud infrastructure software standards with said at least one source infrastructure management client and said at least one source infrastructure management server; and said mapping of said description of said non-functional requirements of said source management infrastructure with said description of said non-functional requirements of said target management infrastructure.

6. The method of claim 5, wherein:

in said discovering step, said at least one source infrastructure management component further comprises at least one source infrastructure management process;

in said querying step, said description of said target cloud infrastructure further comprises at least one target infrastructure management process; and said analyzing further comprises mapping said at least one source infrastructure management process with said at least one target infrastructure management process.

7. The method of claim 6, wherein said mapping of said at least one source infrastructure management process with said at least one target infrastructure management process is at least partially based on said mapping of said description of said non-functional requirements of said source management infrastructure with said description of said non-functional requirements of said target management infrastructure.

8. The method of claim 2, wherein:

in said querying step, said description of said target cloud infrastructure comprises at least one of:
cloud infrastructure software standards; and
cloud infrastructure software configurations;

said analyzing comprises:
matching said cloud infrastructure software standards with at least a corresponding one of:
said at least one source infrastructure management client; and
said at least one source infrastructure management server; and
mapping said cloud infrastructure software configurations with said at least one source infrastructure management configuration.

9. The method of claim 8, wherein said mapping of said cloud infrastructure software configurations with said at least one source infrastructure management configuration is at least partially based on said matching of said cloud infrastructure software standards with said at least one source infrastructure management client and said at least one source infrastructure management server.

10. The method of claim 9, wherein:

in said discovering step, said at least one source infrastructure management component further comprises at least one source infrastructure management process;

in said querying step, said description of said target cloud infrastructure further comprises at least one target infrastructure management process; and said analyzing further comprises mapping said at least one source infrastructure management process with said at least one target infrastructure management process.

11. The method of claim 1, wherein said analyzing step further comprises determining that at least one conflict exists with said at least one mandatory target infrastructure management component, wherein said at least one conflict comprises said at least one source infrastructure management component managing at least one object that said at least one mandatory target infrastructure management component will manage in said target cloud infrastructure.

12. The method of claim 1, wherein said analyzing step further comprises determining that at least one conflict exists with said at least one mandatory target infrastructure management component, wherein said at least one conflict comprises said at least one source infrastructure management component using at least one resource that said at least one mandatory target infrastructure management component will use in said target cloud infrastructure.

13. The method of claim 1, wherein said analyzing step further comprises determining that at least one conflict exists with said at least one mandatory target infrastructure management component, wherein said at least one conflict comprises at least one of:
current lack of a mandatory target infrastructure component on a client,
existence of a mandatory target infrastructure component in a different version, and
existence of a mandatory target infrastructure component with different configurations.

14. The method of claim 1, wherein said analyzing comprises at least one of:
recommending un-installation of a source infrastructure component;
recommending installation of a target infrastructure component;
recommending modifying configuration of an infrastructure component; and
recommending excluding servers with a given source infrastructure component from migration.

15. The method of claim 1, wherein:

said discovering comprises discovering, in said source computing system, a plurality of source infrastructure management components; and said analyzing comprises:
initially aggregating all of said plurality of source infrastructure management components;
developing generic recommendations for said aggregated plurality of source infrastructure management components;
applying said recommendations on a per-instance basis; and
refining at least some of said applied recommendations in cases where said generic recommendations are inconclusive.

16. The method of claim 1, wherein said discovering is carried out on at least one physical machine in said source computing system, said at least one physical machine comprising a client of said at least one source infrastructure management component.

17. The method of claim 1, wherein said discovering is carried out on at least one physical machine in said source computing system, said at least one physical machine comprising a server on which said at least one source infrastructure management component runs.

18. The method of claim 1, further comprising providing a system, wherein the system comprises distinct software modules, each of the distinct software modules being embodied on a non-transitory computer-readable storage medium, and wherein the distinct software modules comprise a discovery tool module, a description module, and an infrastructure comparison engine module;

wherein:
said discovering is carried out by said discovery tool module executing on at least one hardware processor;
said querying is carried out by said description module executing on said at least one hardware processor; and
said analyzing is carried out by said infrastructure comparison engine module executing on said at least one hardware processor.

19. A method comprising:

discovering, in a source computing system having a source management infrastructure, at least one source infrastructure management component, wherein said at least one source infrastructure management component is an instance of an image, and wherein said at least one source infrastructure management component is running in a customer environment;

querying a database to obtain a description of a target cloud infrastructure;

analyzing said at least one source infrastructure management component using said description of said target cloud infrastructure to determine that said at least one source infrastructure management component is appropriate for infrastructure configuration mapping to said target cloud infrastructure, wherein:

in said discovering step, said at least one source infrastructure management component comprises at least one of:
at least one source infrastructure management client;
at least one source infrastructure management server;
at least one source infrastructure management configuration; and
at least one source infrastructure management log;

in said querying step, said description of said target cloud infrastructure comprises at least one of:
cloud infrastructure software standards; and
cloud infrastructure software configurations;

said analyzing comprises:
matching said cloud infrastructure software standards with at least a corresponding one of:
said at least one source infrastructure management client; and
said at least one source infrastructure management server; and
mapping said cloud infrastructure software configurations with said at least one source infrastructure management configuration determined appropriate for infrastructure configuration mapping.

* * * * *